(12) United States Patent
Takenaka

(10) Patent No.: US 7,873,436 B2
(45) Date of Patent: Jan. 18, 2011

(54) GAIT GENERATOR FOR MOBILE ROBOT

(75) Inventor: Toru Takenaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1225 days.

(21) Appl. No.: 10/597,105

(22) PCT Filed: Jan. 5, 2005

(86) PCT No.: PCT/JP2005/000022

§ 371 (c)(1),
(2), (4) Date: Jul. 11, 2006

(87) PCT Pub. No.: WO2005/068136

PCT Pub. Date: Jul. 28, 2005

(65) Prior Publication Data

US 2007/0156283 A1 Jul. 5, 2007

(30) Foreign Application Priority Data

Jan. 13, 2004 (JP) .............................. 2004-005029

(51) Int. Cl.
G05B 19/19 (2006.01)
B25J 9/10 (2006.01)
G05B 19/18 (2006.01)

(52) U.S. Cl. ........................ 700/250; 700/245; 700/260; 318/568.2; 318/568.23; 318/568.17; 901/1

(58) Field of Classification Search ................. 700/245, 700/249, 250, 253, 254, 260; 180/8.1, 8.5; 318/568.1, 568.12, 568.17, 568.2, 568.23; 901/1

See application file for complete search history.

(56) References Cited

U.S. PATENT DOCUMENTS

| 5,355,064 | A | | 10/1994 | Yoshino et al. |
| 5,426,586 | A | * | 6/1995 | Ozawa ........................ 701/23 |
| 7,236,852 | B2 | * | 6/2007 | Moridaira et al. ........... 700/245 |

(Continued)

FOREIGN PATENT DOCUMENTS

EP         1120203 A1        8/2001

(Continued)

Primary Examiner—Thomas G Black
Assistant Examiner—Christine Behncke
(74) Attorney, Agent, or Firm—Rankin, Hill & Clark LLP

(57) ABSTRACT

When the placement of the elements (mass points, links having inertia, etc.) of a model expressing a robot 1 is determined according to a first geometric restrictive condition from an instantaneous desired motion of the robot 1 that has been created using a dynamic model, this placement is defined as a first placement, and the placement determined according to a second geometric restrictive condition from a corrected instantaneous desired motion that has been obtained by correcting the instantaneous desired motion is defined as a second placement. The corrected instantaneous desired motion is determined such that the moment component calculated from the difference between the first and the second placements approximates a predetermined value. The instantaneous desired motion is created using a dynamic model of the robot. Thus, the motion of the instantaneous desired gait of the robot that has been created using the dynamic model is properly corrected without using a dynamic model, leading to higher dynamic accuracy of an instantaneous desired gait including the corrected motion.

15 Claims, 20 Drawing Sheets

U.S. PATENT DOCUMENTS

| | | | |
|---|---|---|---|
| 7,623,944 B2 * | 11/2009 | Dariush | 700/245 |
| 7,657,345 B2 * | 2/2010 | Endo et al. | 700/249 |
| 7,698,020 B2 * | 4/2010 | Kawai et al. | 700/245 |
| 7,715,944 B2 * | 5/2010 | Takenaka et al. | 700/245 |
| 2003/0139849 A1 * | 7/2003 | Kuroki et al. | 700/245 |

FOREIGN PATENT DOCUMENTS

| | | |
|---|---|---|
| JP | 05-237776 | 9/1993 |
| JP | 05-305584 | 11/1993 |
| JP | 05-318339 | 12/1993 |
| JP | 05-324115 | 12/1993 |
| JP | 09-094785 | 4/1997 |
| JP | 10-086080 | 4/1998 |
| JP | 10-277969 | 10/1998 |
| JP | 2002-086373 | 3/2002 |
| JP | 2002-326173 | 11/2002 |
| WO | 03/057427 | 7/2003 |

* cited by examiner

US 7,873,436 B2

GAIT GENERATOR FOR MOBILE ROBOT

TECHNICAL FIELD

The present invention relates to a device for generating desired gaits of a mobile robot, such as a bipedal mobile robot.

BACKGROUND ART

As techniques for generating desired gaits of a mobile robot, such as a bipedal mobile robot, one disclosed in, for example, Japanese Unexamined Patent Application Publication No. 2002-326173 (patent document 1) and one disclosed in PCT international publication WO/03/057427/A1 (patent document 2) have been proposed by the present applicant. According to the techniques disclosed in these documents, an instantaneous desired gait composed of an instantaneous value of a desired motion (instantaneous desired motion) of a robot and an instantaneous value of a desired floor reaction force (instantaneous desired floor reaction force) is sequentially created using a first dynamic model representing a relationship between a motion of the robot (position and posture of each part) and a floor reaction force such that a required dynamic balance condition (a condition, such as the one in which a translational force component of a floor reaction force reaches a desired value or a floor reaction force moment about a certain point reaches a desired value) on the first dynamic model is satisfied. Then, the instantaneous desired gait is input to a second dynamic model wherein a part of the instantaneous desired motion (desired body position/posture, a desired moment about a desired ZMP, or the like) is corrected so as to generate a final instantaneous desired gait in a time series manner.

In this case, a model having high linearity is generally used as the first dynamic model. Creating instantaneous desired gaits by using a dynamic model with high linearity makes it possible to efficiently and promptly create gaits (gaits that allow stable motions of the robot to continue) that connect to or gradually approximate normal gaits, which are virtual cyclic gaits. As a result, instantaneous desired gaits of the robot can be sequentially generated in real time while performing actual motions of the actual robot.

However, a dynamic model with high linearity generally tends to exhibit relatively low dynamic accuracy in a variety of operations of a robot. In other words, the dynamics of the robot on the dynamic model is apt to produce errors with respect to the actual dynamics of the actual robot. For this reason, if the instantaneous desired gaits created using the first dynamic model are directly applied to the actual robot to operate the actual robot, then the dynamic balance condition guaranteed on the first dynamic model fails to be satisfied on the actual robot, frequently leading to unstable motions of the actual robot.

Hence, according to the techniques disclosed in the aforesaid patent documents 1 and 2, a part of an instantaneous desired gait created using the first dynamic model is further corrected using the second dynamic model. In this case, a model having higher dynamic accuracy than the first dynamic model is used as the second dynamic model. This makes it possible to generate gaits having higher dynamic accuracy (closer to the dynamics of the actual robot) than the gaits created using the first dynamic model.

Meanwhile, since the first dynamic model tends to exhibit low dynamic accuracy, as mentioned above, dynamic errors may be relatively large, depending on the type of gaits to be generated. More specifically, in a case where a gait is generated to make a robot perform a motion in which an inertial force not assumed (considered) in the first dynamic model is produced, the error frequently increases. For example, in a case where a 3-mass-point dynamic model having mass points, one each corresponding to the body and a portion near the distal portion of each leg of a bipedal mobile robot, respectively, or a 1-mass-point dynamic model having the mass point only in the body of a robot is used as the first dynamic model, if a motion in which especially the knee joint of each leg is bent is carried out relatively quickly, then the dynamic error will be relatively large because of an influence of a change in an inertial force involved in the motion. As a result, an instantaneous desired gait created using the first dynamic model sometimes becomes unduly inappropriate in securing continuous stability of the robot. In such a case, there has been a danger in that even if the instantaneous desired gait is corrected using the second dynamic model, the correction cannot be properly made, and the corrected instantaneous desired gait exhibits low stability allowance or diverges, failing to secure continuous stability of the robot.

The present invention has been made in view of the background described above, and it is an object thereof to provide a gait generating device of a mobile robot that is capable of properly correcting, without using a dynamic model (without using a differential equation or an integral equation that represents a relationship between motion and force), the motion of an instantaneous desired gait created using a dynamic model, thereby improving the dynamic accuracy of an instantaneous desired gait including the corrected motion.

DISCLOSURE OF INVENTION

According to a first invention of the gait generating device of a mobile robot of the present invention, in a gait generating device equipped with an instantaneous gait generating means for sequentially generating an instantaneous desired gait composed of an instantaneous desired motion of a mobile robot and an instantaneous desired floor reaction force, there is provided a gait generating device of a mobile robot, comprising an instantaneous desired motion correcting means, wherein if: all or a part of the mobile robot is expressed in terms of a model constructed of a plurality of elements, the elements being at least either rigid bodies having inertia or mass points; a placement of elements of the model determined according to a predetermined first geometric restrictive condition, which specifies the relationship between an instantaneous motion of the mobile robot and the placement of the elements of the model, from an instantaneous desired motion generated by the instantaneous gait generating means is defined as a first placement; a placement of the elements of the model determined according to a predetermined second geometric restrictive condition, which specifies the relationship between an instantaneous motion of the mobile robot and the placement of the elements of the model, from an instantaneous desired motion generated by the instantaneous gait generating means, is defined as a second placement; and the placement of the elements of the model determined according to the second geometric restrictive condition from a corrected instantaneous desired motion obtained by correcting at least either the position or the posture of a predetermined part of the mobile robot in an instantaneous desired motion generated by the instantaneous gait generating means is defined as a third placement; then a instantaneous desired motion correcting means determines the corrected instantaneous desired motion such that a moment component generated about a predetermined point by a resultant force of inertial forces of the elements calculated by regarding the difference in the placement of the elements of the model between the third placement and the first placement as acceleration is closer to a predetermined value than a moment component acting about the predetermined point due to a resultant force of inertial forces of the elements calculated by regarding the difference in placement of the elements of the model between the second placement and the first placement as acceleration.

In the present invention to be explained hereinafter, including the first invention, the "placement" of the elements of the model is a term generically expressing the "positions" of mass points as the elements and the "postures" (inclination angles) of rigid bodies (links) having inertia as the elements. In general, a rigid body has a mass and an inertia; however, for the sake of convenience, in the present invention, it is assumed that the rigid body having the mass and the inertia has been taken apart into a mass point that has the mass and is positioned at the center-of-gravity of the rigid body and a rigid body having zero mass and the aforementioned inertia. This does not lead to loss of generality. Further, "the first placement," "the second placement," and "the third placement" will mean the sets of the placements of all elements included in the model.

According to the first invention, properly setting the first geometric restrictive condition and the second geometric restrictive condition and also properly setting the elements constituting the model make it possible to match the difference between the second placement and the first placement (the difference between the placement of the elements in the second placement and the placement of the elements in the first placement) to the level (degree) of the dynamic error between an instantaneous desired motion generated by the instantaneous gait generating means (the desired value at every instant of at least one of the position and the posture of each part of the robot) and an instantaneous desired floor reaction force (the desired value at every instant of at least one of the translational force of a floor reaction force and a moment acting on the robot). Supplementally, this matching relationship generally involves a steady offset. In this case, the difference between the third placement and the first placement (the difference between the placement of the elements in the third placement and the placement of the elements in the first placement) will correspond to the level of the dynamic error between the corrected instantaneous desired motion and the instantaneous desired floor reaction force. Therefore, the corrected instantaneous desired motion is determined such that a moment component acting about a predetermined point due to a resultant force of inertial forces of the elements calculated by regarding the difference in placement of the elements of the model between the third placement and the first placement as acceleration is closer to a predetermined value (a certain fixed offset value) than a moment component acting about the predetermined point due to a resultant force of the inertial forces of the elements calculated by regarding the difference in placement of the elements of the model between the second placement and the first placement as acceleration, thereby making it possible to obtain a corrected instantaneous desired motion that improves the dynamic accuracy relative to the instantaneous desired floor reaction force (especially the dynamic accuracy related to a floor reaction force moment). In this case, a corrected instantaneous desired motion can be determined by geometric computing related to the placement of the elements without using temporal changes of the placement of the elements of the model (first-order differential values or second-order differential values of positions or postures).

Thus, the first invention makes it possible to properly correct a motion of an instantaneous desired gait without using a dynamic model (without using a differential equation or an integral equation representing a relationship between motion and force), thereby improving the dynamic accuracy of an instantaneous desired gait including the corrected motion.

Supplementally, in the first invention, it is not always necessary to actually determine the first placement, the second placement, and the third placement or to actually determine a moment component, as long as a corrected instantaneous desired motion is eventually determined, as described above.

In the first invention, the instantaneous desired motion correcting means preferably determines the corrected instantaneous desired motion such that a translational component of a resultant force F3 of the inertial forces of the elements calculated by regarding the difference in placement of the elements of the model between the third placement and the first placement as acceleration is closer to zero than a translational component of a resultant force F2 of the inertial forces of the elements calculated by regarding the difference in placement of the elements of the model between the second placement and the first placement as acceleration, and a moment component acting about the predetermined point due to the resultant force F3 is closer to the predetermined value than a moment component acting about the predetermined point due to the resultant force F2 (a second invention).

According to the second invention, a corrected instantaneous desired motion is determined such that not only the moment component approximates a predetermined value but also the translational component of the resultant force of the inertial forces of the elements related to the third and the first placements becomes closer to zero than the translational component of the resultant force of the inertial forces of the elements related to the second and the first placements. It is possible, therefore, to improve the dynamic accuracy between the corrected instantaneous desired motion and the instantaneous desired floor reaction force for both floor reaction force moment and translational floor reaction force.

According to a third invention of the gait generating device of a mobile robot of the present invention, a gait generating device equipped with an instantaneous gait generating means for sequentially generating an instantaneous desired motion of a mobile robot includes an instantaneous desired motion correcting means, wherein if the entire or a part of the mobile robot is expressed in terms of a model constructed of a plurality of elements, the elements being at least either rigid bodies having inertia or mass points, a placement of the elements of the model determined according to a predetermined first geometric restrictive condition that specifies the relationship between an instantaneous motion of the mobile robot and the placement of the elements of the model from an instantaneous desired motion generated by the instantaneous gait generating means is defined as a first placement, a placement of the elements of the model determined according to a predetermined second geometric restrictive condition that specifies the relationship between an instantaneous motion of the mobile robot and the placement of the elements of the model from a corrected instantaneous desired motion obtained by correcting at least one of the position and the posture of a predetermined part of the mobile robot in the instantaneous desired motion generated by the instantaneous gait generating means is defined as a second placement, then the instantaneous desired motion correcting means determines the corrected instantaneous desired motion such that a moment component acting about a predetermined point due to a resultant force of the inertial forces of the elements calculated by regarding the difference in placement of the elements of the model between the second placement and the first placement as acceleration becomes substantially a predetermined value.

In the third invention, "the second placement" mentioned above corresponds to "the third placement" in the first invention. According to the third invention, the corrected instantaneous desired motion is determined such that the moment component acting about a predetermined point due to a resultant force of the inertial forces of the elements calculated by regarding the difference in placement of the elements of the model between the second placement and the first placement as acceleration becomes substantially a predetermined value (a certain fixed offset value). This makes it possible to obtain a corrected instantaneous desired motion that leads to higher dynamic accuracy relative to the instantaneous desired floor reaction force (especially the dynamic accuracy related to floor reaction force moment), as with the first invention described above. In this case, a corrected instantaneous desired motion can be determined by geometric computing related to the placement of the elements without using temporal changes of the placement of the elements of the model (first-order differential values or second-order differential values of positions or postures).

Thus, the third invention also makes it possible to properly correct a motion of an instantaneous desired gait without using a dynamic model (without using a differential equation or an integral equation representing a relationship between motion and force), thereby achieving higher dynamic accuracy of an instantaneous desired gait including the corrected motion.

Supplementally, in the third invention, it is not always necessary to actually determine the first placement and the second placement or to actually determine the moment component, as long as a corrected instantaneous desired motion is eventually determined, as described above.

In the third invention, the instantaneous desired motion correcting means preferably determines the corrected instantaneous desired motion such that the translational force component of a resultant force of the inertial forces of the elements calculated by regarding the difference in placement of the elements of the model between the second placement and the first placement as acceleration becomes substantially zero, and a moment component acting about the predetermined point due to the resultant force reaches substantially the predetermined value (a fourth invention).

According to the fourth invention, a corrected instantaneous desired motion is determined such that not only the moment component approximates a predetermined value but also the translational component of the resultant force of the inertial forces of the elements related to the second and the first placements becomes substantially zero. It is possible, therefore, to improve the dynamic accuracy between the corrected instantaneous desired motion and the instantaneous desired floor reaction force for both floor reaction force moment and translational floor reaction force, as with the second invention.

In the first to the fourth inventions described above, in the aforesaid moment component, the component originated from the difference in placement (the difference in posture) of an element (rigid body) having inertia of the model will be equivalent to the product of the difference in posture of the element (the difference in inclination angle) and the value of the inertia of the element. Further, the component originated from the difference in placement (difference in position) of an element (mass point) having a mass of the model will be equivalent to a value obtained by multiplying the product (outer product) of vectors expressing the difference in position and the distance of the element from the predetermined point, respectively, by the mass of the element. In this case, a component originated from the difference in placement (difference in position) of the element having a mass will be based on the angle formed by a segment that connects one of two positions related to the difference in position and the predetermined point and a segment that connects the other of the two positions and the predetermined point (more specifically, it simply increases or decreases on the basis of the angle).

Therefore, according to a fifth invention, in the first or the second invention described above, in the moment component related to the difference in placement of the elements between the second placement and the first placement, the component originated from the difference between position A in the first placement and position B in the second placement of the elements of the model having masses is calculated from an angle formed by a segment connecting the predetermined point and the position A and a segment connecting the predetermined point and the position B by using a substantially monotonous function related to the angle, and in the moment component related to the difference in placement of the elements between the third placement and the first placement, the component originated from the difference between position A in the first placement and position C in the third placement of the elements of the model having masses is calculated using the monotonous function from the angle formed by the segment connecting the predetermined point and the position A and the segment connecting the predetermined point and the position C.

Similarly, according to a sixth invention, in the third or the fourth invention described above, in the moment component related to the difference in placement of the elements between the second placement and the first placement, the component originated from the difference between position A in the first placement and position B in the second placement of the elements of the model having mass is calculated using a substantially monotonous function related to the angle formed by the segment connecting the predetermined point and the position A and the segment connecting the predetermined point and the position B.

This arrangement obviates the need for vector computation when actually calculating the moment component, thus facilitating the calculation.

In the first to the sixth inventions described above, preferably, the instantaneous desired motion generated by the instantaneous gait generating means is determined using a dynamic model that represents the relationship between motions of the mobile robot and floor reaction forces and is constructed on the assumption that the inertial force generated by a specific motion component of at least one or more specific parts of the mobile robot is substantially zero, and the model includes an element corresponding to at least one part of the specific parts (a seventh invention).

In other words, when the instantaneous desired motion is determined using a dynamic model constructed on the assumption that the inertial force produced by a specific motion (a translational motion, a rotational motion or the like in a certain direction) of one or more specific parts of the mobile robot is substantially zero, if the specific part or parts generate a desired gait that produces a relatively large inertial force, then the dynamic accuracy between an instantaneous desired motion generated by the instantaneous gait generating means and an instantaneous desired floor reaction force tends to deteriorate. In this case, according to the seventh invention, an element corresponding to at least one part out of the specific parts is included in the model, thus making it possible to reliably enhance the dynamic accuracy between the corrected instantaneous desired motion and an instantaneous desired floor reaction force.

Further, in the first to the sixth inventions, preferably, an instantaneous desired motion generated by the instantaneous gait generating means is determined such that it satisfies a desired floor reaction force or a desired ZMP on a predetermined dynamic model representing a relationship between a motion of the mobile robot and a floor reaction force, and the first and the second geometric restrictive conditions are set such that a value obtained by adding a predetermined steady offset to the difference between a floor reaction force counterbalancing with a resultant force of the inertial forces of the elements that are generated due to temporal changes in the placement of the elements of the model determined according to the first geometric restrictive condition from the instantaneous desired motion and a floor reaction force counterbalancing with a resultant force of the inertial forces of the elements that are generated due to temporal changes in the placement of the elements of the model determined according to the second geometric restrictive condition from the instantaneous desired motion substantially coincides with an error of a floor reaction force produced on the dynamic model by the instantaneous desired motion (an eighth invention).

According to the eighth invention, the dynamic error between an instantaneous desired motion and an instantaneous desired floor reaction force generated by the instantaneous gait generating means will correspond to the difference between the placement of the elements in the case where the placement of the elements of the model is determined according to the second geometric restrictive condition (the second placement in the first invention) from the instantaneous desired motion and the placement of the elements in the placement of the elements in the case where the placement of the elements of the model is determined according to the first geometric restrictive condition (that is, the first placement). This makes it possible to securely determine a corrected instantaneous desired motion that leads to higher dynamic accuracy relative to the instantaneous desired floor reaction force. Supplementally, a steady offset generally exists in this correspondence relationship.

Further, in the first to the sixth inventions, if an instantaneous desired motion generated by the instantaneous gait generating means is determined to satisfy a desired floor reaction force or a desired ZMP on a predetermined dynamic model representing a relationship between a motion of the mobile robot and a floor reaction force, then the first and the second geometric restrictive conditions may be set such that a value obtained by multiplying the difference between the overall center-of-gravity of the placement of the elements of the model determined according to the first geometric restrictive condition from the instantaneous desired motion and the overall center-of-gravity of the placement of the elements of the model determined according to the second geometric restrictive condition from the instantaneous desired motion by the total mass of the elements substantially coincides with a value obtained by multiplying an error of the overall center-of-gravity of the dynamic model in the instantaneous desired motion by a total mass of the dynamic model (a ninth invention).

This arrangement makes it possible to cancel out the influences of a positional error of an overall center-of-gravity of the dynamic model, which is one of factors causing deterioration in dynamic accuracy between the corrected instantaneous desired motion and an instantaneous desired floor reaction force.

Further, in the first to the ninth inventions, if the mobile robot is, for example, a robot equipped with a plurality of legs or a plurality of arms extended from its body as a plurality of movable members, then the first geometric restrictive condition preferably includes a condition in which any one of the elements of the model exists on a straight line parallel to a segment connecting a predetermined point in the vicinity of a distal end of each movable member and a predetermined point in the vicinity of the connecting portion of the movable member that is connected to the body (a tenth invention). Alternatively, the first geometric restrictive condition preferably includes a condition in which the body and the movable members on the model are retained in a predetermined constant posture state (an eleventh invention). And, in the eleventh invention, the predetermined constant posture is preferably the posture in which the body and the plurality of movable members of the mobile robot are oriented substantially in the vertical direction (a twelfth invention).

Further, in the first to the twelfth inventions, the second geometric restrictive condition is preferably set such that the placement of the elements of the model determined according to the condition from an arbitrary instantaneous desired motion of the mobile robot substantially coincides with the placement of parts corresponding to the elements in the robot following the instantaneous desired motion (a thirteenth invention).

Defining the first and the second geometric restrictive conditions as described above makes it possible to ideally match the difference between the placement of the elements when the placement of the elements of the model is determined according to the second geometric restrictive condition from the aforesaid instantaneous desired motion (the second placement in the first invention) and the placement of the elements in the placement of the elements when the placement of the elements of the model is determined according to the first geometric restrictive condition from the aforesaid instantaneous desired motion (namely, the first placement) to the dynamic error between the instantaneous desired motion and the instantaneous desired floor reaction force generated by the instantaneous gait generating means.

Further, in the first to the sixth inventions, if the mobile robot is equipped with a plurality of legs or a plurality of arms extended from the body as a plurality of movable members and also has flexible joints at middle portions between the connecting portions of the movable members that connect to the body and the distal ends of the movable members, and further, if an instantaneous desired motion generated by the instantaneous gait generating means is determined using a dynamic model that represents a relationship between motions of the robot and floor reaction forces and the dynamic model is constructed on the assumption that the inertial forces produced at or near the middle portions of the movable members due to bending motions of the movable members are substantially zero, then the model is preferably a model that contains, as an element, a mass point associated with at least the middle portion or a portion near the middle portion of each movable member (a fourteenth invention).

More specifically, if an instantaneous desired motion is created, assuming that the inertial force generated at or near the middle portion of each movable member due to the bending motion of the movable member is substantially zero (in other words, the inertial force being ignored), then the dynamic accuracy between the instantaneous desired motion generated by the instantaneous gait generating means and an instantaneous desired floor reaction force tends to deteriorate when a desired gait in which the bending motion of each movable member is performed relatively quickly is generated. Therefore, as with the fourteenth invention, including a mass point associated with the middle portion or the portion close thereto of each movable member in the model makes it possible to determine a corrected instantaneous desired motion so as to compensate for the influence of the inertial force produced by the bending motion of each movable member produced by the bending operation of the joint of the middle portion of the movable member when determining the corrected instantaneous desired motion as explained in the first to the sixth inventions above. This arrangement makes it possible to improve the dynamic accuracy between the corrected instantaneous desired motion and the instantaneous desired floor reaction force. In other words, it is possible to obtain an instantaneous gait that exhibits higher dynamic accuracy than an instantaneous gait generated by the instantaneous gait generating means does.

In the fourteenth invention, the first geometric restrictive condition may be set in the same manner as that in, for example, the tenth invention or the eleventh invention, and the second geometric restrictive condition may be set as with the thirteenth invention. And, it is preferred to set especially the first and the second geometric restrictive conditions as with the tenth invention and the thirteenth invention, respectively.

More specifically, it is preferred that the first geometric restrictive condition includes a condition in which a mass point associated with the middle portion or the portion close thereto of each movable member of the elements of the model exists on the segment that connects a predetermined point in the vicinity of the distal portion of the movable member and a predetermined point in the vicinity of the connecting portion of the movable member that links with the body, and the second geometric restrictive condition is set such that the placement of the elements of the model determined according to the condition from an arbitrary instantaneous desired motion of the mobile robot substantially coincides with the placement of parts corresponding to the elements in the robot following the instantaneous desired motion (a fifteenth invention).

With this arrangement, when the placement of the elements of the model is determined according to the second geometric restrictive condition (the second placement specified in the aforesaid first invention) from an instantaneous desired motion generated by the instantaneous gait generating means, the positional difference between the mass point of the model that is associated with the middle portion or a portion close thereto of each movable member in the placement (hereinafter referred to as "the movable member middle mass point") and the movable member middle mass point (this exists on the aforesaid segment) in the first placement will correspond to an inertial force attributable to the bending motion of the joint of the middle portion of each movable member. Hence, it is possible to properly determine a corrected instantaneous desired motion that compensates for the influence of the inertial force produced by the bending motion of the movable member due to the bending operation of a joint of the middle portion of each movable member, thus permitting higher dynamic accuracy to be achieved.

In the fifteenth invention, if at least only one of an instantaneous position and an instantaneous posture of the body in an instantaneous desired motion is corrected, then the amount of a correction of at least one of the instantaneous position and the instantaneous posture of the body from the instantaneous desired motion to the aforesaid corrected instantaneous desired motion will be eventually determined on the basis of the relative position of the middle portion or a portion close thereto of each movable member relative to the segment or the bending angle of the joint of the middle portion. And, in this case, if the movable member is a leg, then the aforesaid correction amount has a characteristic correlation with the relative position or the bending angle. Thus, sixteenth to twentieth inventions shown below are made.

Specifically, according to the sixteenth invention, a gait generating device of a mobile robot, comprising an instantaneous gait generating means for sequentially generating an instantaneous desired motion of a mobile robot that is equipped with a plurality of legs extended from its body and has a flexible joint at a middle portion between a connecting portion of each leg that connects to the body and the distal portion of the leg, the instantaneous desired motion being generated by using a dynamic model that represents the relationship between a motion of the robot and a floor reaction force and is configured on the assumption that the inertial force produced at or near the middle portion of the leg due to a bending motion of each leg is substantially zero, comprises an instantaneous desired motion correcting means that corrects an instantaneous desired motion such that, when generating a gait in which the joint of the middle portion of each leg is bent to reduce the length of a segment connecting a predetermined point in the vicinity of the distal portion of each leg and a predetermined point in the vicinity of the connecting portion of the leg that links to the body so as to protrude the joint in the direction intersecting with the segment at least from a state wherein the robot is in an upright posture state or a state of posture close thereto, the position of the connecting portion between the body and each leg is changed from the position of the connecting portion determined by an instantaneous desired motion generated by the instantaneous gait generating means to substantially the opposite direction from the direction into which the joint of the middle portion of the leg protrudes, and also the position of an upper end relative to a lower end of the body is changed from the position of the upper end relative to the lower end of the body determined by an instantaneous desired motion generated by the instantaneous gait generating means to substantially the same direction as the direction into which the joint of the middle portion of the leg protrudes.

According to the sixteenth invention, when generating a gait in which the joint of the middle portion of each leg is bent to reduce the length of a segment connecting a predetermined point in the vicinity of the distal portion of each leg and a predetermined point in the vicinity of the connecting portion of the leg that links to the body at least from a state wherein the robot is in an upright posture or a state of posture close thereto, in a corrected instantaneous desired motion, the connecting portion is shifted to substantially the opposite direction from the direction into which the joint of the middle portion of the leg protrudes, and also the position of an upper end relative to a lower end of the body is shifted to substantially the same direction as the direction into which the joint of the middle portion of the leg protrudes, as compared with the original instantaneous desired motion (the instantaneous desired motion generated by the instantaneous gait generating means). As a result, an instantaneous desired motion can be corrected so as to improve dynamic accuracy by compensating for an influence of an inertial force produced by a bending operation of the joint of the middle portion of each leg, which is not considered in the instantaneous desired motion generated by the instantaneous gait generating means. Consequently, therefore, the same advantages as those of the aforesaid fifteenth invention can be secured.

According to seventeenth and nineteenth inventions, a gait generating device of a mobile robot, which is equipped with an instantaneous gait generating means for sequentially generating an instantaneous desired motion of a mobile robot that is equipped with a plurality of legs or a plurality of arms extended from its body as a plurality of movable members and also has flexible joints at middle portions between the connecting portions of the movable members that connect to the body and the distal portions of the movable members, the instantaneous desired motion being generated using a dynamic model that represents a relationship between a motion of the robot and a floor reaction force and the dynamic model is constructed on the assumption that the inertial forces produced at or near the middle portions of the movable members due to bending motions of the movable members are substantially zero, comprises an instantaneous desired motion correcting means for correcting an instantaneous desired motion by determining the correction amount of at least either the body position or the body posture of an instantaneous desired motion generated by the instantaneous gait generating means according to a feedforward control law on the basis of the bending angle of the joint of the middle portion of the movable member, and then correcting at least either the body position or the body posture of the instantaneous desired motion on the basis of the determined correction amount (a seventeenth invention). Alternatively, the gait generating device of a mobile robot comprises an instantaneous desired motion correcting means for correcting an instantaneous desired motion by determining a correction amount of at least either the body position or the body posture of an instantaneous desired motion generated by the instantaneous gait generating means according to the feedforward control law on the basis of the relative position of the segment connecting a predetermined point near the distal portion of each movable member and a predetermined point near the connecting portion between the movable member and the body and the center of the joint of the middle portion of the movable member or the center-of-gravity of the link connected to the joint, in the direction for intersecting with the segment, and then correcting at least either the body position or the body posture of the instantaneous desired motion on the basis of the determined correction amount (a nineteenth invention).

In these seventeenth and nineteenth inventions, the correction amount of at least either the body position or the body posture of the instantaneous desired motion is directly determined according to the feedforward control law on the basis of the bending angle of the joint of the middle portion of the leg or on the basis of the relative position of the segment and the center of the joint of the middle portion of the movable member or the center-of-gravity of the link connected to the joint in the direction for intersecting with the segment (e.g., the distance from the segment). This makes it possible to correct the instantaneous desired motion so as to improve dynamic accuracy by compensating for an influence of an inertial force produced by a bending operation of the joint of the middle portion of each leg, which is not considered in the instantaneous desired motion generated by the instantaneous gait generating means. In this case, the correction amount is determined according to the feedforward control law, thus making it possible to determine a correction amount that immediately compensates for the influence of the inertial force at every instant.

And, in the seventeenth invention, if the individual movable members are legs, then the instantaneous desired motion correcting means preferably determines the correction amount such that the body posture of the instantaneous desired motion is further inclined forward and the position of the overall center-of-gravity of the mobile robot, excluding the plurality of movable members, is displaced further backward, as the bending angle of the joint of the middle portion of the movable member increases (an eighteenth invention). Similarly, in the nineteenth invention, if the movable members are legs, then the instantaneous desired motion correcting means preferably uses the distance between the segment and the center of the joint of the middle portion of the movable member or the center-of-gravity of the link connected to the joint as the relative position, and determines the correction amount such that the body posture of the instantaneous desired motion is inclined further forward and the position of the overall center-of-gravity of the mobile robot, excluding the plurality of movable members, is displaced further backward, as the distance increases (a twentieth invention).

Thus, the bending angle of the joint of the middle portion of each movable member (each leg) and the correction amount related to at least either a body position or a body posture are correlated, or the distance between the segment and the center of the joint of the middle portion of each movable member (leg) or the center-of-gravity of the link connected to the joint and the correction amount related to at least either a body position or a body posture are correlated. With this arrangement, as with the seventeenth invention, it is possible to correct the instantaneous desired motion so as to improve dynamic accuracy by compensating for an influence of an inertial force produced by a bending operation of the joint of the middle portion of each leg.

BEST MODE FOR CARRYING OUT THE INVENTION

Referring now to the accompanying drawings, embodiments of the present invention will be explained. In the embodiments in the present description, for mobile robots, bipedal mobile robots will be used as examples.

FIG. 1 is a schematic diagram showing the outline of the entire construction of a bipedal mobile to which an embodiment of the present invention will be applied.

As shown in the figure, a bipedal mobile robot (hereinafter referred to as "the robot") 1 is equipped with a pair of right and left legs 2, 2 extended downward from a body (a base body of the robot 1) 3. The two legs 2, 2 share the same construction, each having six joints. The six joints of each leg are comprised of, in the following order from the body 3 side, joints 10R, 10L for swinging (rotating) a hip (waist)(for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction. In the present description, the symbols R and L mean that they correspond to the right side and the left side, respectively, of the robot 1.

A foot (foot portion) 22R (L) constituting a distal portion of each leg 2 is attached to the bottoms of the two joints 18R (L) and 20R (L) of the ankle of each leg 2. The body 3 is installed at the uppermost top of the two legs 2, 2 through the intermediary of the three joints 10R (L), 12R (L) and 14R (L) of the hip of each leg 2. A control unit 60 or the like, which will be discussed in detail hereinafter, is housed inside the body 3. For convenience of illustration, the control unit 60 is shown outside the body 3 in FIG. 1.

In each leg 2 having the aforesaid construction, a hip joint (or a waist joint) is formed of the joints 10R (L), 12R (L) and 14R (L), the knee joint is formed of the joint 16R (L), and the ankle joint is formed of the joints 18R (L) and 20R (L). The hip joint and the knee joint are connected by a thigh link 24R (L), and the knee joint and the ankle joint are connected by a crus link 26R (L).

In the present description, a "link" of the robot 1 is used to mean a part that can be regarded as a rigid body of the robot 1. For example, the body 3 is also one link (rigid body), and in this sense, the body 3 may be referred to as a body link.

A pair of right and left arms 5, 5 is attached to both sides of an upper portion of the body 3, and a head 4 is disposed at a top end of the body 3. Each arm 5 is provided with a shoulder joint composed of three joints 30R (L), 32R (L), and 34R (L), an elbow joint composed of a joint 36 R(L), a wrist joint composed of a joint 38R (L), and a hand 40R (L) connected to the wrist joint. The shoulder joint and the elbow joint, and the elbow joint and the wrist joint are connected, respectively, by links.

The construction of the robot 1 described above imparts six degrees of freedom to the foot 22R (L) of each leg 2 relative to the body 3. During a travel, such as walking, of the robot 1, desired motions of the two feet 22R and 22L can be accomplished by driving 6*2=12 joints of the two legs 2, 2 together ("*" in the present description denotes multiplication as scalar calculation, while it denotes an outer product in vector calculation) at appropriate angles. This arrangement enables the robot 1 to arbitrarily move in a three-dimensional space. Furthermore, each arm 5 can perform a motion, such as arm swinging, by rotating the shoulder joint, the elbow joint, and the wrist joint thereof.

As shown in FIG. 1, a publicly known six-axis force sensor 50 is provided under the ankle joints 18R (L), 20R (L) and between the ankle joints and the foot 22R (L) of each legs 2. The six-axis force sensor 50 detects primarily whether the foot 22R (L) of each leg 2 is in contact with the ground and a floor reaction force (landing load) acting on each leg 2, and it outputs detection signals of three-direction components Fx, Fy, and Fz of a translational force of the floor reaction force and three-direction components Mx, My, and Mz of a moment to the control unit 60. Furthermore, the body 3 is equipped with a posture sensor 54 for detecting an inclination angle of the body 3 relative to a Z-axis (vertical direction (gravitational direction)) and an angular velocity thereof, detection signals thereof being output from the posture sensor 54 to the control unit 60. The posture sensor 54 is provided with an accelerometer and a gyro sensor, which are not shown, and the detection signals of these sensors are used to detect inclination angles of the body 3 and angular velocities thereof. Although detailed structures are not shown, each joint of the robot 1 is provided with an electric motor 64 (refer to FIG. 3) for driving the joint, and an encoder (rotary encoder) 65 (refer to FIG. 3) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 3) for manipulating the robot 1 is provided on the exterior of the robot 1. The joystick 73 is constructed in such a manner that a request regarding a gait of the robot 1, such as a request for turning the robot 1 that is traveling straight, is input to the control unit 60 as necessary by operating the joystick 73. Communication between the joystick 73 and the control unit 60 is effected by wire or wireless means.

FIG. 2 schematically shows the basic construction of the distal portion (including each foot 22R(L)) of each leg in the present embodiment. As shown in the diagram, a spring mechanism 70 is installed between each foot 22R (L) and the six-axis force sensor 50, and a foot sole elastic member 71 made of rubber or the like is bonded to a foot sole (the bottom surface of each foot 22R (L)). These spring mechanism 70 and the foot sole elastic member 71 constitute a compliance mechanism 72. Although no detailed illustration is given, the spring mechanism 70 is constructed of a square guide member (not shown), which is installed on the upper surface of the foot 22R (L), and a piston-shaped member (not shown) installed adjacently to the ankle joint 18R (L) (the ankle joint 20R (L) being omitted in FIG. 2) and the six-axis force sensor 50, and housed in the guide member through the intermediary of an elastic member (rubber or spring) so that it may be jogged.

The foot 22R (L) indicated by a solid line in FIG. 2 is in a state wherein it is being subjected to no floor reaction force. When each leg 2 is subjected to a floor reaction force, the spring mechanism 70 and the foot sole elastic member 71 of the compliance mechanism 72 flex, causing the foot 22R (L) to shift to the position/posture illustrated by a dashed line in the figure. The structure of the compliance mechanism 72 is important not only to ease a landing impact but also to enhance controllability. The details thereof have been explained in, for example, Japanese Unexamined Patent Publication Application No. 5-305584 previously proposed by the present applicant, so that no further explanation in the present description will be given.

FIG. 3 is a block diagram showing a construction of the control unit 60. The control unit 60 is comprised of a microcomputer, and includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg 2, the posture sensor 54 (an accelerometer and a rate gyro sensor), the joystick 73, etc. are converted into digital values by the A/D converter 80 and sent to the RAM 84 via the bus line 82. Outputs of the encoder 65 (rotary encoder) of each joint of the robot 1 are supplied to the RAM 84 via the counter 86.

As will be discussed hereinafter, the first calculator 90 generates desired gaits, calculates a joint angle displacement command (a command value of a displacement angle of each joint or a rotational angle of each electric motor 64), and sends the calculation result to the RAM 84. The second calculator 92 reads the joint angle displacement command and an actual measurement value of a joint angle detected on the basis of an output signal of the encoder 65 from the RAM 84 to calculate a manipulated variable required for driving each joint. And, the calculated variable is output to the electric motor 64 for driving each joint through the intermediary of the D/A converter 96 and a servo amplifier 64a.

FIG. 4 is a block diagram showing major functional construction of the control unit 60 of the robot 1 in an embodiment in the present description. A portion except for the "actual robot" in FIG. 4 is constituted of processing functions implemented by the control unit 60 (primarily the functions of the first calculator 90 and the second calculator 92). The processing function is implemented by programs or the like installed in the control unit 60. In the following explanation, the symbols R and L will be omitted as long as it is not particularly necessary to discriminate right and left of each part of the robot 1 (the legs 2, the arms 5, etc.).

An explanation will now be given. The control unit 60 is equipped with a gait generating device 100 that generates and outputs desired gaits of the robot 1 freely in real time. The gait generating device 100 implements an embodiment of the present invention by its functions. A desired gait output by the gait generating device 100 is constituted of a corrected desired body posture trajectory (a trajectory of desired postures of the body 3), a corrected desired body position trajectory (a trajectory of desired positions of the body 3), a desired foot position/posture trajectory (a trajectory of desired positions and desired postures of each foot 22), a desired arm posture trajectory (a trajectory of desired postures of each arm), a desired ZMP (desired overall floor reaction force central point) trajectory, a trajectory of corrected desired floor reaction force moments about a desired ZMP, and a desired overall floor reaction force trajectory. If a movable part (a head or the like) relative to the body 3 is provided in addition to the legs 2 and the arms 5, then a desired position/posture trajectory of the movable part is added to a desired gait.

Here, the definitions or the like of basic terms related to gaits in the present description will be explained. The term "trajectory" in a gait means a temporal change pattern (time series pattern), and may be referred to as "pattern" in place of "trajectory." Furthermore, a "posture" means a spatial orientation. For example, a posture of the body is represented by an inclination angle (posture angle) of the body 3 in the roll direction (about the X-axis) relative to the Z-axis (vertical axis) and an inclination angle (posture angle) of the body 3 in the pitch direction (about the Y-axis). A foot posture is represented by means of a spatial azimuth of two axes fixedly set on each foot 22. In the present description, a body posture may be referred to as a body posture angle. A desired arm posture related to the arms 5 is represented by means of relative posture in relation to the body 3 in the embodiments of the present description.

The position of the body means the position of a predetermined representative point of the body 3 (a certain fixed point on a local coordinate system arbitrarily and fixedly set relative to the body 3). Similarly, the position of a foot means the position of a predetermined representative point of each foot 22 (a fixed point on a local coordinate system arbitrarily and fixedly set relative to each foot 22). For example, the representative point of each foot 22 is set on the bottom surface of each foot 22 (more specifically, for example, a point at which a perpendicular line from the center of the ankle joint of each leg 2 to the bottom surface of each foot 22 intersects with the bottom surface).

The aforesaid corrected desired body posture and corrected desired body position related to the body 3 are obtained by correcting certain basic desired body posture (provisional desired body posture) and desired body position (provisional desired body position). In the embodiments of the present description, displacement dimension corrected body position/posture, which will be discussed hereinafter, correspond to the basic desired body position/posture.

In the explanation hereinafter, the term "desired" will be frequently omitted if there is no danger of misunderstanding.

In a gait, the constituent elements except for those related to a floor reaction force, namely, the constituent elements related to the position/posture of each part of the robot 1, such as foot position/posture and body position/posture, are referred generically to "motions." Further, a floor reaction force acting on each foot 22 (a floor reaction force composed of a translational force and a moment) is referred to as "the floor reaction force of each foot," and the resultant force of "the floor reaction forces of individual feet" related to all (two) feet 22R and 22L of the robot 1 is referred to "the overall floor reaction force." However, in the following explanation, the floor reaction force of each foot will be hardly referred to, so that "the floor reaction force" will be handled as synonymous with "the overall floor reaction force" unless otherwise specified.

A desired floor reaction force is generally represented in terms of a point of action and a translational force and moment acting on the point. The point of action can be set anywhere, so that innumerable expressions are conceivable for the same desired floor reaction force; if, however, a desired floor reaction force is represented using, in particular, a desired floor reaction force central point (the desired position of the central point of a total floor reaction force) as the point of action, then the moment component of the desired floor reaction force except for a vertical component (the moment component about a vertical axis (Z-axis)) will be zero. In other words, a horizontal component (the moment about a horizontal axis (X-axis and Y-axis)) of the moment of the desired floor reaction force about the desired floor reaction force central point will be zero.

In a gait that satisfies a dynamic balance condition, the ZMP calculated from a desired motion trajectory of the robot 1 (the point where the moment except for its vertical component, which acts about the point due to the resultant force of the inertial force calculated from the desired motion trajectory and the gravity acting on the robot 1, becomes zero) coincides with the desired floor reaction force central point. This is equivalent to providing a desired ZMP trajectory in place of a desired floor reaction force central point.

Here, when walking of the robot 1 is performed, the vertical component of a translational floor reaction force is subordinately determined as the vertical position of the body 3 (body height) of the robot 1 is determined by the technique for determining a body height previously proposed in, for example, Japanese Unexamined Patent Application Publication 10-86080 by the present applicant. Furthermore, the horizontal component of the translational floor reaction force is also subordinately determined as the body horizontal position trajectory (or the positional trajectory of the overall center-of-gravity) of the robot 1 is determined such that the horizontal component of the moment generated about a desired ZMP by the resultant force of an inertial force attributable to a motion of a desired gait and gravity becomes zero. For this reason, when performing the walking of the robot 1, only the desired ZMP may be set as the physical amount to be explicitly set in relation to the floor reaction force of the desired gait.

Meanwhile, if a travel of the robot 1, e.g., running of the robot 1, is performed with a gait that includes a period during which the floor reaction force becomes zero or substantially zero, then a translational floor reaction force vertical component is also important in controlling the operation of the robot 1. Hence, it is preferred to explicitly set the desired trajectory of the translational floor reaction force vertical component and then to determine the trajectory of a desired body vertical position or the like of the robot 1. Also, when the walking of the robot 1 is performed, if the robot 1 is to travel on a floor surface with a low frictional coefficient (on a low-μ road), it is preferred to explicitly set the desired trajectory of the translational floor reaction force vertical component to prevent slippage or the like of the robot 1, because the translational floor reaction force vertical component (to be more strict, the component of the translational floor reaction force that is perpendicular to the floor surface) influences a frictional force. Furthermore, according to the embodiments of the present invention, in a desired gait finally output by the gait generating device 100, a corrected desired floor reaction force moment (a moment whose horizontal component is not necessarily zero) is generated about a desired ZMP.

Thus, in the embodiments of the present description, the constituent elements related to the floor reaction forces of desired gaits output from the gait generating device 100 include a corrected desired floor reaction force moment about a desired ZMP and a desired translational floor reaction force vertical component in addition to a desired ZMP trajectory.

And, in the present description, a desired gait output by the gait generating device 100 is used to mean "a set of a desired motion trajectory and a desired floor reaction force trajectory in the period of one step or a plurality of steps" in a broad sense, and to mean "a set of a desired motion trajectory and a desired floor reaction force trajectory that includes a desired ZMP, a corrected desired floor reaction force moment and a desired translational floor reaction force vertical component in the period of one step" in a narrow sense.

However, according to the embodiments of the present description, in a desired gait (provisional desired gait) prepared in the process before a final desired gait (a desired gait output from the gait generating device 100) is determined, the horizontal component of a desired floor reaction force moment about a desired ZMP is set to zero as defined by an original desired ZMP. Accordingly, in a provisional desired gait (a simplified model gait or a displacement dimension corrected gait to be discussed hereinafter) other than a desired gait that is finally determined, a gait obtained by removing a corrected desired floor reaction force moment from the desired gait in the aforesaid narrow sense is used as the one meant to be a desired gait. Supplementally, according to the embodiments in the present description, a desired gait (a provisional desired gait) prepared in the process before a final desired gait (a desired gait output by the gait generating device 100) is determined is closely associated with the present invention. Hence, the majority of a desired gait appearing in the following explanation will be used to mean a gait (a gait that satisfies a desired ZMP) obtained by removing a corrected desired floor reaction force moment from a desired gait in the narrow sense.

In the following explanation, "a floor reaction force vertical component" will mean "a translational floor reaction force vertical component," and the vertical component (a component about a vertical axis) of the moment in a floor reaction force will use the term "moment" to distinguish it from "a floor reaction force vertical component." Similarly, "a floor reaction force horizontal component" will mean "a translational floor reaction force horizontal component."

"One step" of a desired gait will be used to mean a period from the moment one leg 2 of the robot 1 lands to the moment the other leg 2 lands.

A double stance period in a gait refers to a period during which the robot 1 supports its own weight by the two legs 2, 2. A single stance period refers to a period during which the robot 1 supports its own weight only by one leg 2, and a floating period refers to a period during which both legs 2, 2 are apart from a floor (floating in the air). In the single stance period, the leg 2 not supporting the self-weight of the robot 1 is referred to as a "free leg." A running gait of the robot 1, in which the single stance period and the floating stance period are alternately repeated, does not have the double stance period. In this case, during the floating period, both legs 2, 2 do not support the self-weight of the robot 1; however, for the sake of convenience, the leg 2 that was a free leg and the leg 2 that was a supporting leg during a single stance period immediately before the floating period will be referred to as a "free leg" and a "supporting leg," respectively, even in the floating period.

The trajectory of a desired gait is described using a global coordinate system (a coordinate system fixed to a floor). As a global coordinate system, a supporting leg coordinate system defined, for example, on the basis of landing position/posture of the supporting leg foot 22 is used. This supporting leg coordinate system is, for example, a coordinate system in which the point at which a perpendicular line extended to a floor surface from the center of the ankle joint to which the foot 22 is connected intersects with the floor, while substantially the entire bottom surface of the supporting leg foot 22 is in contact with the floor, is defined as the origin, and when the supporting leg foot 22 is projected onto a horizontal plane that passes the origin, the longitudinal direction of the foot is defined as the X-axis direction and the lateral direction is defined as the Y-axis (the Z-axis direction being the vertical direction).

FIG. 5 is a block diagram showing the details of the gait generating device 100. Referring to this FIG. 5, more specific overview of the processing of the gait generating device 100 will be explained below.

As illustrated, the gait generating device 100 is equipped with a gait parameter determiner 100a. The gait parameter determiner 100a determines the values of gait parameters that define a desired gait or a time series table.

According to the embodiments of the present description, gait parameters determined by the gait parameter determiner 100a include the parameters that define a desired foot position/posture trajectory, a desired arm posture trajectory, a desired ZMP trajectory, and a desired floor reaction force vertical component trajectory, respectively, of a desired gait.

When the gait generating device 100 generates a desired gait, estimated landing position/posture and estimated landing time of the free leg foot 22, or basic required values (required parameters) for generating a gait, such as the length of a step and moving speed, are supplied to the gait generating device 100 from the joystick 73 or an action planner (a device for preparing action plans of the robot 1), which is not shown. Alternatively, the gait generating device 100 reads the required parameters from a storage medium in which the required parameters have been stored beforehand and retained. Then, the gait parameter determiner 100a of the gait generating device 100 determines gait parameters on the basis of the required parameters.

In the embodiments of the present description, the gait parameters determined by the gait parameter determiner 100a also include parameters that define a reference body posture trajectory, a ZMP permissible range, and a floor reaction force horizontal component permissible range, respectively.

Although the reference body posture trajectory is not the one finally output from the gait generating device 100, it is referred to when determining a desired gait. The reference body posture trajectory is supplied in relation to the body posture of the robot 1 from the joystick 73 or the action planner, or it is a body posture trajectory generated directly on the basis of a requirement (a requirement for retaining a body posture at a vertical posture, or the like) that has been set in advance. A desired body posture (hereinafter, "body posture" with no "reference" attached thereto will indicate a desired body posture) is generated such that it follows or coincides with a reference body posture for a long time.

To add a supplemental explanation regarding the ZMP permissible range, in the embodiments of the present description, a desired gait is corrected so as to generate a corrected desired floor reaction force moment (this being generally not zero) about a desired ZMP. Therefore, the desired ZMP will be a point having a different definition from an original definition (the definition in that it is a point with zero floor reaction force moment horizontal component), and a ZMP that satisfies the original definition (hereinafter referred to as "true ZMP") moves to a position shifted from the desired ZMP by a value obtained by dividing the corrected desired floor reaction force moment by a desired floor reaction force vertical component.

The true ZMP of a corrected gait (the desired gait finally output from the gait generating device 100) must be within a range wherein at least ZMP can exist (referring to a so-called supporting polygon. A range wherein a floor reaction force central point (ZMP) can exist when it is assumed that no adhesive force acts between a floor and the bottom surface of the foot 22). Further, in order to secure a sufficient stability allowance of the robot 1, the true ZMP of a corrected gait preferably lies in a range in the vicinity of the center in the range wherein the ZMP can exist. Hence, in the embodiments of the present description, a permissible range wherein a true ZMP of a corrected gait can exist is provided. This range will be called a ZMP permissible range. The ZMP permissible range is set to coincide with a range wherein a ZMP can exist or to be included in a range wherein a ZMP can exist.

As described above, the value obtained by dividing a corrected desired floor reaction force moment about a desired ZMP by a desired floor reaction force vertical component indicates the amount of positional deviation of a true ZMP from the desired ZMP; therefore, the amount of positional deviation of the true ZMP from the desired ZMP (a ZMP-conversion value of a corrected desired floor reaction force moment) may be set instead of setting the corrected desired floor reaction force moment about the desired ZMP. Moreover, a ZMP permissible range can be converted into a permissible range of a corrected desired floor reaction force moment by using the position of its boundary and a desired floor reaction force vertical component, and the permissible range of the corrected desired floor reaction force moment may be set in place of a ZMP permissible range.

The floor reaction force horizontal component permissible range is the permissible range of a floor reaction force horizontal component that makes it possible to generate a frictional force having a magnitude that prevents the foot 22 from slipping between the surface of foot 22 of the robot 1 that is in contact with a floor. According to the embodiments of the present description, at least a motion of a desired gait (a desired motion) finally output from the gait generating device 100 is generated such that a floor reaction force horizontal component balancing out the horizontal component of an inertial force of the robot 1 that is produced thereby falls within a floor reaction force horizontal component permissible range.

The gait parameters determined by the gait parameter determiner 100a are input to a desired instantaneous value generator 100b The desired instantaneous value generator 100b sequentially calculates (generates) instantaneous values (values at every predetermined control processing cycle of the control unit 60) of some constituent elements of a desired gait, such as a reference body posture, a desired foot position/posture, a desired ZMP, and a desired floor reaction force vertical component, on the basis of the input gait parameters. FIG. 5 shows only some desired instantaneous values as typical ones.

The desired instantaneous values calculated by the desired instantaneous value generator 100b are input to a simplified model gait generator 100c. Based on the input desired instantaneous values, the simplified model gait generator 100c calculates the instantaneous value of a desired body position/posture (provisional desired body position/posture), using a dynamic model, which approximately expresses the relationship between motions of the robot 1 and floor reaction forces and which will be discussed later (hereinafter referred to as a simplified model). The simplified model gait generator 100c calculates the instantaneous value of a desired body position/posture such that a dynamic balance condition on the simplified model is satisfied, that is, the horizontal component of a moment generated about a desired ZMP by the resultant force of the inertial force produced by a desired motion of the robot 1 and the gravity acting on the robot 1 on the simplified model becomes zero. Supplementally, according to the embodiments in the present description, a desired floor reaction force vertical component trajectory is also explicitly set, so that the instantaneous value of a desired body position/posture is determined such that the horizontal component of the moment generated about a desired ZMP by the resultant force of the inertial force produced due to a desired motion and the gravity acting on the robot 1 becomes zero and also, the translational force vertical component of the resultant force (in other words, the resultant force of the inertial force due to the translational motion in the vertical direction of the overall center-of-gravity of the robot 1 and the gravity) balances out the desired floor reaction force vertical component.

Thus, instantaneous values of a desired gait (provisional desired gait) including a desired body position/posture are sequentially determined. Hereinafter, a desired gait having the desired body position/posture determined by the simplified model gait generator 100c as its constituent element will be referred to as a simplified model gait. The desired instantaneous values input to the simplified model gait generator 100c do not have to be all desired instantaneous values calculated by the desired instantaneous value generator 100b. The inputs necessary for the simplified model gait generator 100c depend on the structure of a simplified model or the restrictive conditions added thereto, as necessary. For instance, in FIG. 5, a desired foot position/posture is supplied to the simplified model gait generator 100c, whereas it is unnecessary to supply a desired foot position/posture in the simplified model to be discussed later in a first embodiment.

The simplified model gait generator 100c and the desired instantaneous value generator 100b together constitute the instantaneous gait generating means in the present invention.

The desired body position/posture calculated by the simplified model gait generator 100c is input to a displacement dimension gait corrector 100d. The displacement dimension gait corrector 100d receives the instantaneous value of a desired foot position/posture and the instantaneous value of a desired ZMP in addition to the desired body position/posture. However, supplying a desired ZMP to the displacement dimension gait corrector 100d is not essential, and more generally, a central point related to an angular momentum product, which will be discussed later, is supplied thereto. In FIG. 5, as an example of the central point, a desired ZMP is supplied to the displacement dimension gait corrector 100d. In a third embodiment to be discussed later, the displacement dimension gait corrector 100d receives the instantaneous value of a desired arm posture in addition to the aforesaid input values.

Based on the supplied instantaneous value of the desired body position/posture or the like, and by using first and second displacement dimension correcting models to be discussed later, the displacement dimension gait corrector 100d determines the instantaneous values of the displacement dimension corrected body position/posture obtained by correcting the desired body position/posture determined by the simplified model gait generator 100c. Although details will be described later, the first and the second displacement dimension correcting models are usually formed of models (geometric models) constructed of at least either mass points or links having inertia as elements, and the placement of the elements (the positions of the mass points and the postures of the links) are associated with the position and posture of one or more parts in an instantaneous motion of the robot 1. In this case, these first and second displacement dimension correcting models are both constructed of the same elements. However, in these first and second displacement dimension correcting models, geometric restrictive conditions that are different from each other are established on the placement of the elements thereof, and an arbitrary instantaneous desired motion of the robot 1 (the instantaneous values of the position/posture of each part of the robot 1) is associated with the placement of an element of each displacement dimension correcting model that corresponds thereto according to each separate geometric restrictive condition. Hence, when a certain desired instantaneous motion is given, the placements of the elements of the displacement dimension correcting models corresponding thereto are usually different from each other. In general, the displacement dimension gait corrector 100*d* sequentially corrects the instantaneous desired motions of simplified model gaits on the basis of the difference in the placement of elements between these first and second displacement dimension correcting models (the difference of the positions of mass points or the difference of posture angles of links). In each embodiment of the present description, the displacement dimension gait corrector 100*d* corrects a desired body position/posture in the instantaneous desired motion of a simplified model gait on the basis of the difference in placement of the elements between the two displacement dimension correcting models, thereby sequentially determining the instantaneous values of displacement dimension corrected body positions/postures.

The instantaneous values of the displacement dimension corrected body position/posture determined by the displacement dimension gait corrector 100*d* are supplied to a full model corrector 100*e*. Supplied to the full model corrector 100*e* are the desired instantaneous values (except for the instantaneous values of reference body positions/postures) calculated by the desired instantaneous value generator 100*b* in addition to the instantaneous values of displacement dimension corrected body positions/postures. The full model corrector 100*e* uses a full model as a dynamic model having higher dynamic accuracy than a simplified model to calculate corrected desired body positions/postures obtained by correcting displacement dimension body positions/postures, and it also calculates a corrected desired floor reaction force moment, which is the desired value of a floor reaction force moment horizontal component about a desired ZMP.

More generally, the full model corrector 100*e* carries out processing E1 or E2 to satisfy the following conditions D1 to D3. Specifically, the full model corrector 100*e*:

E1) corrects the body position/posture of the displacement dimension corrected gait, or E2) corrects the body position/posture of the displacement dimension corrected gait and also outputs a corrected desired floor reaction force moment about a desired ZMP (corrects a desired floor reaction force) in order to satisfy the following conditions.

D1) A dynamic balance condition is satisfied with accuracy that is higher than the gait (hereinafter referred to as the displacement dimension corrected gait) obtained by correcting a gait generated using a simplified model (a simplified model gait) by using a displacement dimension correcting model;

D2) A true ZMP (a ZMP satisfying the original definition that has been corrected by generating a corrected desired floor reaction force moment about a desired ZMP) lies within a ZMP permissible range (a permissible range that allows a sufficient stability allowance to be maintained).

D3) A floor reaction force horizontal component lies within a floor reaction force horizontal component permissible range.

In the embodiments of the present description, the processing of E2 is carried out to satisfy the conditions D1 to D3. The processing by the full model corrector 100*e* in the embodiments of the present description is the same as that explained in detail in, for example, PCT international publication WO/03/057427/A1 previously proposed by the present applicant (specifically, the processing of S038 shown in FIG. 13 of the publication). Hence, detailed explanation of the processing by the full model corrector 100*e* in the present description will be omitted.

Referring back to FIG. 4, the instantaneous values of a desired gait, including the instantaneous values of a corrected desired body position/posture, a corrected desired floor reaction force moment about a desired ZMP, and desired foot position/posture determined as described above are supplied to a composite-compliance control unit 101 (the portion enclosed by the dashed line in FIG. 4). The composite-compliance control unit 101 controls a joint actuator (an electric motor 64) so as to follow the desired gait, while maintaining the balance of the robot 1.

The above provides the outline of the gait generating device 100. The outline of the gait generating device 100 explained above will applied to all embodiments in the present description.

First Embodiment

A first embodiment in accordance with the present invention will now be specifically explained. First, the simplified model (dynamic model), the first displacement dimension correcting model, and the second displacement dimension correcting model in the first embodiment will be explained. Incidentally, the first embodiment is an embodiment according to the first to the ninth inventions and the eleventh to the fourteenth and the sixteenth inventions described above.

FIG. 6 shows the structure of a simplified model in the first embodiment. As illustrated, the simplified model is a one-mass-point model equipped with one mass point (body mass point) 3*m* corresponding to a body 3 of a robot 1. The robot 1 shown in FIG. 6 is the robot 1 schematically side-viewed, omitting arms 5, 5 and a head 6. In the figures following FIG. 6 (including the drawings of embodiments other than the first embodiment), when illustrating the robot 1, the arms 5, 5 and the head 6 will be omitted, as with FIG. 6, unless it is necessary to discriminate them from the body 3. Further, the X-axis and the Z-axis shown in the following drawings, including FIG. 6, indicate a global coordinate system.

A body mass point 3*m* of the simplified model shown in FIG. 6 is set at a point uniquely determined on the basis of the position/posture of the body 3, i.e., a certain fixed point on a local coordinate system fixedly set arbitrarily on the body 3 (a point having a predetermined positional relationship with a representative point of the body 3 on the local coordinate system). The mass of the body mass point 3*m* is assumed to be identical to a total mass m total of the robot 1. The body mass point 3*m* may coincide with a representative point of the body 3, but it generally does not.

The dynamics of the simplified model is expressed by the dynamics of an inverted pendulum constructed of the body mass point 3*m* and a variable-length link 3*b* that supports the same such that it is free to swing, using a desired ZMP as its supporting point. To be more specific, equations of motions that represent the relationship between motions of the robot 1 and floor reaction forces in the simplified model are given by the following expression 01, expression 02, and expression 03. However, for the purpose of easier understanding of the present description, here, only the equations of motions on a sagittal plane (a plane that contains a longitudinal axis (X-axis) and a vertical axis (Z-axis), i.e., a so-called sagittal plane) will be described, and equations of motions on a lateral plane (a plane that contains a lateral axis (Y-axis) and a vertical axis (Z-axis), i.e., a so-called frontal plane) will be omitted.

In the present description, d2X/dt2 relative to an arbitrary variable X will means a second-order differential value of the variable X. Further, the variables related to the dynamics of the simplified model of FIG. 6 are defined as follows.

g: Gravitational acceleration; Zb: Vertical position of body mass point; Xb: Horizontal position of body mass point; mtotal: Total mass of the robot 1; Fx: Floor reaction force horizontal component (specifically, the component in the lateral direction (X-axis) of a translational floor reaction force); Fz: Floor reaction force vertical component (specifically, the component in the vertical direction (Z-axis) of the translational floor reaction force); My: Floor reaction force moment about a desired ZMP (specifically, the component about a lateral axis (Y-axis) of a floor reaction force moment); Xzmp: Horizontal position of the desired ZMP; and Zzmp: Vertical position of the desired ZMP.

$$Fz=m\text{total}*(g+d2Zb/dt2) \qquad \text{Expression 01}$$

$$Fx=mb*d2Xb/dt2 \qquad \text{Expression 02}$$

$$My=-m\text{total}*(Xb-Xzmp)*(g+d2Zb/dt2)+m\text{total}*(Zb-Zzmp)*(d2Xb/dt2) \qquad \text{Expression 03}$$

In the simplified model described by these expressions 01 to 03, when, for example, a desired ZMP and a desired floor reaction force vertical component are determined, a vertical position Zb of the body mass point 3m can be determined according to expression 01. Moreover, in a dynamically balanced state of the robot 1, My of the left side of expression 03 becomes zero (the horizontal component of a floor reaction force moment about a desired ZMP becomes zero); therefore, a horizontal position Xb of the body mass point 3m can be determined from the vertical position Zb of the body mass point 3m and expression 03.

The simplified model in the first embodiment has been the one-mass-point model; alternatively, however, it may be, for example, a three-mass-point model having an additional mass point in the vicinity of the foot 22 of each leg 2. Alternatively, the simplified model may be, for example, a model in which the body 3 has inertia (inertial moment) about the body mass point 3m.

The first displacement dimension correcting model in the first embodiment will now be explained. The diagrams on the right side in FIGS. 7 (a), (b) and (c) show the structure of the first displacement dimension correcting model in the first embodiment, while the diagrams on the left side show the entire posture states at which the robot 1 aims (the posture states of simplified model gait) respectively corresponding to the diagrams on the right side and the simplified models. The robot 1 shown on the right side in FIGS. 7 (a), (b) and (c) is the robot 1 standing upright with both legs 2 and 2 arranged in the lateral direction (the Y-axis direction) observed in a side view (on a sagittal plane). Hence, both legs 2 and 2 are overlapped in the drawings.

The first displacement dimension correcting model in the first embodiment is a five-mass-point model having one body mass point A1 corresponding to the body 3 of the robot 1, thigh mass points A2 and A3 corresponding to the thigh link portions in the vicinity of the knee joints of the legs 2, and foot mass points A4 and A5 corresponding to the distal end portions (feet 22) of the legs 2. The body 3 (body link) in the first displacement dimension correcting model has inertia (inertial moment) Ib about the body mass point A1. More specifically, the first displacement dimension correcting model is constructed of the mass points A1 to A5 and the body link having the inertia Ib as elements. In this case, the mass points A2 to A5 and the body link having the inertia Ib of the first displacement dimension correcting model are the elements that the simplified model shown in FIG. 6 described above does not have, and they produce inertial forces in response to motions of the parts respectively corresponding thereto (a posture changing motion in the case of the body 3).

The body mass point A1 and the foot mass points A4 and A5 of the first displacement dimension correcting model are set at points uniquely defined on the basis of the positions/postures of the parts corresponding thereto (the body 3 and the feet 22), that is, certain fixed points on local coordinate systems fixedly set arbitrarily on corresponding parts (points having predetermined positional relationships with the representative points of the parts on the local coordinate systems of the parts). However, the position of the body mass point A1 on the local coordinate system of the body 3 is generally different from the body mass point 3m of the simplified model shown in FIG. 6. The thigh mass points A2 and A3 are set at certain fixed points (fixed points in the vicinity of the knee joints) on a local coordinate system fixedly set arbitrarily to the thigh links 24 of the legs 2. The total sum of the masses of the body mass point A1, the foot mass points A4 and A5, and the mass points A2 and A3 of the thighs coincides with the total mass mtotal of the robot 1. The mass of the body mass point A1 includes the masses of both arms 5 and 5 and the head 4 in addition to the mass of the body 3.

A certain geometric restrictive condition is set on the placements of the elements of the first displacement dimension correcting model. Specifically, in the first displacement dimension correcting model, the posture state of the robot 1 is normally restricted to an upright standing posture state in which the body 3 is in a vertical posture with both legs 2 and 2 arranged side by side in the lateral direction (the Y-axis direction) of the robot 1 with a predetermined interval therebetween (the upright posture state) (for this reason, the mass points A2 and A4 corresponding to one of the legs 2 overlap the mass points A3 and A5 corresponding to the other leg 2 in the diagrams of the first displacement dimension correcting model on the right side of FIGS. 7 (a), (b) and (c)).

Accordingly, the mutual relative positional relationship among the body mass point A1, the foot mass points A4, A5, and the thigh mass points A2, A3 is restricted by a predetermined positional relationship corresponding to the upright posture state of the robot 1. Further, the posture of the body 3, which is the link (rigid body) having inertia in the first displacement dimension correcting model, is restricted to a vertical posture (the posture at which the posture angle relative to the vertical axis is zero).

The positions of the mass points A1 to A5 of the first displacement dimension correcting model on a global coordinate system (a coordinate system fixed to a floor) are determined on the basis of the instantaneous values of a motion of a simplified model gait. More specifically, in the first displacement dimension correcting model of the first embodiment, the positions of the mass points A1 to A5 on a global coordinate system are determined such that the position of the overall center-of-gravity of the mass points A1 to A5 coincides with the position of the overall center-of-gravity of the robot 1 on the simplified model, that is, the position of the body mass point 3m on the simplified model (the position on the global coordinate system). In this case, as previously mentioned, the mutual relative positional relationship among the mass points A1 to A5 of the first displacement dimension correcting model remains constant, so that once the position of the overall center-of-gravity of the mass points A1 to A5 (the position on the global coordinate system) is determined, the position of each of the mass points A1 to A5 on the global coordinate system will be also uniquely determined.

Thus, in the first displacement dimension correcting model in which the positions of the mass points A1 to A5 on the global coordinate system are determined on the basis of a simplified model gait, the motion of the overall center-of-gravity coincides with the motion of the overall center-of-gravity on the simplified model; therefore, the floor reaction force acting on the robot 1 on the simplified model will be equivalent to the floor reaction force acting on the robot 1 on the first displacement dimension correcting model.

Here, determining the placement of the elements of the first displacement dimension correcting model described above in the first embodiment is equivalent to determining the placement of the elements of the first displacement dimension correcting model according to a geometric restrictive condition (1) from an instantaneous motion of a simplified model gait when the geometric restrictive condition (1) for determining the placement of the elements of the first displacement dimension correcting model (the positions of the mass points A1 to A5 and the posture of the body link on the global coordinate system) is defined as follows.

Geometric restrictive condition (1): For a given arbitrary instantaneous desired motion, the posture state of the robot 1 based on the placement of the elements of the first displacement dimension correcting model is normally maintained at the upright posture state, and the overall center-of-gravity of the elements of the first displacement dimension correcting model coincides with the overall center-of-gravity of the robot 1 in the given instantaneous desired motion.

In the first embodiment, this geometric restrictive condition (1) corresponds to the first geometric restrictive condition in the present invention.

The second displacement dimension correcting model in the first embodiment will now be explained. FIG. 8 shows the structure of the second displacement dimension correcting model. The constituent elements of the second displacement dimension correcting model are the same as those of the first displacement dimension correcting model. The second displacement dimension correcting model has five mass points A1 to A5 and the body 3 (the body link) having the inertia Ib about the mass point A1, as with the first displacement dimension correcting model. The masses of the mass points A1 to A5 and the positions of the mass points A1 to A5 on the local coordinate system fixedly set on corresponding parts are the same as those of the first displacement dimension correcting model. Further, the inertia Ib of the body 3 is also the same as that in the first displacement dimension correcting model.

Unlike the first displacement dimension correcting model, the posture of the robot 1 is not restricted to the upright posture state in the second displacement dimension correcting model, and the mass points A1 to A5 and the body 3 (the body link) are movable to positions/postures corresponding to arbitrary posture states that the robot 1 may take.

In other words, a geometric restrictive condition (2) shown below is set between the placement of the elements of the second displacement dimension correcting model (the positions of the mass points A1 to A5 and the posture of the body link on the global coordinate system) and an instantaneous desired motion of the robot 1 corresponding thereto (the instantaneous values of desired position/posture of each part). The geometric restrictive condition (2) corresponds to the second geometric restrictive condition in the present invention.

Geometric restrictive condition (2): The positions/postures of parts corresponding to the elements of the robot 1 that are determined according to the placement of the elements of the second displacement dimension correcting model coincide with the positions/postures of parts corresponding to the elements of the robot 1 in an instantaneous desired motion corresponding to the placement.

Accordingly, in the second displacement dimension correcting model, the position of the overall center-of-gravity of the mass points A1 to A5 substantially coincides with the possible of the true overall center-of-gravity of the actual robot 1 in a posture state based on the placement of the elements of the second displacement dimension correcting model (the position of the mass points A1 to A5 and the posture of the body link).

Supplementally, determining the placement of the elements of the second displacement dimension correcting model according to the above geometric restrictive condition (2) from an arbitrary instantaneous desired motion is equivalent to determining the placement of the elements of the second displacement dimension correcting model such that the placement of the elements of the second displacement dimension correcting model coincides with the placement (the positions/postures) of the parts corresponding to the elements in the robot 1 following a given instantaneous desired motion. Furthermore, determining an instantaneous desired motion according to the geometric restrictive condition (2) from arbitrary placement of the elements of the second displacement dimension correcting model is equivalent to determining an instantaneous desired motion such that the placement (the positions/postures) of the parts corresponding to the elements of the robot 1 following an instantaneous desired motion coincides with the placement of the elements of the given second displacement dimension correcting model.

The second displacement dimension correcting model is a model that determines the aforesaid displacement dimension corrected body position/posture in cooperation with the first displacement dimension correcting model. When determining the displacement dimension corrected body position/posture, the positions/postures (the positions/postures on the global coordinate system) of the elements of the second displacement dimension correcting model are determined as follows. The positions of the foot mass points A4 and A5 of the second displacement dimension correcting model are determined to be the positions corresponding to the foot positions/postures of a simplified model gait. The positions of the body mass point A1 and the thigh mass points A2 and A3, and the posture angle of the body 3 (the body link) are determined so as to satisfy a predetermined condition related to the overall centers of gravity of the first displacement dimension correcting model and the second displacement dimension correcting model and an angular momentum product between the models to be discussed later. This will be described in detail hereinafter.

Supplementally, each of the legs 2 of the robot 1 according to the present embodiment has 6 degrees of freedom, so that once the positions/postures of both feet 22 and 22 and the position/posture of the body 3 are determined, the overall postures of the legs 2 and 2 of the robot 1 (the positions/postures of the individual portions (individual links) of the legs 2 and 2 of the robot 1) are uniquely determined. Hence, if the positions of the mass points A4 and A5 of both feet and the body mass point A1 and the posture of the body 3 (the body link) on the second displacement dimension correcting model are determined, then the positions of the thigh mass points A2 and A3 are subordinately determined accordingly.

In the following explanation, "positions" of mass points or "postures" of links having inertia related to a simplified model and the first and the second displacement dimension correcting models will mean the positions and postures on a global coordinate system unless otherwise specified.

Next, the details of the processing of the gait generating device 100 in the first embodiment will be explained more specifically. Taking a desired gait (the desired gait in the narrow sense described above) for one step from the moment one of the legs 2 of the robot 1 lands to the moment the other leg 2 lands as a unit, the gait generating device 100 generates the desired gait for one step in order according to the processing of a flowchart to be explained below. At this time, a desired gait to be newly generated is called "the current time gait."

FIG. 9 is a structured flowchart showing main routine processing of the gait generating device 100. The following is a detailed explanation. First, in S010, various initializing operations, including the initialization of time t to zero, are performed. This processing is carried out at startup or the like of the gait generating device 100. Then, the gait generating device 100 proceeds to S014 via S012 and waits for a timer interrupt for each control cycle (the computation processing cycle of the flowchart of FIG. 9). The control cycle is denoted by Δt. Thereafter, the processing from S014 to S032 is repeated for each control cycle Δt.

The gait generator 100 proceeds from S014 to S016 wherein it determines whether a gait is changing. If the gait is changing, then the gait generating device 100 proceeds to S018, or if the gait is not changing, then it proceeds to S022. Here, "the gait is changing" means the timing at which the generation of a current time gait is begun. For example, a control cycle following the control cycle in which the generation of the desired gait immediately preceding the current time gait has been completed will be the change of a gait.

When proceeding to S018, the current time t is initialized to zero, and then the gait generating device 100 proceeds to S020 to determine gait parameters of the current time gait. The processing of S020 corresponds to the processing of a gait parameter determiner 100a of FIG. 5 mentioned above, wherein parameters that define a desired foot position/posture trajectory, a desired arm posture trajectory, a desired ZMP trajectory, and a desired floor reaction force vertical component trajectory are determined, and parameters that define a reference body posture trajectory, a floor reaction force horizontal component permissible range, and a ZMP permissible range are also determined.

The processing of S020 is the processing corresponding to, for example, S022 to S030 of FIG. 13 in PCT international publication WO/03/057427/A1 (hereinafter referred to as "patent document 1") previously proposed by the present applicant. To explain it in brief, first, a normal gait as a virtual cyclic gait (a gait whose one cycle is composed of a gait for two steps of the robot 1) to which a current time gait is to be connected or asymptotic is determined. The normal gait is determined so as to satisfy a periodicity condition (a condition in which the initial condition of a cycle of the normal gait (the position/posture and their changing velocities of each part of the robot 1) matches the terminal condition thereof) on the basis of the estimated landing position/posture, estimated landing time, and the like of the free foot 22 for the next two steps, including the current time gait. Then, gait parameters defining a desired foot position/posture trajectory, a desired arm posture trajectory, a desired ZMP trajectory, and a desired floor reaction force vertical component trajectory are determined such that the current time gait connects or becomes asymptotic to a normal gait thereof. Here, when generating a desired foot position/posture trajectory by using, for example, a finite-duration setting filter previously proposed in U.S. Pat. No. 3,233,450 by the present applicant, the gait parameters defining the desired foot position/posture trajectory are primarily composed of an estimated landing position/posture and estimated landing time of the free leg foot 22 of the current time gait and the next estimated landing position/posture and estimated landing time of the supporting leg foot 22 of the current time gait. If, for example, a desired ZMP trajectory and a desired floor reaction force vertical component trajectory to be defined by gait parameters are trajectories formed by broken lines, then the gait parameters will be composed primarily of the values at break points thereof and time of the break points. In the present embodiment, a reference body posture is, for example, a vertical posture (a posture at which the inclination angle (posture angle) of the body 3 relative to the vertical axis is zero). Of the gait parameters determined in S020 of the present embodiment, the gait parameters defining a floor reaction force horizontal component permissible range corresponds to the parameter of the floor reaction force horizontal component permissible range for full-model correction determined in S030 of FIG. 13 of the aforesaid publication document 1.

Supplementally, the processing for determining the gait parameters for a current time gait in the aforesaid publication document 1 uses a dynamic model for preparing normal gaits; however, in the present embodiment, the aforesaid simplified model will be used as the dynamic model. In this case, although the simplified model in the present embodiment is not the same as the dynamic model illustrated in FIG. 11 of publication document 1, the simplified model is equivalent to the one in which the masses of the mass points of both legs of the dynamic model in publication document 1 are set to zero and the inertia related to the body (the inertia of the flywheel) is set to zero. Hence, if the masses of the mass points of both legs of the dynamic model of FIG. 11 in publication document 1 are set to zero and the inertia related to the body is set to zero, then the processing of S020 in the present embodiment is carried out by directly applying the processing of S022 to S030 of FIG. 13 in the publication document 1. Further, in the processing of S022 to S028 of FIG. 13 of the publication document 1, a floor reaction force horizontal component permissible range for simplified model gaits (the permissible range being not output from the gait generator) is set and used mainly for creating a normal gait. In the present embodiment, however, the floor reaction force horizontal component permissible range for simplified model gaits may alternatively be set to be, for example, an infinite range or it may be set to be a wide range so that the floor reaction force horizontal component of a simplified model gait (or a normal gait) always falls within the floor reaction force horizontal component permissible range. This makes it possible to apply, without trouble, the algorithm shown in publication document 1 in the processing of S020 in the present embodiment.

Next, after the processing of S020, or if the determination result of S016 is NO, then the processing proceeds to S022 to determine the instantaneous value of the current time gait. This processing is the processing carried out by desired instantaneous value generator 100b and the simplified model gait generator 100c in FIG. 5 described above, and it determines the instantaneous value (the instantaneous value of a simplified model gait) of the current time gait on the basis of the gait parameters determined in S020.

To be more specific, this processing corresponds to the processing of S032 of FIG. 13 in publication document 1 mentioned above, and it is carried out in the same manner as with publication document 1. To explain it in brief, the instantaneous values of a desired foot position/posture, a desired ZMP, a desired arm posture, a desired floor reaction force vertical component and a reference body posture are determined on the basis of the gait parameters determined in the foregoing S020, and then based on the instantaneous values, the instantaneous values of the desired body position/posture are determined such that the desired ZMP and the desired floor reaction force vertical component are satisfied on the foregoing simplified model (the moment horizontal component acting about the desired ZMP due to the resultant force of the inertial force produced by a motion of the robot 1 and gravity becomes zero, and the translational force vertical component of the resultant force balances out the desired floor reaction force vertical component). Here, the instantaneous values of the desired body position/posture will be supplementally explained. The instantaneous value of a desired body posture is regarded the same as the instantaneous value of a reference body posture in the present embodiment. Further, a desired body position vertical component is determined on the basis of the vertical position of a body mass point $3m$ of a simplified model determined from the desired floor reaction force vertical component and the aforesaid expression 01. And, the horizontal position of the body mass point $3m$ of the simplified model is determined so as to satisfy an expression obtained by setting the left side of the aforesaid expression 03 to zero (so that the horizontal component of the floor reaction force moment about the desired ZMP becomes zero), and the desired body position horizontal component is determined on the basis of the horizontal position of the body mass point $3m$.

The processing of S032 of FIG. 13 in the aforesaid publication document 1 uses the floor reaction force horizontal component permissible range for simplified model gaits. According to the present embodiment, as in the case explained in relation to the processing of S020 mentioned above, the floor reaction force horizontal component permissible range for simplified model gaits may be set to be, for example, an infinite range or it may be defined so that the floor reaction force horizontal component of a simplified model gait (or a normal gait) always lies within the floor reaction force horizontal component permissible range.

In the processing of S022, briefly speaking, a desired gait (the current time gait) for which instantaneous values are determined sequentially (for every control cycle $\Delta t$) is a gait in which the horizontal component of the moment generated about a desired ZMP by the resultant force of an inertial force generated by a motion and gravity becomes zero, and the translational force vertical component of the resultant force balances out a desired floor reaction force vertical component on the simplified model.

Subsequently, the processing proceeds to S024 to carry out a displacement dimension gait correction subroutine. The displacement dimension gait correction subroutine relating to the core of the present invention will be explained below in detail.

The processing for generating desired gaits by using the simplified model is advantageous in that it allows current gaits (currents gaits that do not diverge) to be stably determined in real time, whereas it disadvantageously provides low dynamic approximation accuracy of generated gaits. Hence, the embodiments of the present invention use a full model having higher dynamic accuracy than a simplified model to correct a part (a desired body position/posture and the moment about a desired ZMP) of a gait. In this case, if a simplified model gait is input to a full model for such a reason of a lower dynamic approximation accuracy of simplified model gaits and high nonlinearity of a full model, then an inconvenience may occur in that the correction of the simplified model gait is not properly made and a gait that disables the robot 1 to perform a continuous motion may be undesirably generated. Especially when generating a gait such as the one for the running of the robot 1, in which the motion of the leg 2 considerably changes in a short time, the influences of changes in inertial force produced due to a bending operation of a knee joint of each leg 2, which are not considered in a simplified model, will increase. This leads to deteriorated dynamic approximation accuracy of simplified model gaits, frequently causing the inconvenience described above. As a conceivable example of solutions to the inconvenience, a dynamic model having a plurality of mass points in each leg 2 or even a dynamic model having inertia (inertial moment) in one or more links, such as the body, of the robot is constructed and used as a simplified model in order to enhance the dynamic approximation accuracy of simplified model gaits. In such a case, however, the nonlinearity of the simplified model is intensified, making it difficult to stably and properly find the gait parameters of a current time gait connecting to a normal gait (gait parameters that allow the continuity of a motion of the robot 1 to be secured) in some cases, and the computation processing therefor takes time, consequently making it difficult to generate proper gaits in real time.

Therefore, the embodiments of the present invention, including the present embodiment (the first embodiment), use first and second displacement dimension correcting models to correct only a motion of a part (specifically, body position/posture) of a simplified model gait by geometric processing (processing in the dimension of displacement of a position and a posture) related to the placement of the elements (the positions and postures of links having mass points and inertia) of the first and the second displacement dimension correcting models without using dynamic equations that include desired ZMPs or floor reaction forces. This arrangement generates a gait having higher dynamic accuracy than a simplified model gait, more specifically, a gait in which the translational force component of the resultant force of actual inertial force generated by the robot 1 due to the motion of the gait and gravity balances out the translational force component of a desired floor reaction force with higher accuracy, and the horizontal component of a moment acting about a desired ZMP due to the resultant force becomes zero with higher accuracy. In this case, generally, the two displacement dimension correcting models are similarly equipped with mass points corresponding to some parts of the robot 1, or similarly equipped with links (e.g., the body 3) having mass points and inertia. Furthermore, the two displacement dimension correcting models have more mass points than simple models or have inertia that simplified models do not have. However, in the first displacement dimension correcting model, a certain appropriate restrictive condition is added to a mutual positional relationship among mass points or the posture of a link (e.g., the body 3) having inertia.

To explain in more detail (here, general explanation not limited to the first embodiment will be given), the position of each mass point of the first displacement dimension correcting model is determined on the basis of the instantaneous values of the position/posture of each part (instantaneous values of motions) of a generated simplified model gait. At this time, if the first displacement dimension correcting model is a model in which one or more links (e.g., the body 3) of the robot 1 have inertia, then the posture angles of the links are also determined. However, in the first displacement dimension correcting model, a certain appropriate geometric restrictive condition is added to the positional relationship among mass points or the postures of links (e.g., the body 3) having inertia, so that a floor reaction force similar to a floor reaction force of a simplified model gait is generated also in the first displacement dimension correcting model when the positions of mass points or the posture angles of links having inertia in the second displacement dimension correcting model are determined on the basis of the instantaneous values of the positions/postures (the instantaneous values of a motion) of parts of the simplified model gait.

Further, the positions of the mass points of the second displacement dimension correcting model (or the positions of the mass points and the posture angles of links having inertia) are determined such that the following conditions 1 and 2 are satisfied between the second displacement dimension correcting model, which does not have the geometric restrictive condition set in the first displacement dimension correcting model, and the first displacement dimension correcting model.

Condition 1) The position of the overall center-of-gravity of the first displacement dimension correcting model and the position of the overall center-of-gravity of the second displacement dimension correcting model substantially coincide with each other.

Condition 2) When a certain point Q is established, the total sum of the products of angular momentums about point Q in the second displacement dimension correcting model relative to the first displacement dimension correcting model becomes a constant value (predetermined value).

Here, condition 1 is the condition for ensuring that the inertial forces produced by a motion of a translational floor reaction force or overall center-of-gravity will be substantially the same in the two displacement dimension correcting models. In other words, condition 1 is equivalent to a condition in which, if the vector of the difference between the position of each mass point of the first displacement dimension correcting model and the position of the mass point of the second displacement dimension correcting model corresponding thereto (the difference in position vector) is regarded as the translational acceleration of the mass point, then the total sum of the translational force components of the inertial forces generated by mass points (the masses of mass points*translational acceleration) on all mass points will be substantially zero.

The aforesaid angular momentum product related to condition 2 is defined as follows when the reference position for each mass point of each displacement dimension correcting model is arbitrarily established, and the position of the aforesaid point Q is also arbitrarily established. If each displacement dimension correcting model has inertia (if inertia is set in certain one or more links), then the angular momentum product is defined as follows for each link when the reference posture angle for each link having the inertia is arbitrarily specified.

Specifically, the angular momentum product related to each mass point of each displacement dimension correcting model corresponds to a value obtained by multiplying the outer product of a segment (the vector of the segment) that connects point Q and the point of the reference position (hereinafter referred to as reference point) corresponding to the mass point and a positional deviation (the vector of the positional deviation) of the mass point from the reference point by the mass of the mass point. In this case, one having a proportional relationship with the product of the outer product and the mass or the one approximately equal to the product of the outer product and the mass may be defined as the angular momentum product related to the mass point. Further, in each displacement dimension correcting model, the angular momentum product related to a link having inertia is equivalent to the product of the deviation of the posture angle of the link from the reference posture angle for the link and the inertia of the link. In this case, one having a proportional relationship with the product of the deviation of the posture angle of the link from the reference posture angle and inertia or the one approximately equal to the product may be defined as the angular momentum product related to the link.

To supplementally describe the angular momentum product related to the mass point of each displacement dimension correcting model, the angular momentum product related to an arbitrary mass point will be a function that monotonously changes relative to the angle formed by a segment connecting a mass point and the foregoing predetermined point Q and a segment connecting the reference point for the mass point and the foregoing predetermined point Q (monotone increasing function or monotone decreasing function).

To be more specific, when the angular momentum product is defined as described above, condition 2 is a condition in which the total sum of the angular momentum products of the second displacement dimension correcting model becomes a certain fixed value when the position of each mass point of the first displacement dimension correcting model is defined as the reference position for each mass point of the second displacement dimension correcting model, and the posture angle of each link having inertia in the first displacement dimension correcting model is defined as the reference posture angle of each link having inertia in the second displacement dimension correcting model.

In other words, condition 2 is equivalent to a condition in which, if the vector of the difference between the position of each mass point of the first displacement dimension correcting model and the position of the mass point of the second displacement dimension correcting model corresponding thereto (the difference in position vector) is regarded as the translational acceleration of the mass point, and the difference in the posture angle of each link having inertia between the two displacement dimension correcting models is regarded as angular acceleration of the link, then the total sum of the moment acting about point Q due to the translational force component of the inertial force generated by each mass point and the moment acting about point Q due to the inertial force (the inertial force of a rotational motion) of each link having inertia will be a certain fixed value (predetermined value).

According to the embodiments explained in detail in the present description, the above point Q is set to, for example, a desired ZMP. Point Q is not limited to a desired ZMP. This will be supplementally explained hereinafter. It is not always necessary to satisfy both of the foregoing conditions 1 and 2. This will be also supplementally explained later.

According to the embodiments in the present description, displacement dimension corrected body position/posture obtained by correcting the desired body position/posture of a simplified model gait are determined by determining the position of each mass point of the second displacement dimension correcting model (the position of each mass point and the posture angle of each link having inertia if the link has inertia), as described above. The aforesaid processing of S024 of the flowchart of FIG. 9 is the processing for determining displacement dimension corrected body positions/postures, as described above.

The subroutine processing of S024 in the first embodiment will now be specifically explained with reference to FIG. 10.

Here, for the convenience of understanding of the embodiments in the present description, the explanation will be given to the correction of a body position/posture (calculation of displacement dimension corrected body position/posture) on a sagittal plane (a plane containing the X-axis and the Z-axis), while the correction of a body position/posture on a lateral plane (a plane containing the Y-axis and the Z-axis) will be omitted.

First, in S200, the positions of the mass points A1 to A5 of the first displacement dimension correcting model and the posture angle of the body 3 (the body link) having inertia are determined on the basis of the instantaneous values of a simplified model gait (the instantaneous values of a desired motion, such as desired body position/posture) at current time t. In other words, from the instantaneous values of the simplified model gait, the placement of the elements of the first displacement dimension correcting model (this corresponds to the first placement in the first and the third inventions) is determined according to the aforesaid geometric restrictive condition (1). To be specific, the positions of the mass points A1 to A5 of the first displacement dimension correcting model are determined such that the position of the overall center-of-gravity of the robot 1 in the simplified model gait and the position of the overall center-of-gravity of the robot 1 on the first displacement dimension correcting model will be the same. In this case, according to the present embodiment, the position of the overall center-of-gravity of the robot 1 in the simplified model gait coincides with the position of a body mass point $3m$ of the simplified model, so that the position will be uniquely defined from a desired body position/posture of the simplified model gait. And, in the first displacement dimension correcting model, the relative positional relationship among the mass points A1 to A5 is restricted, as described above, so that the positions of the mass points A1 to A5 will be uniquely determined by matching the position of the overall center-of-gravity of the mass points A1 to A5 (the position of the overall center-of-gravity of the robot 1 in the first displacement dimension correcting model) with the position of the body mass point $3m$ of the simplified model. The posture angle of the body link of the first displacement dimension correcting model will be the same as the body posture angle of the simplified model gait (a vertical posture in the present embodiment).

Next, the processing from S202 is executed to exploratorily determine the set of the positions of the mass points A1 to A5 of the second displacement dimension correcting model and the posture angle of the body 3 (body link) having inertia, i.e., the placement of the elements of the second displacement dimension correcting model, that satisfies the aforesaid conditions 1 and 2 relative to the first displacement dimension correcting model. And, the body position and posture of the robot 1 corresponding to the body mass point A1 and the posture of the body link in the placement (this corresponds to the third placement in the first invention and the second placement in the third invention) are determined as a displacement dimension corrected body position Pb2 and a displacement dimension corrected body posture θb2.

To be more detailedly, first, in S202, initial candidates (Pb2_s, θb2_s) of the displacement dimension corrected body position Pb2 and a displacement dimension corrected body posture θb2 are determined. The initial candidates (Pb2_s, θb2_s) correspond to approximate estimated values of the displacement dimension corrected body position Pb2 and a displacement dimension corrected body posture θb2 at current time t (present time t), and they are determined, for example, as follows. It is considered that the difference (positional deviation) between the displacement dimension corrected body position Pb2 and the body position Pb of the simplified model gait at current time t is close to the difference between Pb2 and Pb at last time (time at a last time control cycle) t-Δt. Similarly, it is considered that the difference (posture angle deviation) between the displacement dimension corrected body posture θb2 and the body posture θb of the simplified model gait at current time t is close to the difference between θb2 and θb at last time t-Δt. Hence, the initial candidates (Pb2_s, θb2_s) are determined according to the following expressions from Pb, θb at current time t, values Pb_p, θb_p of Pb, θb at last time t-Δt and values Pb2_p, θb2_p of Pb2, θb2 at last time t-Δt.

$Pb2\_s = Pb + (Pb2\_p - Pb\_p)$    Expression 04

$θb2\_s = θb + (θb2\_p - θb\_p)$    Expression 05

Subsequently, following the S204, loop processing from S206 to S216 is carried out. In S206, the positions of the mass points A1 to A5 in the second displacement dimension correcting model are determined on the basis of current candidates (Pb2_s, θb2_s) of displacement dimension corrected body position/posture and desired positions/postures of both feet of a simplified model gait at current time t. In this case, the positions of the mass points A1 to A5 are determined, assuming that the position/posture of the body 3 of the robot 1 in the second displacement dimension correcting model coincide with the current candidates (Pb2_s, θb2_s), and the position/posture of each foot 22 of the robot 1 in the second displacement dimension correcting model coincide with the desired foot position/posture of the simplified model gait. In other words, the positions of the mass points A1 to A5 in the second displacement dimension correcting model are determined according to the geometric restrictive condition (2) from a motion instantaneous value obtained by replacing only the instantaneous value of a body position/posture of the motion instantaneous value of the simplified model gait by the candidates (Pb2_s, θb2_s).

To be specific, the positions of foot mass points A3 and A4 are determined from desired foot position/posture. Further, the position of the body mass point A1 is determined from the candidates (Pb2_s, θb2_s), and the posture angle of the body 3 (body link) is assumed to be the same as θb2_s. And, the positions of thigh mass points A2 and A3 are determined from the posture of each leg 2 of the robot 1 determined from the desired positions/postures of both feet and the candidates (Pb2_s, θb2_s). Supplementally, as described above, in the robot 1 of the present embodiment in the present description, each leg 2 has six degrees of freedom; therefore, once the positions/postures of the two feet 22, 22 and the body 3 are determined, the position/posture of each part of each leg 2 will be uniquely determined. Accordingly, if the position of the body mass point A1, the posture angle of the body link, and the positions of the mass points A4 and A5 of both feet of the second displacement dimension correcting model are determined, then the positions of the thigh mass points A2 and A3 will be uniquely determined.

Subsequently, the processing proceeds to S208 to determine a positional difference Gc_err in overall center-of-gravity between the first displacement dimension correcting model and the second displacement dimension correcting model (hereinafter referred to as the inter-model overall center-of-gravity error Gc_err), and a deviation amount of a total sum L_err of angular momentum products of the second displacement dimension correcting model relative to the first displacement dimension correcting model (hereinafter referred to as the inter-model angular momentum product error L_err). This processing will be specifically explained below. In the following explanation, the masses of the mass points A1 to A5 of the first and the second displacement dimension correcting models will be denoted by mi (i=1, 2, . . . , 5), and the positions (positional vectors) will be denoted by Pi1 or Pi2 (i=1, 2, . . . , 5). Pi1 denotes the position of a mass point Ai of the first displacement dimension correcting model, while Pi2 denotes the position of a mass point Ai of the second displacement dimension correcting model. Further, the posture angles of the body 3 (body link) in the first and the second displacement dimension correcting models will be denoted by θb1 and θb2, respectively. In the present embodiment, θb1 is identical to a desired body posture θb (vertical posture) of a simplified model gait.

The inter-model overall center-of-gravity error Gc_err and the inter-model angular momentum product error L_err are respectively calculated according to, for example, the following expressions 06 and 07.

$$Gc\_err=\Sigma(mi^*(Pi2-Pi1)) \qquad \text{Expression 06}$$

$$L\_err=\Sigma(mi^*(Pi1-Q)^*(Pi2-Pi1))+Ib^*(\theta b2-\theta b1)+Const \qquad \text{Expression 07}$$

where Σ in these expressions means the total sum regarding all mass points Ai (i=1, 2, . . . , 5) of the parenthesized portions following it. "Const" of Expression 07 denotes a predetermined value specified beforehand and corresponds to "constant value" (predetermined value) in the aforesaid condition 2. Q in Expression 07 is identical to the position of a desired ZMP of a simplified model gait in the present embodiment.

In these Expressions 06 and 07, the right side of Expression 06 means the difference between the position of the overall center-of-gravity determined by the positions Pi1 (i=1, 2, . . . , 5) of the mass points A1 to A5 of the first displacement dimension correcting model and the position of the overall center-of-gravity determined by the positions Pi2 (i=1, 2, . . . , 5) of the mass points A1 to A5 of the second displacement dimension correcting model. Thus, if the value of the inter-model overall center-of-gravity error Gc_err is zero (zero vector) or substantially zero, then the foregoing condition 1 will be satisfied.

Further, the term obtained by removing "Const" from the right side of Expression 07 means the total sum of the angular momentum products of the second displacement dimension correcting model relative to the first displacement dimension correcting model. In other words, the term obtained by removing "Const" from the right side of Expression 07 means the total sum of the angular momentum products of the second displacement dimension correcting model when the positions Pi1 (i=1, 2, . . . , 5) of the mass points A1 to A5 of the first displacement dimension correcting model are defined as the reference positions of the mass points A1 to A5 of the second displacement dimension correcting model, and the posture angle of the body 3 (body link) of the first displacement dimension correcting model is defined as the reference posture angle of the body 3 (body link) of the second displacement dimension correcting model.

Accordingly, if the value of the inter-model angular momentum product error L_err is always zero or substantially zero, then the foregoing condition 2 is satisfied.

To supplementally explain about the parenthesized term following Σ of the right side of Expression 07, (Pi1−Q)*(Pi2−Pi1) denotes the outer product of the vector of a segment that connects point Q and the mass point Ai and the positional deviation of the mass point Ai of the second displacement dimension correcting model relative to the mass point Ai of the first displacement dimension correcting model. When this is visually expressed, (Pi1−Q)*(Pi2−Pi1) corresponds to the amount of size that is double the area of each hatched or meshed triangle, as shown in FIG. 11. In FIG. 11, the positions Pi1, Pi2 of the mass points Ai (i=1, 2, . . . , 5) in the first and the second displacement dimension correcting models, respectively, are denoted by Pi1(Ai) and Pi2(Ai).

Expression 07 related to angular momentum product may be replaced by any one of the following expressions 08 to 10.

$$L\_err=\Sigma(Ci^*mi^*\text{angle}(Pi1\_Q\_Pi2))+Ib^*(\theta b2-\theta b1)+Const \qquad \text{Expression 08}$$

$$L\_err=\Sigma(mi^*(\text{Horizontal component displacement of mass point } Ai^*\text{Height}))+Ib^*(\theta b2-\theta b1)+Const \qquad \text{Expression 09}$$

$$L\_err=\Sigma(mi^*(\text{Horizontal component displacement of mass point } Ai^*\text{Height})^*C(\text{Height of mass point } Ai))+Ib^*(\theta b2-\theta b1)+Const \qquad \text{Expression 10}$$

where "angle(Pi1_Q_Pi2)" in Expression 08 denotes the angle formed by a segment that connects the mass point Ai of the first displacement dimension correcting model and point Q and a segment that connects the mass point Ai of the second displacement dimension correcting model and point Q. Further, "Ci" in Expression 08 is a predetermined coefficient and it is determined such that Ci*mi*angle(Pi1_Q_Pi2) is substantially equal to double the area of the triangle formed by mass points Ai of both displacement dimension correcting models and point Q. Further, "horizontal component displacement of mass point Ai" in Expressions 09 and 10 means the horizontal component of a positional difference (Pi2−Pi1) between the mass point Ai of the first displacement dimension correcting model and the mass point Ai of the second displacement dimension correcting model, and "height" means a relative height of the mass point Ai of the first or the second displacement dimension correcting model in relation to point Q, that is, the vertical component of Pi1-Q or Pi2-Q. Further, "C(height of mass point Ai)" in Expression 10 means a certain function value of a relative height of the mass point Ai of the first or the second displacement dimension correcting model in relation to point Q (the vertical component of Pi1-Q or Pi2-Q). In this case, preferably, a function value C (height of a mass point Ai) is a monotone function that basically decreases as the height of the mass point Ai increases.

Regardless of which one of the aforesaid Expressions 07 to 10 related to angular momentum product is used, the term obtained by excluding "Const" of the right side of the expression used will be substantially proportional to or approximately equal to the total sum of angular momentum products. The values of "Const" in Expressions 07 to 10 are generally different from each other.

Supplementally, the terms following Σ of the right side of the foregoing Expressions 07 to 10 will be functions that substantially monotonously change relative to the angle (Pi1_Q_Pi2) formed by a segment that connects the mass point Ai of the first displacement dimension correcting model and point Q and a segment that connects the mass point Ai of the second displacement dimension correcting model and point Q.

According to the present embodiment, in S208, the positions of the mass points A1 to A5 of the first displacement dimension correcting model determined in S200 are substituted into Pi1 of the foregoing Expression 6, and the positions of the mass points A1 to A5 determined in S206 are substituted into Pi2 of the Expression 6 thereby to calculate the inter-model center-of-gravity positional error Gc_err. Further, the same is carried out on Pi1 and Pi2 in the foregoing Expression 7, a body posture (vertical posture in the present embodiment) determined in S200 is substituted into θb1, and a current value θb2_s of a candidate of a displacement dimension corrected body posture is substituted into θb2 thereby to calculate the inter-model angular momentum product error Lc_err.

After determining the inter-model overall center-of-gravity error Gc_err and the inter-model angular momentum product error L_err in S208 as described above, the processing proceeds to S210 to determine whether Gc_err and L_err lie in a predetermined range in the vicinity of zero. If the result of the determination is YES, then the processing proceeds via S212 to S218, which will be discussed hereinafter. On the other hand, if the result of the determination is NO, then the processing proceeds to S214 wherein a plurality of provisional candidates (Pb2_s+ΔPbx, θb2_s), (Pb2_s+ΔPbz, θb2_s) and (Pb2_s, θb2_s+Δθb) are determined in the vicinity of a current candidate (Pb2_s, θb2_s) of displacement dimension corrected body position/posture. ΔPbx and ΔPbz denote predetermined values for changing the candidate Pb2_s of the displacement dimension corrected body position from a current value in the X-axis direction and the Z-axis direction by an extremely small amount, and Δθb denotes a predetermined value for changing the candidate θb2 of a displacement dimension corrected body posture about the Y-axis from a current value by an extremely small amount. Then, the same processing as that of the foregoing S206 and S208 is carried out on these provisional candidates so as to determine the inter-model overall center-of-gravity error Gc_err and the inter-model angular momentum product error L_err. This processing is the processing for observing the degrees of changes in Gc_err and L_err when the candidates (Pb2_s, θb2_s) of the displacement dimension body position/posture are changed from the current values.

Subsequently, the processing proceeds to S216 wherein, based on Gc_err and L_err determined in S214, new candidates of the displacement dimension corrected body position/posture is determined such that their values approach zero, and the determined candidates are substituted into (Pb2_s, θb2_s). The new candidates are determined using, for example, Jacobian (sensitivity matrix). Then, the processing from S206 is executed again.

As described above, by the loop processing from S206 to S216, displacement dimension corrected body position/posture that cause Gc_err and L_err to fall within a predetermined range in the vicinity of zero, i.e., displacement dimension corrected body position/posture that satisfy the aforesaid conditions 1 and 2, are exploratorily determined.

And, if the result of the determination of S210 is YES, then the processing proceeds to S218 via S212, and current (Pb2_s, θb2_s) are decided as the displacement dimension corrected body position/posture (Pb2, θb2) at current time t. This provides a desired gait obtained by correcting the body position/posture of a simplified model gait (hereinafter referred to as a displacement dimension corrected gait in some cases). This displacement dimension corrected gait is obtained by correcting only the desired body position/posture of the simplified model gait, and the remaining constituent elements, such as desired foot position/posture, a desired ZMP and a desired floor reaction force vertical component, of the desired gait are the same as those of the simplified model gait.

Here, the aforesaid displacement dimension corrected gait will be supplementally explained with reference to FIG. 12 to FIG. 14. FIG. 12 illustrates a relationship between the positions of the mass points Ai and the posture angle of the body 3 (body link) of the second displacement dimension correcting model and the positions of the mass points Ai and the posture angle of the body 3 (body link) of the first displacement dimension correcting model if the positions of the mass points Ai (i=1, 2, . . . , 5) and the posture angle of the body 3 (body link) of the second displacement dimension correcting model are determined exactly according to a simplified model gait (that is, if the simplified model gait is not corrected in the aforesaid S024). The positions of the mass points Ai and the posture angle of the body 3 of the second displacement dimension correcting model in this case, i.e., the placement of the elements of the second displacement dimension correcting model, may be described in other words that it has been determined according to the aforesaid geometric restrictive condition (2) from an instantaneous motion of the simplified model gait. Hence, the placement of the elements of the second displacement dimension correcting model in this case corresponds to the second placement in the first invention. In the foregoing FIG. 12, the positions of the mass points Ai (i=1, 2, . . . , 5) of the second displacement dimension correcting model corresponding to the simplified model gait are denoted by Pi2' (Ai).

FIG. 13 illustrates a relationship between the positions of the mass points Ai and the posture angles of the body 3 (body link) of the second displacement dimension correcting model and the positions of the mass points Ai and the posture angles of the body 3 (body link) of the first displacement dimension correcting model that correspond to a displacement dimension corrected gait determined by the displacement dimension gait correction subroutine described above.

In the following explanation, generally, if the positional difference between an arbitrary mass point of the first displacement dimension correcting model and the mass point of the second displacement dimension correcting model corresponding thereto is regarded as a translational acceleration, then this translational acceleration is referred to as the inter-model pseudo translational acceleration of the mass point. Similarly, if the difference in posture angle between a link having inertia of the first displacement dimension correcting model and the link of the second displacement dimension correcting model corresponding thereto is regarded as an angular acceleration, then this angular acceleration is referred to as the inter-model pseudo angular acceleration.

In the example shown in FIG. 12, at a position Pi2' of each mass point Ai of the second displacement dimension correcting model corresponding to a simplified model gait, mass points A2 and A4 of the supporting leg among mass points A2 to A5 of both legs 2 and 2 are slightly positionally deviated toward the front side of the robot 1 relative to the first displacement dimension correcting model. Further, mass points A3 and A5 of the free leg of the second displacement dimension correcting model are positionally deviated toward the rear side of the robot 1 relatively markedly relative to the first displacement dimension correcting model. Therefore, the overall center-of-gravity of the robot 1 in the second displacement dimension correcting model will be deflected toward the rear side of the robot 1 (in the negative direction of the X-axis) further than the overall center-of-gravity of the robot 1 in the first displacement dimension correcting model (this coincides with the overall center-of-gravity of the robot 1 in a simplified model gait according to the present embodiment). In other words, the total sum of the translational force components of the inertial forces generated by the mass points A2 to A5 due to the inter-model pseudo translational acceleration of the mass points A2 to A5 of both legs 2 and 2 (=Mass of mass points A2 to A5*Inter-model pseudo translational acceleration) will be relatively large toward the front side of the robot 1. In addition, the moment acting about a desired ZMP caused by the inertial forces produced by the mass points A2 to A5 due to the inter-model pseudo translational acceleration of the mass points A2 to A5 will be relatively large on the forward inclination side of the robot 1. In the present embodiment, the body posture of the simplified model gait and the body posture of the first displacement dimension correcting model are the same, so that the inter-model pseudo translational acceleration of the body mass point A1 will be zero and the inter-model pseudo angular acceleration of the body link will be also zero in the example of FIG. 12.

In comparison to the above, when the positions of the mass points Ai and the posture angle of the body link of the second displacement dimension correcting model corresponding to a displacement dimension corrected gait are decided by the aforesaid displacement dimension gait correcting subroutine, the position of the body mass point A1 of the second displacement dimension correcting model is set at further front side than the body mass point A1 of the first displacement dimension correcting model, that is, the displacement dimension corrected body position is set at further front side than in a simplified model gait, so as to compensate for the deviations of the centers of gravity of the mass points A2 to A5 of the two legs 2 and 2, as shown in FIG. 13. At the same time, the positions of the mass points A1 to A5 and the posture of the body 3 having inertia in the second displacement dimension correcting model are determined such that the total sum of angular momentum products described above takes a fixed value. In the example illustrated, the body posture (the posture of the body 3 indicated by the solid line) in the second displacement dimension correcting model is inclined toward the rear by an angle of θb2−θb1 with respect to the body posture of the simplified model gait (the posture of the body 3 indicated by the dashed line).

Hence, at the positions of the mass points Ai and the posture angle of the body link of the second displacement dimension correcting model corresponding to the displacement dimension corrected gait, the total sum of the translational force components of the inertial forces produced due to the inter-model pseudo translational acceleration of the mass points Ai will be smaller than in the case shown in FIG. 12 and reduced to substantially zero, and the total sum of the moments acting about a desired ZMP generated by the inertial forces will approximate a predetermined value (a value corresponding to "the predetermined value" in the aforesaid condition 2) further than in the case shown in FIG. 12.

Thus, the displacement dimension corrected gait compensates for the influences of the inertial forces generated due to the motions of the legs, which are not taken into account in a simplified model gait, to provide a corrected desired motion of the robot 1 so that a floor reaction force similar to a desired floor reaction force of the simplified model gait is generated.

FIG. 14 shows a typical example of modified forms of a displacement dimension corrected gait relative to a simplified model gait. More specifically, this example illustrates a case where the knee joints of both legs 2 and 2 are bent to lower the body 3 without moving the desired ZMP from the state wherein the robot 1 is in an upright posture. FIG. 14(*a*) shows the robot 1 in the upright posture, and FIG. 14(*b*) shows the body 3 lowered by bending the knee joints (knee-bent state). In the state wherein the robot 1 is in the upright posture, the simplified model gait and the displacement dimension corrected gait substantially agree with each other, so that positions Pi1 and Pi2 of the mass points Ai (i=1, 2, . . . , 5) and the postures of the bodies 3 of the first and the second displacement dimension correcting models substantially agree in the two displacement dimension correcting models, as shown in FIG. 14(*a*).

To generate, from this state, a gait for lowering the body 3 while maintaining the desired ZMP, the simplified model gait will be a gait in which the body 3 is lowered while maintaining the positions/postures of both feet 22 and the posture of the body 3 at the upright posture (vertical posture). Accordingly, the positions Pi1 of the mass points Ai in the first displacement dimension correcting model will lower from the positions shown in FIG. 14(*a*) while maintaining the positional relationships. At this time, as the knee joints of both legs 2 and 2 project toward the front of the robot 1, positions P22 and P32 of the thigh mass points A2 and A3 in the second displacement dimension correcting model are shifted further toward the front of the robot 1 than positions P21 and P31 of thigh mass points A2 and A3 of the first displacement dimension correcting model, as shown in FIG. 14(*b*). Hence, a position P12 of the body mass point A1 of the second displacement dimension correcting model will be further at the rear than a position P11 of the body mass point A1 of the first displacement dimension correcting model so as to match the overall centers of gravity of both displacement dimension correcting models (so as to satisfy the aforesaid condition 1). In other words, a position P12 of the body mass point A1 of the second displacement dimension correcting model will be further at the rear than the position P11 of the body mass point A1 in the first displacement dimension correcting model so as to cancel out the translational force component of the inertial force produced due to inter-model pseudo translational acceleration of both thigh mass points A2 and A3 by the translational force component of the inertial force produced due to the inter-model pseudo translational acceleration of the body mass point A1 (the connecting portions of the legs 2 and 2 that connect to the body 3 (hip joints) are shifted toward the rear).

At this time, if the posture of the body 3 were maintained, then the aforesaid inter-model angular momentum product error L_err would be produced between the first displacement dimension correcting model and the second displacement dimension correcting model. In this case, the inter-model angular momentum product error would be double the difference in area between the two triangles indicated by hatching in FIG. 14(*b*). To eliminate the error (to satisfy condition 2 described above), the body posture in the second displacement dimension correcting model (the posture of the body 3 indicated by the solid line shown in FIG. 14(*b*)), i.e., the body posture of a displacement dimension corrected gait, would incline toward the front relative to the body posture in the first displacement dimension correcting model (the body 3 indicated by the dashed line in FIG. 14(*b*)), i.e., the body posture of a simplified model gait. In other words, the body posture of the second displacement dimension corrected gait would incline toward the front relative to the body posture of the simplified model gait such that the moment acting about the desired ZMP caused by the inertial force resulting from the inter-model pseudo angular acceleration of the body link cancels the moment acting about the desired ZMP caused by the inertial forces resulting from the inter-model pseudo translational acceleration of both thigh mass points A2 and A3 and the body mass point A1.

Generally speaking, as the knee joint of each leg 2 projects toward the front of the robot 1 relative to the segment that connects the center of the hip joint and the center of the ankle joint of the leg 2, the position of the body mass point A1 of the second displacement dimension correcting model moves toward the rear of the robot 1, and the body 3 (body link) inclines toward the front.

Determining a displacement dimension corrected gait by correcting motions (body position/posture) relative to a simplified model gait makes it possible to determine a displacement dimension corrected gait with higher dynamic accuracy than the simplified model gait, while satisfying a dynamic balance condition, such as the one in that the horizontal component of a floor reaction force moment about a desired ZMP is zero, as with the simplified model gait.

Returning to the explanation of FIG. 9, after the displacement dimension gait correcting subroutine is carried out as described above, the processing proceeds to S026 wherein the operation of the arms 5, 5 for canceling a spin (a rotation about the vertical axis) of the robot 1 is determined. This processing is performed to determine the postures of the arms 5, 5 so as to produce a floor reaction force moment by swinging the arms 5, 5 (a motion for swinging both arms 5, 5 back and forth in the opposite directions from each other). The floor reaction force moment is in the opposite direction from the vertical component of a floor reaction force moment generated about a desired ZMP when the robot 1 is moved according to a desired gait without swinging the arms 5, 5 of the robot 1. The processing is executed in the same manner as that of S034 of FIG. 13 in publication document 1 mentioned above. The details thereof are given in the publication document 1, so that no further explanation will be given herein.

Next, the processing proceeds to S028 wherein the instantaneous value of a ZMP permissible range and the instantaneous value of a floor reaction force horizontal component permissible range of full model correction (for the processing of the full model corrector 100e mentioned above) are determined on the basis of the gait parameters that define the ZMP permissible range and the floor reaction force horizontal component permissible range out of the current time gait parameters determined in S020 described above.

Subsequently, the processing proceeds to S030 wherein a corrected gait using the full model is generated. This processing is carried out by the full model corrector 100e, and it is the same processing as that of S038 of FIG. 13 of publication document 1 and therefore it is carried out according as described in the publication document 1. Hence, no further detailed explanation will be given in the present description. In this processing, the corrected desired body position/posture and a corrected desired floor reaction force moment are determined by further correcting the desired body position/posture (the body position/posture of the aforesaid displacement dimension corrected gait).

The full model used in the full model corrector 100e is a multi-mass-point model having mass points in the body 3, the hip joints of the legs 2, the thigh links, the crus links, the ankle joints, and the feet 22 of the robot 1, and inertia Ib in the body 3 (the body link), as shown in, for example, FIG. 15. In this case, inertia may be set to other links in addition to the body 3.

This completes the explanation of the gait generation processing carried out by the gait generating device 100 in the present embodiment.

Referring now to FIG. 4, the operation of the composite-compliance control unit 101 will be explained. The operation of the composite-compliance control unit 101 is explained in detail in, for example, Japanese Unexamined Patent Application Publication No. 10-277969 filed previously by the present applicant, so that only brief explanation will be given in the present description. In the gait generating device 100, corrected desired body position/posture (trajectory) and a desired arm posture (trajectory) of the desired gait that has been generated as described above are sent out to the robot geometric model (inverse kinematics calculator) 102.

Further, desired foot position/posture (trajectory), a desired ZMP trajectory (a desired total floor reaction force central point trajectory), and a desired total floor reaction force (trajectory) (a corrected desired floor reaction force moment and a desired floor reaction force vertical component) are sent to a composite-compliance operation determiner 104 and also to a desired floor reaction force distributor 106. In the desired floor reaction force distributor 106, the floor reaction force is distributed to the feet 22, and a desired foot floor reaction force central points and desired foot floor reaction forces are determined. The determined desired foot floor reaction force central points and desired foot floor reaction forces are sent to the composite-compliance operation determiner 104.

The corrected desired foot position/posture (trajectory) with deformation compensation are sent from the composite-compliance operation determiner 104 to the robot geometric model 102. The corrected desired foot position/posture with deformation compensation means the desired foot position/posture of each foot 22 that have been corrected such that an actual floor reaction force detected by the six-axis force sensor 50 approximates a desired floor reaction force, considering the deformation of the compliance mechanism 72 of each leg 2 (deformation caused by a floor reaction force acting on each leg 2). Upon receipt of the desired body position/posture (trajectory) and the corrected desired foot position/posture (trajectory) with deformation compensation, the robot geometric model 102 calculates joint displacement commands (values) for twelve joints of the legs 2 and 2 that satisfy them and sends the calculated commands (values) to the displacement controller 108. The displacement controller 108 uses the joint displacement commands (values) calculated by the robot geometric model 102 as desired values to carry out follow-up control of the displacement of the twelve joints of the robot 1. The robot geometric model 102 also calculates displacement commands (values) of arm joints that satisfy desired arm postures and sends the calculation results to the displacement controller 108. The displacement controller 108 uses the joint displacement commands (values) calculated by the robot geometric model 102 as desired values to carry out follow-up control of the displacement of the twelve joints of the arms of the robot 1.

A floor reaction force (more specifically, an actual floor reaction force of each foot) generated in the robot 1 is detected by the six-axis force sensor 50. The detected value is sent to the composite-compliance operation determiner 104. Further, posture inclination errors θerrx, θerry that have occurred in the robot 1 (more specifically, actual body posture angle errors relative to a desired body posture angle, a posture inclination error in the roll direction (about the X-axis) being denoted by θerrx and a posture inclination error in the pitch direction (about the Y-axis) being denoted by θerry) are detected through the intermediary of the posture sensor 54, and the detection values are supplied to a posture stabilization control calculator 112. The posture stabilization control calculator 112 calculates a compensating total floor reaction force moment about a desired total floor reaction force central point (desired ZMP) for resetting the body posture angle of the robot 1 to a desired body posture angle, and sends the calculation result to the composite-compliance operation determiner 104. The composite-compliance operation determiner 104 corrects a desired floor reaction force on the basis of the input value. Specifically, the desired floor reaction force is corrected such that a compensating total floor reaction force moment or the sum of a compensating total floor reaction force moment and a corrected desired floor reaction force moment acts about a desired total floor reaction force central point (desired ZMP).

The composite-compliance operation determiner 104 determines the corrected desired foot position/posture (trajectory) with deformation compensation such that the state and floor reaction force of an actual robot calculated from the detection values of sensors agree with the corrected desired floor reaction force. However, it is practically impossible to match every state with a desired value, so that a trade-off relationship is imparted to them to make them agree as much as possible compromisingly. More specifically, weight is added to a control error relative to each desired value, and control is carried out to minimize a weighted average of a control error (or the square of a control error). Thus, actual foot position/posture and total floor reaction force are controlled to approximately follow a desired foot position/posture and a desired total floor reaction force (including a compensating total floor reaction force moment about a desired ZMP).

Second Embodiment

A second embodiment in accordance with the present invention will now be explained. In the present embodiment, the mechanical construction of a robot 1 and the functional construction of a control unit 60 (the functional construction shown in FIG. 4) are the same as those in the first embodiment. The present embodiment differs from the first embodiment in a simplified model and a first displacement dimension correcting model and partly in the processing of a gait generator 100. Hence, in the explanation of the present embodiment, the same reference numerals and drawings as those in the first embodiment will be used for the same parts as those in the first embodiment and detailed explanation thereof will be omitted. The second embodiment represents an embodiment of the first to the tenth inventions, and the thirteenth to the sixteenth inventions of the present invention.

FIG. 16 shows a structure of a simplified model (dynamic model) in the present embodiment, and FIG. 17 shows a structure of a first displacement dimension correcting model in the present embodiment.

The simplified model according to the present embodiment shown in FIG. 16 is constructed of three mass points, namely, two foot mass points $2m2$, $2m2$ corresponding to legs 2 (more specifically, feet 22 of the legs 2) of the robot 1, and a body mass point $3m2$ corresponding to a body 3, and a flywheel FH having inertia J but no mass. This model is the same as the model shown in FIG. 11 of publication document 1 mentioned above. Therefore, no detailed explanation will be given in the present description, and only an overview will be provided below.

The simplified model is constructed so that the dynamics of the foot mass points $2m2$, $2m2$ (the relationship between motions and floor reaction forces) and the dynamics of the body mass point $3m2$ and the flywheel FH do not interfere with each other, the dynamics of the entire robot 1 being expressed by their linear connections. A floor reaction force generated by a rotational motion of the flywheel FH corresponds to a floor reaction force generated by a rotational motion of a posture angle of the body 3 (a rotational motion for changing only a floor reaction force moment without changing a translational floor reaction force). The body mass point $3m2$ is set at a point uniquely defined on the basis of a position/posture of the body 3 (a certain fixed point on a local coordinate system that has been arbitrarily fixed on the body 3), and the leg mass points $2m2$ are set at points uniquely defined on the basis of positions/postures of feet 22 of the legs 2 (certain fixed points on a local coordinate system arbitrarily fixed on the feet 22). The total sum of the masses of the mass points $2m2$, $2m2$ and $3m2$ is identical to the total mass of the robot 1. The mass of the body mass point $3m2$ includes the mass of the body 3 and the masses of both arms 5, 5.

The expressions (dynamic equations) describing the dynamics of the simplified model are given by the following expressions 11 to 13. However, for the convenience of understanding of the present description, only the equations of motions on a sagittal plane (a plane that contains a longitudinal axis (X-axis) and a vertical axis (Z-axis)) will be described, and equations of motions on a lateral plane (a plane that contains a lateral axis (Y-axis) and a vertical axis (Z-axis)) will be omitted here. The variables of Expressions 11 to 13 are defined as follows:

Zsup: Vertical position of supporting leg foot mass point; Zswg: Vertical position of free leg foot mass point; Zb: Vertical position of body mass point; Xsup: Horizontal position of supporting leg foot mass point; Xswg: Horizontal position of free leg foot mass point; Xb: Horizontal position of body mass point; θby: Body posture angle about Y-axis relative to vertical direction; mb: Mass of body mass point; msup: Mass of supporting leg foot mass point; mswg: Mass of free leg foot mass point; J: Inertial moment of flywheel; Fx: Horizontal component of floor reaction force; Fz: Vertical component of floor reaction force; and My: Floor reaction force moment about desired ZMP (specifically, a component of floor reaction force moment about the lateral axis (Y-axis)).

$$Fz = mb*(g+d2Zb/dt2) + msup*(g+d2Zsup/dt2) + mswg*(g+d2Zswg/dt2) \quad \text{Expression 11}$$

$$Fx = mb*d2Xb/dt2 + msup*d2Xsup/dt2 + mswg*d2Xswg/dt2 \quad \text{Expression 12}$$

$$My = -mb*(Xb-Xzmp)*(g+d2Zb/dt2) + mb*(Zb-Zzmp)*(d2Xb/dt2) - msup*(Xsup-Xzmp)*(g+d2Zsup/dt2) + msup*(Zsup-Zzmp)*(d2Xsup/dt2) - mswg*(Xswg-Xzmp)*(g+d2Zswg/dt2) - mswg*(Zswg-Zzmp)*(d2Xswg/dt2) + J*d2\theta by/dt2 \quad \text{Expression 13}$$

In the second embodiment using such a simplified model, a simplified model gait that satisfies a desired ZMP is generated in exactly the same manner as that in the aforesaid publication document 1, as it will be discussed later.

Referring now to FIG. 17, a first displacement dimension correcting model of the present embodiment will be explained. This model is a five-mass-point model having a body mass point A1, thigh mass points A2 and A3, and foot mass points A4 and A5 corresponding to the body 3, the thigh links of the legs 2, and the feet 22, respectively. It is assumed that the body 3 (body link) of the robot 1 has inertia (inertial moment) Ib about the body mass point A1. In other words, the first displacement dimension correcting model of the present embodiment is constructed of the mass points A1 to A5 and the body link having the inertia as its elements, just like the first and the second displacement dimension correcting models of the first embodiment.

In this case, the body mass point A1 and the foot mass points A4 and A5 are set at points uniquely defined on the basis of the positions/postures of the parts (the body 3 and the feet 22) corresponding thereto (certain fixed points on a local coordinate system fixedly set arbitrarily on corresponding parts) as with those of the first or the second displacement dimension correcting model in the aforesaid first embodiment. The total sum of the masses of the body mass point A1, the foot mass points A4 and A5, and the mass points A2 and A3 of the thighs coincides with the total mass mtotal of the robot 1. The mass of the body mass point A1 includes the masses of both arms 5 and 5 and the head 4 in addition to the mass of the body 3.

A certain geometric restrictive condition is set on the placements of the elements of the first displacement dimension correcting model also in the present embodiment. Specifically, in the first displacement dimension correcting model, the knee joint of each leg 2 of the robot 1 is regarded as a direct-acting type (telescopic type) that expands/contracts only in the direction of a segment connecting the center of the ankle joint and the center of a hip joint of the leg 2, and each of the thigh mass points A2 and A3 is set at an internally dividing point of a segment connecting the center of the ankle joint and the center of the hip joint of its corresponding leg 2. The internally dividing point is a point at which the ratio of the distance from the internally dividing point to the center of the ankle joint to the distance therefrom to the center of the hip joint becomes a predetermined ratio, and it is a point in the vicinity of the knee joint when each leg 2 is linearly stretched (e.g., a point slightly deflected to the thigh link 24 from the center of the knee joint). Accordingly, in the first displacement dimension correcting model of the present embodiment, each of the thigh mass points A2 and A3 is restricted to the internally dividing point that connects the center of the ankle joint and the center of the hip joint of its corresponding leg 2.

The thigh mass points A2 and A3 may alternatively be set at a point offset by a predetermined distance from the internally dividing point in a direction orthogonal to the aforesaid segment. In other words, the thigh mass points A2 and A3 may be set on a straight line parallel to the segment that is apart from the aforesaid segment by a predetermined distance.

Further, the positions of the mass points A1 to A5 of the first displacement dimension correcting model on the global coordinate system and the posture angle of the body 3 (body link) are to be geometrically defined on the basis of the instantaneous values of the motions of a simplified model gait. More specifically, the position of the body mass point A1 of the first displacement dimension correcting model in the present embodiment on the global coordinate system is determined to be a position corresponding to the body position/posture of the simplified model gait, while the positions of the foot mass points A4 and A5 on the global coordinate system are determined to be the positions corresponding to the foot positions/postures of the simplified model gait. Further, the posture angle of the body link is set to be identical to the body posture of the simplified model gait. The positions of the thigh mass points A2 and A3 on the global coordinate system are determined to be the positions of the aforesaid internally dividing points defined on the basis of the body position/posture and the foot positions/postures of the simplified model gait. This means that the positions of the central points of the hip joints and the ankle joints of the legs 2 on the global coordinate system are uniquely defined on the basis of the body position/posture and the foot positions/postures of the robot 1, so that the positions of the thigh mass points A2 and A3 on the global coordinate system as the internally dividing points of the segments that connect the central points of the hip joints and the central points of ankle joints of the legs 2 are defined.

Further, in the first displacement dimension correcting model of the second embodiment, a predetermined ratio related to the aforesaid internally dividing points and the mass ratio of the mass points A1 to A5 are determined such that the overall center-of-gravity of the mass points A1 to A5 coincides with the position of the overall center-of-gravity of the robot 1 on a simplified model, that is, the positions of the centers of gravity of all mass points 2*m*2, 2*m*2, and 3*m*2 of a simplified model.

Here, determining the placement of the elements of the first displacement dimension correcting model as described above in the second embodiment is equivalent to determining the placement of the elements of the first displacement dimension correcting model according to a geometric restrictive condition (3) from instantaneous motions of a simplified model gait when the geometric restrictive condition (3) for establishing the placement of the elements of the first displacement dimension correcting model (the positions of the mass points A1 to A5 on a global coordinate system and the posture of the body link) is defined as shown below.

Geometric restrictive condition (3): Relative to a given arbitrary instantaneous desired motion, the placement of the body mass point A1 and the body link among the elements of the first displacement dimension correcting model coincides with the placement determined on the basis of the position/posture of the body 3 of the robot 1 in a given instantaneous desired motion, the position of each of the foot mass points A4 and A5 coincides with the placement determined on the basis of the position/posture of each foot of the robot 1 in the given instantaneous desired motion, and the position of each of the thigh mass points A2 and A3 coincides with the position of a predetermined internally dividing point on the segment that connects the center of the hip joint and the center of the ankle joint of each leg 2 in the given instantaneous desired motion.

In the second embodiment, this geometric restrictive condition (3) corresponds to the first geometric restrictive condition in the present invention.

In the present embodiment, the structure of the second displacement dimension correcting model is the same as the structure of the first embodiment shown in FIG. 8 described above, and includes a body mass point A1, thigh mass points A2 and A3, and foot mass points A4 and A5, and inertia Ib in the body link, as with the first displacement dimension correcting model in the present embodiment (the second embodiment). In this case, the positions of the body mass point A1 and the foot mass points A4 and A5 on the local coordinate system fixed to their corresponding parts (the body 3 and feet 22) are the same as those in the first displacement dimension correcting model of FIG. 17. Moreover, the masses of the mass points A1 to A5 and the inertia Ib of the body link are the same as those of the first displacement dimension correcting model of FIG. 17. In the second displacement dimension correcting model, the mass points A1 to A5 and the body 3 (body link) are movable to the positions/postures corresponding to an arbitrary posture state that the robot 1 may take. This means that the geometric restrictive condition (2) explained in the aforesaid first embodiment is established between an arbitrary instantaneous desired motion of the robot 1 and the placement of the elements of the second displacement dimension correcting model.

Next, the processing of the gait generating device 100 in the present embodiment (the second embodiment) will be explained in detail. The basic processing procedure of the gait generating device 100 in the present embodiment is the same as that of the first embodiment, and a gait is generated according to the flowchart of FIG. 9 mentioned above.

Specifically, the processing from S010 to S018 is implemented in the same manner as that of the first embodiment. The processing is the same as that of the first embodiment.

Then, the processing of S020 is carried out after S018 to determine the gait parameters of a current time gait. More specifically, the parameters of a desired foot position/posture trajectory, a desired arm posture trajectory, a desired ZMP trajectory, and a desired floor reaction force vertical component trajectory of the current time gait are determined, and the parameters that define a reference body posture trajectory, a floor reaction force horizontal component permissible range, and a ZMP permissible range are determined. In this case, the simplified model in the present embodiment is the same as the dynamic model used in the publication document 1, as described above; therefore, the gait parameters of the current time gait are determined by carrying out in S020 of the present embodiment the same processing as the processing of S022 to S030 of FIG. 13 of the publication document 1.

In the processing of S022 to S028 of FIG. 13 in the publication document 1, a floor reaction force horizontal component permissible range for simplified model gaits is set and used mainly to prepare normal gaits. In the present embodiment, the floor reaction force horizontal component permissible range for simplified model gaits may be, for example, the same as the floor reaction force horizontal component permissible range for full model correction set in S30 of FIG. 13 in the publication document 1, or may be set to be a range that is wider than that. Alternatively, as with the first embodiment of the present description, the floor reaction force horizontal component permissible range for simplified model gaits may be defined to be an infinite range or a wide range so that the floor reaction force horizontal components of simplified model gaits (or normal gaits) always fall within the floor reaction force horizontal component permissible range.

Subsequently, after the processing of S020 of FIG. 9, or if a determination result of S016 is NO, the processing advances to S022 wherein the instantaneous value of a current time gait (simplified model gait) is determined on the basis of gait parameters (the gait parameters determined in S020). In this case, the simplified model in the present embodiment is identical to the dynamic model used in the publication document 1 as described above, so that the instantaneous value of a simplified model gait is determined by carrying out, in S022 of the present embodiment, the same processing as the processing of S032 of FIG. 13 in the publication document 1.

To be more specific, the instantaneous values of a desired foot position/posture, a desired ZMP, a desired arm posture, a desired floor reaction force vertical component, and a reference body posture are determined on the basis of the gait parameters determined in S020. Furthermore, the instantaneous values of desired body position/posture are determined such that, on the simplified model of FIG. 16 described above, the horizontal component of the moment generated about the desired ZMP by the resultant force of the inertial force produced by a motion of the robot 1 and gravity becomes zero, the translational force vertical component of the resultant force balances out the desired floor reaction force vertical component, and the floor reaction force horizontal component does not exceed a floor reaction force horizontal component permissible range for simplified model gaits. Supplementally, regarding the instantaneous values of the desired body position/posture, the desired body position vertical component is determined on the basis of the vertical position of the body mass point 3$m2$ of the simplified model determined from the desired floor reaction force vertical component and the aforesaid Expression 11. And, during a period in which the desired floor reaction force vertical component is relatively large, the desired body posture and the desired body position horizontal component are determined by mainly adjusting the horizontal acceleration of the body 3 such that the instantaneous value of the desired body posture approximates the reference body posture (e.g., a vertical posture) while the horizontal component of the moment about the desired ZMP becomes zero. During a period in which the desired floor reaction force vertical component is relatively small or zero, the instantaneous values of the desired body posture and the desired body position horizontal component are determined by mainly adjusting angular acceleration of the posture angle of the body 3 such that the horizontal component of the moment about the desired ZMP becomes zero while the horizontal acceleration of the body 3 is controlled to substantially zero at the same time.

The floor reaction force horizontal component permissible range for simplified model gaits used for the processing of S022 may be the same as that used for the processing of S020 described above.

Subsequently, the processing advances to S024 to execute a displacement dimension correcting subroutine. The basic processing procedure of this subroutine processing is the same as that of the aforesaid first embodiment, and it is carried out according to the flowchart of FIG. 10 mentioned above. Specifically, first, in S200, the positions of the mass points A1 to A5 and the posture angle of the body link having inertia in the first displacement dimension correcting model are determined on the basis of the instantaneous values of the simplified model gait at current time t. In this case, as described above, the position of the body mass point A1 of the first displacement dimension correcting model is determined to be the position based on the instantaneous values of the body position/posture of the simplified model gait, and the positions of the foot mass points A4 and A5 are determined to be the positions based on the foot positions/postures of the simplified model gait. The position of each of the thigh mass points A2 and A3 is determined to be the position of the internally dividing point obtained by internally dividing the segment, which connects the central point of the hip joint and the central point of the ankle joint of each leg 2 of the robot 1 established on the basis of the body position/posture and each foot position/posture of the simplified model gait, by a predetermined ratio. Further, the posture angle of the body link of the first displacement dimension correcting model is set to be identical to the body posture angle of the simplified model gait.

Thus, the placement of each element of the first displacement dimension correcting model is determined from an instantaneous desired motion (the instantaneous value at the current time t) of a simplified model gait according to the geometric restrictive condition (3) associated with the first displacement dimension correcting model in the present embodiment. This placement corresponds to the first placement in the first and a third inventions.

Then, the processing from S202 to S218 is carried out. The processing is the same as that in the first embodiment. More specifically, the placement of the elements of a second displacement dimension correcting model that satisfies the aforesaid conditions 1 and 2 (the placement corresponding to the third placement in the first invention and a second placement in the third invention) and further a displacement dimension corrected body position/posture are exploratorily determined, and the determined position/posture are decided as the displacement dimension corrected body position/posture (Pb2, θb2) at the current time t. This provides the displacement dimension corrected gait obtained by correcting the body position/posture of a simplified model gait. Supplementally, in the present embodiment, the positions of both foot mass points A5 and A6 of each displacement dimension correcting model are the same as those in both displacement dimension correcting models. Accordingly, terms related to both foot mass points A5 and A6 may be omitted when calculating the inter-model overall center-of-gravity error Gc_err and the inter-model angular momentum product error L_err in S208.

Returning to the explanation of FIG. 9, after the displacement dimension gait correcting subroutine is executed as described above, the processing from S026 to S032 is carried out in the same manner as that in the first embodiment. The processing is the same as that in the first embodiment.

The operation of a composite-compliance control unit 101 to which a desired gait, which is generated by the gait generating device 100 as explained above, is supplied is the same as that in the aforesaid first embodiment.

Referring now to FIG. 18 and FIG. 19, the displacement dimension corrected gait in the present embodiment will be supplementally explained. FIG. 18 illustrates the relationship between the positions of the mass points Ai (i=1, 2, ..., 5) and the posture angle of the body 3 (body link) of a second displacement dimension correcting model and the positions of the mass points Ai and the posture angle of the body 3 (body link) of a first displacement dimension correcting model in a case where the positions of the mass points Ai and the posture angle of the body 3 (body link) of the second displacement dimension correcting model are determined as per a simplified model gait (meaning that the simplified model gait is not corrected in the aforesaid S024). The positions of the mass points Ai and the posture angle of the body 3 of the second displacement dimension correcting model, i.e., the placement of the elements of the second displacement dimension correcting model, may be said in other words that they are determined from an instantaneous motion of a simplified model gait according to the aforesaid geometric restrictive condition (2) (this corresponding to the second placement in the first invention). In FIG. 18, the positions of the mass points Ai (i=1, 2, ..., 5) of the second displacement dimension correcting model corresponding to the simplified model gait are denoted by Pi2' (Ai).

Further, FIG. 19 illustrates the relationship between the positions of the mass points Ai and the posture angle of the body 3 (body link) of the second displacement dimension correcting model determined by the displacement dimension gait correcting subroutine described above and the positions of the mass points Ai and the posture angle of the body 3 (body link) of the first displacement dimension correcting model.

In the example shown in FIG. 18, at a position Pi2' of each mass point Ai of the second displacement dimension correcting model corresponding to a simplified model gait, thigh mass points P22' and P32' lie on the front side of the robot 1 relative to the first displacement dimension correcting model. This means that the overall center-of-gravity of the robot 1 in the second displacement dimension correcting model is deflected further toward the front of the robot 1 (in the positive direction of the X-axis) than the overall center-of-gravity of the robot 1 in the simplified model gait. In other words, the total sum of the translational force components of the inertial forces produced by the thigh mass points A2 and A3 due to the inter-model pseudo translational acceleration of the thigh mass points A2 and A3 of the two legs 2 and 2 (=Masses of the mass points A2 and A3*Inter-model pseudo translational acceleration) is generated at the rear side of the robot 1. Further, the moment acting about a desired ZMP by the inertial force produced by the thigh mass points A2 and A3 by the inter-model pseudo translational acceleration of the thigh mass points A2 and A3 is generated at the backward inclination side of the robot 1. In the present embodiment, the positions/postures of both feet and the body position/posture remain the same in the simplified model gait and the first displacement dimension correcting model. Hence, in the example of FIG. 18, the inter-model pseudo translational acceleration of the body mass point A1 and the foot mass points A4 and A5 are zero, and the inter-model pseudo angular acceleration of the body link is also zero.

In contrast to the above, if the aforesaid displacement dimension gait correcting subroutine is used to determine the positions of the mass points Ai of the second displacement dimension correcting model corresponding to a displacement dimension corrected gait, then the position of the body mass point A1 of the second displacement dimension correcting model is determined to lie further toward the rear beyond the body mass point A1 of the first displacement dimension correcting model, that is, the body position is corrected to be further toward the rear than the simplified model gait so as to compensate the deflection of the thigh mass points A2 and A3 toward the front side, as shown in FIG. 19. At the same time, the positions of the mass points A1 to A5 and the posture of the body 3 having inertia in the second displacement dimension correcting model are determined such that the aforesaid angular momentum product takes a certain fixed value. In the illustrated example, the body posture (the posture of the body 3 indicated by the solid line) in the second displacement dimension correcting model is inclined forward by an angle θb2−θb1 relative to the body posture of a simplified model gait (the posture of the body 3 indicated by the dashed line).

Supplementally, values obtained by doubling the area of the triangle marked with diagonal lines or horizontal lines in FIG. 19 correspond to the angular momentum products related to the body mass point A1 and the thigh mass points A2, A3, respectively.

Therefore, with the positions of the mass points Ai and the posture angle of the body link of the second displacement dimension correcting model corresponding to a displacement dimension corrected gait, the total sum of the translational force components of the inertial forces from the inter-model pseudo translational acceleration of the mass points Ai is smaller than in the case shown in FIG. 18 and becomes substantially zero, and the total sum of the moments generated about a desired ZMP by the inertial force also becomes closer to a predetermined value (a value corresponding to "the fixed value" related to the condition 2 mentioned above) than in the case shown in FIG. 18.

Thus, the displacement dimension corrected gait will be the one obtained by correcting a desired motion of the robot 1 so that a floor reaction force similar to the desired floor reaction force of a simplified model gait is generated, compensating for the influence of the inertial force from the motion of a part in the vicinity of the knee joint of each leg, which is not considered in a simplified model gait.

According to the present embodiment, when a gait in which the body 3 is lowered from an upright posture state of the robot 1 by bending the knee joints of both legs 2 and 2 while maintaining the desired ZMP constant is generated, the displacement dimension corrected body position/posture will be the position/posture in which the hip joints (the bottom end portions of the body 3), which are the connecting portions between the body 3 and both legs 2, 2, are displaced further toward the rear side of the robot 1 than in the simplified model gait (that is, substantially in the opposite direction from the direction in which the knee joints project), and the body 3 is inclined further toward the front than the body posture of the simplified model gait, as with the aforesaid first embodiment (as in the case shown in FIG. 14 described above).

Third Embodiment

A third embodiment of the present invention will now be explained. The present embodiment shares the same mechanical construction of the robot 1 as that of the first embodiment, and differs from the first and the second embodiments in the simplified model, the structures of the first displacement dimension correcting model and the second displacement dimension correcting model, and a part of the processing of the gait generating device 100. Hence, in the explanation of the present embodiment, the same reference numerals and drawings as those of the first or the second embodiment will be used for the same portions as those of the first or the second embodiment, and detailed explanation will be omitted. The following will explain the present embodiment, focusing mainly on the portions that are different from the first or the second embodiment. Incidentally, the present embodiment is an embodiment of the aforesaid first to eighth inventions.

In the present embodiment, a simplified model is to be the model having the same structure as that of, for example, the second displacement dimension correcting model shown in the aforementioned FIG. 8. More specifically, as shown in the aforesaid FIG. 8, the simplified model of the present embodiment is a dynamic model that has five mass points composed of a body mass point A1, thigh mass points A2, A3, and foot mass points A4, A5 corresponding to a body 3, thigh links of both legs 2, 2, and both feet 22, 22, respectively, the body 3 (body link) having inertia Ib about the body mass point A1. The dynamics of the simplified model is expressed, although the expression thereof will be omitted, as a relational expression of the translational motions of the mass points A1 to A5, the rotational motion of the body link, and floor reaction forces (a translational floor reaction force and a floor reaction force moment about a desired ZMP), as with, for example, the simplified model of the second embodiment described above. For instance, the dynamics of the mass points A1 to A5 and the body link is configured such that they do not interfere with each other, and the overall dynamics of a robot 1 is expressed by their linear connections.

FIG. 20 shows the structure of a first displacement dimension correcting model in the present embodiment. In FIG. 20, the posture state of the robot 1 is a standing state in which the two legs 2 and 2 are placed side by side in the lateral direction (the Y-axis direction), so that the two legs 2 and 2 are overlapped in the drawing.

The first displacement dimension correcting model is a seven-mass point model composed of a body mass point B1 corresponding to the body 3 of the robot 1, thigh mass points B2, B3 corresponding to thigh link portions in the vicinity of the knee joints of the legs 2, foot mass points B4, B5 respectively corresponding to the distal portions (feet 22) of the legs 2, and arm mass points B6, B7 respectively corresponding to arms 5 of the robot 1. The body 3 (body link) in the first displacement dimension correcting model is constructed so as to have inertia (inertial moment) It about the body mass point A1, and the arms 5 are constructed so as to have inertia Ia about the arm mass points B6 and B7. This means that the first displacement dimension correcting model of the present embodiment is formed of the mass points B1 to B7, the body 3 having the inertia It, and the arms 5, 5 respectively having inertia Ia as its elements.

In this case, the body mass point B1, the thigh mass points B2, B3, and the foot mass points B4, B5 in the first displacement dimension correcting model are set at certain fixed points on local coordinate systems arbitrarily fixed to their corresponding parts (the body 3, thigh links, and feet 22), as with the mass points A1 to A5 of the second displacement dimension correcting model of the first embodiment. Furthermore, each of the arm mass points B6 and B7 is set at a certain fixed point (a point closer to the distal portions of the arms 5) on a local coordinate system arbitrarily fixed to a link of each arm 5, e.g., the link between the elbow joint and a wrist joint of the arm 5.

The total sum of the masses of the mass points B1 to B7 of the first displacement dimension correcting model is set to be equal to the total mass of the robot 1, and the total sum of the masses of the body mass point B1 and the arm mass points B6, B7 is set so as to be the same mass as the body mass point A1 of the simplified model (FIG. 8) in the present embodiment.

And, in the present embodiment also, a certain geometric restrictive condition is established on the placement of the elements of the first displacement dimension correcting model. Specifically, in the first displacement dimension correcting model of the present embodiment, both arms 5 and 5 are restricted to the state fixed to the posture state shown in FIG. 20 relative to the body 3. In other words, the relative postures of the two arms 5 and 5 relative to the body 3 in the first displacement dimension correcting model, and further, the relative positional relationship between the body mass point B1 and the arm mass points B6, B7 are constant.

Supplementally, the center-of-gravity points of the body mass point B1 and the arm mass points B6, B7 of the first displacement dimension correcting model are set so as to agree with the body mass point A1 of the simplified model (FIG. 8) in the present embodiment. In addition, the inertia It of the body link and the inertia Ia of each arm 5 are set so as to satisfy the inertia Ib of the body link of the simplified model in the present embodiment and the following relational expression 14.

$Ib = It + Ib + \text{Mass of body mass point } B1*(\text{Distance between body mass point } B1 \text{ and body mass point } A1)^2 + \text{Mass of arm mass point } B6*(\text{Distance between arm mass point } B6 \text{ and body mass point } A1)^2 + \text{Mass of arm mass point } B7*(\text{Distance between arm mass point } B7 \text{ and body mass point } A1)^2$   Expression 14

The positions of the mass points B1 to B7 of the first displacement dimension correcting model on the global coordinate system and the posture of the body 3 are to be geometrically defined on the basis of the instantaneous values of a motion of a simplified model gait. To be more specific, the position of the body mass point B1 of the first displacement dimension correcting model of the present embodiment on the global coordinate system is determined to be the position corresponding to the body position/posture of the simplified model gait, while the positions of the foot mass points B4 and B5 on the global coordinate system are determined to be the positions corresponding to the foot positions/postures of the simplified model gait. Further, the positions of the thigh mass points B2 and B3 are determined to be the positions corresponding to the position/posture of the thigh link of each leg 2 determined from the body position/posture and the positions/postures of both feet of the simplified model gait. In the first displacement dimension correcting model, the relative postures of the arms 5 and 5 in relation to the body 3 are constant, as described above, so that the positions of the arm mass points B6 and B7 on the global coordinate system will be uniquely defined on the basis of the body position/posture of the simplified model gait.

If a geometric restrictive condition (4) for defining the placement of the elements of the first displacement dimension correcting model (the positions of the mass points B1 to B7 and the postures of the body link and the arms on the global coordinate system) is defined as follows, then defining the placement of the elements of the first displacement dimension correcting model as described above in the third embodiment is equivalent to determining the placement of the elements of the first displacement dimension correcting model according to the geometric restrictive condition (4) from an instantaneous motion of a simplified model gait.

Geometric restrictive condition (4): With respect to a given arbitrary instantaneous desired motion, the placement of the body mass point B1 and the body link among the elements of the first displacement dimension correcting model agrees with the placement determined on the basis of the position/posture of the body 3 of the robot 1 in the given instantaneous desired motion, the positions of the foot mass points B4, B5 agree with the positions determined on the basis of the foot positions/postures of the robot 1 in the given instantaneous desired motion, the positions of the thigh mass points B2, B3 agree with the positions determined on the basis of the positions/postures of the thigh links of the legs 2 in the given instantaneous desired motion, and the placement of the arm mass points B6, B7 and the arms 5 (the links having inertia) becomes the placement that has a predetermined relative relationship with the position/posture of the body 3 of the robot 1 in the given instantaneous desired motion.

In the third embodiment, this geometric restrictive condition (4) corresponds to the first geometric restrictive condition in the present invention.

FIG. 21 shows the structure of a second displacement dimension correcting model in the present embodiment. The second displacement dimension correcting model is a model that shares the same basic structure as the first displacement dimension correcting model shown in FIG. 20, and has seven mass points B1 to B7, as with the first displacement dimension correcting model, the body 3 (body link) having inertia It about the mass point B1 and the arms 5 having inertia Ia about the arm mass points B6, B7. The masses of the mass points B1 to B7 and the positions of the mass points B1 to B7 on the local coordinate systems fixed to corresponding parts are the same as those of the first displacement dimension correcting model shown in FIG. 20. Furthermore, the inertias It and Ia are the same as those of the first displacement dimension correcting model shown in FIG. 20. In this second displacement dimension correcting model, the mass points B1 to B7, the body 3 (body link) and the arms 5 can be moved to positions/postures corresponding to arbitrary posture states that the robot 1 may take. In other words, geometric restrictive condition (2) explained in the aforesaid first embodiment has been established between an arbitrary instantaneous desired motion of the robot 1 and the placement of the elements of the second displacement dimension correcting model.

Regarding the positions of the mass points B1 to B7 of the second displacement dimension correcting model on the global coordinate system, the positions of the foot mass points B4 and B5 are specified to be the positions corresponding to the foot positions/postures of a simplified model gait. Further, the positions of the body mass point B1 and the thigh mass points B2, B3, the positions of the arm mass points 5B6, B7, and the postures of the body 3 (body link) and the arms 5 are determined such that they satisfy the aforesaid conditions 1 and 2, and that the relative postures of the arms 5 relative to the body 3 agree with the relative postures of the simplified model gait.

The processing of the gait generating device 100 in the present embodiment (the third embodiment) will now be explained in detail. The basic processing procedure of the gait generating device 100 in the present embodiment is the same as that of the first embodiment; a gait is generated according to the flowchart of FIG. 9 described above. In the present embodiment, however, the processing of S026 is omitted.

Specifically, the processing from S010 to S018 is implemented in the same manner as that of the first embodiment. The processing is the same as that of the first embodiment.

Then, the processing of S020 is carried out after S018 to determine the gait parameters of a current time gait. More specifically, the parameters for specifying a desired foot position/posture trajectory, a desired arm posture trajectory, a desired ZMP trajectory, and a desired floor reaction force vertical component trajectory of the current time gait are determined, and the parameters for defining a reference body posture trajectory, a floor reaction force horizontal component permissible range, and a ZMP permissible range are determined. In this case, the processing of S020 may be implemented in the same manner as that of, for example, the aforesaid second embodiment. In the present embodiment, however, the simplified model shown in FIG. 8 is used in place of the dynamic model shown in the aforesaid FIG. 16 as the dynamic model (simplified model) for carrying out the processing of S020.

Subsequently, after the processing of S020 of FIG. 9, or if a determination result of S016 is NO, the processing advances to S022 wherein the instantaneous value of a current time gait (simplified model gait) is determined on the basis of the gait parameters (the gait parameters determined in S020). This processing is executed in the same manner as that of, for example, the aforesaid second embodiment. In the present embodiment, however, the simplified model of FIG. 8 is used to determine the instantaneous values of the current time gait (specifically, the instantaneous values of body position/posture). Supplementally, in the simplified model of FIG. 8 in the present embodiment, the relative postures of the two arms 5 and 5 relative to the body 3 are fixed to the posture state illustrated in the aforesaid FIG. 20. Hence, the instantaneous values of the body position/posture among the instantaneous values of the current time gait determined in S022 are determined such that the horizontal component of the floor reaction force moment about a desired ZMP becomes zero on the simplified model shown in FIG. 8, assuming that the relative postures of the two arms 5 and 5 relative to the body 3 are fixed to the posture state shown in FIG. 20.

Subsequently, the processing advances to S024 to execute a displacement dimension correcting subroutine. The basic processing procedure of this subroutine processing is the same as that of the aforesaid first embodiment; however, a part of the processing differs from the first embodiment. The processing is carried out according to the flowchart of FIG. 23. Specifically, first, in S400, the positions of the mass points B1 to B7 and the postures of the body link and the arms 5, 5 having inertia in the first displacement dimension correcting model are determined on the basis of the instantaneous values of the simplified model gait at current time t. In this case, as described above, the positions of the body mass point B1 and the two arm mass points B6, B7 of the first displacement dimension correcting model of the present embodiment are determined to be the positions corresponding to the body position/posture of the simplified model gait, and the positions of the foot mass points B4, B5 are determined to be the positions corresponding to the foot positions/postures of the simplified model gait. The positions of the thigh mass points B2 and B3 are determined to be the positions corresponding to the positions/postures of the thigh links of the legs 2 determined from the body position/posture and the positions/postures of both feet of the simplified model gait. Further, the posture of the body link of the first displacement dimension correcting model is set to be identical to the body posture of the simplified model gait. The postures of the arms 5, 5 of the first displacement dimension correcting model are fixed to the posture state shown in FIG. 20 relative to the body 3, as described above, so that the postures of the arms 5, 5 will be uniquely defined once the posture of the body 3 (body link) of the first displacement dimension correcting model is determined. Accordingly, the postures of the arms 5, 5 in the first displacement dimension correcting model are generally different from the instantaneous values of arm postures of the simplified model gait.

Subsequently, the processing proceeds to S402 wherein initial candidates of displacement dimension corrected body position/posture are determined in exactly the same manner as in S202 shown in FIG. 10 mentioned above.

Subsequently, the loop processing from S406 to S416 via S404 is carried out in the same manner as in S206 to S216 of FIG. 10. In this case, a part of the processing of S406, S408 and S414 differs from the first embodiment. Specifically, in S406, the positions of the mass points B1 to B7 in the second displacement dimension correcting model are determined on the basis of current candidates (Pb2_s, θb2_s) of displacement dimension corrected body position/posture and desired foot position/posture and desired arm postures of a simplified model gait at current time t. In this case, the positions of the mass points B1 to B7 and the postures of the arms 5, 5 are determined, assuming that the position/posture of the body 3 of the robot 1 in the second displacement dimension correcting model agree with the current candidates (Pb2_s, θb2_s), the positions/postures of the feet 22 of the robot 1 in the second displacement dimension correcting model agree with the desired foot positions/postures of the simplified model gait, and the relative postures of both arms 5, 5 of the robot 1 relative to the body 3 in the second displacement dimension correcting model agree with the arm postures of the simplified model gait.

Specifically, the positions of the foot mass points B3 and B4 are determined from the desired foot position/posture. The position of the body mass point B1 is determined from the candidates (Pb2_s, θb2_s), and the posture angle of the body 3 (body link) is set to be equal to θb2_s. And, the positions of the thigh mass points B2 and B3 are determined from the postures of the legs 2 of the robot 1 defined by the desired foot positions/postures and the candidates (Pb2_s, θb2_s). Furthermore, the postures of both arms 5 and 5 (the relative postures relative to the body 3) of the second displacement dimension correcting model are set to be the same as the desired arm postures. Furthermore, the positions of both arm mass points B6 and B7 are determined to be the positions corresponding to desired arm postures relative to the body 3. Supplementally, once the body position/posture and the relative postures of both arms 5, 5 relative to the body 3 are determined, the positions of both arm mass points B6 and B7 (the positions on the global coordinate system) will be uniquely defined.

In the processing of S408, an inter-model overall center-of-gravity error Gc_err is determined according to the aforementioned Expression 06, as with the first embodiment. However, the computation of Σ of the right side of Expression 06 in this case is the computation of the total sum related to all mass points B1 to B7 of a displacement dimension correcting model in the present embodiment. An inter-model angular momentum product error L_err is calculated by an expression obtained by, for example, replacing "Ib*(θb2−θb1)" of the right side of the abovementioned Expression 07 with "It*(θb2−θb1)+Ia*(θa2R−θa1R)+Ia*(θa2L−θa1L)". Here, θa2R denotes a posture angle representing the posture of the right arm 5R relative to the body 3 of the second displacement dimension correcting model (e.g., a relative inclination angle of a link, which connects the shoulder joint and the elbow joint of the arm 5, relative to the body 3). Similarly, θa1R denotes a posture angle of the right arm 5R relative to the body 3 of the first displacement dimension correcting model, θa2L denotes a posture angle of the left arm 5L relative to the body 3 of the second displacement dimension correcting model, and θa1L denotes a posture angle of the left arm 5L relative to the body 3 of the first displacement dimension correcting model. In the present embodiment, the desired arm postures of both arms 5 and 5 set the elbow joints at constant bending angles. Supplementally, in the present embodiment, the computation of Σ of the right side of Expression 07 is to obtain the total sum related to all mass points B1 to B7, as in the case of the inter-model overall center-of-gravity error Gc_err.

In S414, an inter-model overall center-of-gravity error and an inter-model angular momentum product error are determined in the same manner as that in S408.

Following the loop processing of S406 to S416, the processing of S418 is carried out to determine displacement dimension corrected body position/posture (Pb2, θb2) at current time t. This processing is exactly the same as S218 of FIG. 10.

Displacement dimension corrected body position/posture that satisfy the aforesaid conditions 1 and 2 are exploratorily determined by the displacement dimension gait correcting subroutine described above, and the obtained position/posture are decided as the displacement dimension corrected body position/posture (Pb2, θb2) at current time t. This provides the displacement dimension corrected gait obtained by correcting the body position/posture of a simplified model gait. Supplementally, in the present embodiment, the positions of the two feet mass points B5 and B6 of each displacement dimension correcting model are the same in both displacement dimension correcting models. Hence, the terms related to the two foot mass points B4 and B5 may be omitted when calculating the inter-model overall center-of-gravity error Gc_err and the inter-model angular momentum product error L_err in S208.

Returning to the explanation of FIG. 9, after the displacement dimension gait correcting subroutine is executed as discussed above, the processing of S028 to S032 is carried out in the same manner as with the first embodiment, the processing of S026 being omitted. The processing of the S028 to S032 is the same as that in the first embodiment.

The operation of a composite-compliance control unit 101, to which a desired gait generated as explained above by the gait generating device 100 is supplied, is the same as that in the aforesaid first embodiment.

Here, the aforesaid displacement dimension corrected gait in the present embodiment will be supplementally explained with reference to FIG. 22. FIG. 22 illustrates the relationship between the positions of mass points Bi (i=1, 2, . . . , 7), the posture angle of the body 3 (body link) and the postures of both arms 5, 5 of the second displacement dimension correcting model determined by the displacement dimension gait correcting subroutine described above and the positions of the mass points Bi, the posture angle of the body 3 (body link), and the postures of both arms 5, 5 of the first displacement dimension correcting model in a case where, for example, a gait is generated for projecting the distal portions of both arms 5 and 5 toward the front side of the body 3 from the state wherein the robot 1 is standing in the upright posture as shown in FIG. 20 while maintaining a desired ZMP at the same time. In this case, the posture state of the robot 1 of FIG. 21 shown above corresponds to the one in the case where the mass points Bi, the posture angle of the body 3, and the postures of both arms 5, 5 (relative postures with respect to the body 3) of the second displacement dimension correcting model have been determined according to a simplified model gait. In other words, the positions of the mass points Bi, the posture angle of the body 3 and the postures of the arms 5 of the second displacement dimension correcting model in FIG. 21, that is, the placement of the elements of the second displacement dimension correcting model, is determined from an instantaneous motion of a simplified model gait according to the aforesaid geometric restrictive condition (2). Therefore, the placement of the elements of the second displacement dimension correcting model in this case corresponds to the second placement of the first invention.

When generating the gait for projecting both arms 5 and 5 toward the front side as shown in FIG. 22 from the posture state of the robot 1 shown in FIG. 20, the simplified model gait will be a gait in which both arms 5 and 5 are projected forward while maintaining the body position/posture, as shown in FIG. 21. Hence, if the positions of the mass points Bi, the posture of the body 3 and the postures of both arms 5, 5 of the second displacement dimension correcting model are determined according to the simplified model gait, then both arm mass points B6 and B7 of the second displacement dimension correcting model jut out forward relative to the first displacement dimension correcting model (refer to FIG. 20). Thus, as shown in FIG. 22, a position P12 of the body mass point B1 of the second displacement dimension correcting model is shifted further toward the rear than a position P11 of the body mass point B1 of the first displacement dimension correcting model so as to make the overall centers of gravity in both displacement dimension correcting models coincide (to satisfy the aforesaid condition 1), as shown in FIG. 22. In other words, the position P12 of the body mass points B1 of the second displacement dimension correcting model is shifted further at the rear than the position P11 of the body mass point B1 of the first displacement dimension correcting model so as to cancel the translational force components of the inertial forces produced due to the inter-model pseudo translational acceleration of both arm mass points B6 and B7 by the translational force component of the inertial force produced due to the inter-model pseudo translational acceleration of the body mass point A1. At this time, since the position P12 is shifted further at the rear than the position P11 of the body mass point B1 of the first displacement dimension correcting model, positions P22 and P32 of the thigh mass points B2 and B3 of the second displacement dimension correcting model are also slightly shifted relative to positions P21 and P31 of the thigh mass points B2 and B3 of the first displacement dimension correcting model.

At this time, if it is assumed that the posture of the body 3 is maintained, then the aforesaid inter-model angular momentum product error L_err occurs between the first displacement dimension correcting model and the second displacement dimension correcting model. And, to eliminate the error L_err (to satisfy the aforesaid condition 2), the body posture in the second displacement dimension correcting model (the posture of the body 3 in FIG. 22), that is, the body posture of a displacement dimension corrected gait, inclines forward relative to the body posture in the first displacement dimension correcting model (the posture of the body 3 shown in FIG. 20), that is, the body posture of a simplified model gait. To be more specific, the body posture of the displacement dimension corrected gait inclines forward relative to the body posture of the simplified model gait so that the moment acting about a desired ZMP caused by the inertial forces from the inter-model pseudo translational acceleration of the body mass point B1, the thigh mass points B2, B3 and the arm mass points B6, B7, and by the inertial forces from the inter-model pseudo angular acceleration of the arms 5, 5 is cancelled.

Determining a displacement dimension corrected gait by correcting motions (body position/posture) relative to a simplified model gait will determine a displacement dimension corrected gait with higher dynamic accuracy than the simplified model gait, while satisfying a dynamic balance condition, such as the one in that the horizontal component of a floor reaction force moment about a desired ZMP is zero, as with the simplified model gait.

Supplementally, in the first to the third embodiments explained above, the first geometric restrictive condition and the second geometric restrictive condition have been established as discussed above; therefore, the value, which is obtained by adding a predetermined normal offset (corresponding to "Const" of the above Expressions 07 to 10) to the difference between a floor reaction force (a floor reaction force moment about a desired ZMP) that balances out the resultant force of the inertial forces of the elements produced due to temporal changes of the placement of the elements of the first displacement dimension correcting model (changes at every computation processing cycle of the gait generating device 100) determined from an instantaneous motion of a simplified model gait according to the first geometric restrictive condition and a floor reaction force (a floor reaction force moment about a desired ZMP) that balances out the resultant force of the inertial forces of the elements that are produced due to temporal changes of the placement of the elements of the second displacement dimension correcting model (changes at every computation processing cycle of the gait generating device 100) in the case where the placement of the elements of the second displacement dimension correcting model is determined from the instantaneous motion of the simplified model gait according to the aforesaid second geometric restrictive condition, substantially agrees with the error of a floor reaction force (a floor reaction force moment about a desired ZMP) generated on the simplified model by the instantaneous motion of the simplified model gait. Thus, the first to the third embodiments provide the eighth invention.

Next, some modifications associated with the first to the third embodiments explained above will be explained.

In the first to the third embodiments described above, a desired ZMP has been used as the point Q related to an angular momentum product; however, the point Q may be a point other than the desired ZMP, and it may be any one of, for example, the following points:

a) Origin of a coordinate system (global coordinate system) describing a gait;

b) Appropriately set point that continuously moves together with the robot 1;

c) Overall center-of-gravity of the robot 1 in a full model;

d) Overall center-of-gravity of the robot 1 in a simplified model; and e) Center-of-gravity of a set of predetermined mass points related to the first and the second displacement dimension correcting models (specifically, the center-of-gravity of a set of mass points that may incur positional differences between the first and the second displacement dimension correcting models. For example, in the first embodiment, the center-of-gravity of the set of all the mass points A1 to A5 applies, and in the second embodiment, the center-of-gravity of the set of the body mass point A1 and the thigh mass points A2 and A3 applies).

In the explanation of the aforesaid first to third embodiments, in the processing of the displacement dimension gait correcting subroutine of S024 shown in FIG. 9, the processing for correcting the body position/posture of a simplified model gait on the sagittal plane has been explained. Alternatively, however, the body position/posture on the lateral plane orthogonal to the sagittal plane may be corrected together. In this case, the processing of, for example, S200 to S218 of FIG. 10 may be expanded to be three-dimensional. Alternatively, the processing for correcting the body position/posture on the sagittal plane and the processing for correcting the body position/posture on the lateral plane may be independently carried out using an algorithm similar to that shown in FIG. 10. Supplementally, when correcting body position/posture, including a vertical component of a body position, if the processing for correcting the body position/posture on the sagittal plane and the processing for correcting the body position on the lateral plane are carried out independently, then the vertical component of the body position may be corrected by carrying out the correction processing on one of the sagittal plane and the lateral plane, and the body position/posture excluding the vertical component of the body position may be corrected on the other plane by the correction processing.

Further, the body position/posture on a horizontal plane (level plane) may be corrected together. Alternatively, body position/posture may be corrected on one or two of the sagittal plane, the lateral plane, and the horizontal plane.

Further, in the processing of the displacement dimension gait correcting subroutine of S024 shown in FIG. 9 in the first to the third embodiments, the initial candidates (Pb2_s, θb2_s) of the displacement dimension corrected body position/posture have been determined using the displacement dimension corrected body position/posture determined at the time of the last control cycle. Alternatively, for example, the initial candidates (Pb2_s, θb2_s) may be set to be the same as the body position/posture of a simplified model gait. However, to promptly explore the displacement dimension corrected body position/posture that satisfy the aforesaid conditions 1 and 2, it is desirable to determine the initial candidates (Pb2_s, θb2_s), as explained in the aforesaid first to third embodiments.

In the processing of the displacement dimension gait correcting subroutine in the first to the third embodiments, the displacement dimension corrected body position/posture that satisfy the aforesaid conditions 1 and 2 have been exploratorily determined. Alternatively, for example, the amount of correction from the body position/posture of a simplified model gait to displacement dimension corrected body position/posture may be determined, using a function expression or a map prepared beforehand, from the difference between the placement of the elements of the second displacement dimension correcting model (the positions of the mass points and the postures of the links having inertia) determined according to the aforesaid geometric restrictive condition (2) (according to a simplified model gait) and the placement of the elements of the first displacement dimension correcting model (the differences in the positions of the mass points and the differences in posture angles of the links having inertia between the two models), and then the body position/posture of the simplified model gait may be corrected on the basis of the determined correction amount thereby to determine the displacement dimension corrected body position/posture.

Furthermore, in the processing of the displacement dimension gait correcting subroutine in the first to the third embodiments, determining whether the inter-model overall center-of-gravity error Gc_err and the inter-model angular momentum product error Lc_err fall within permissible ranges or not (the processing of S210 of FIG. 10 or S410 of FIG. 23) may be omitted, and the search may be finished when the number of searches (the number of updates of candidates (Pb2_s, θb2_s)) reaches a predetermined number, and the then candidates (Pb2_s, θb2_s) may be decided as the displacement dimension corrected body position/posture. Alternatively, the search may be finished if the inter-model overall center-of-gravity error Gc_err and the inter-model angular momentum product error Lc_err fall within permissible ranges or when the number of searches reaches a predetermined number, and the then candidates (Pb2_s, θb2_s) may be decided as the displacement dimension corrected body position/posture.

Regarding the second embodiment, the positional differences in the thigh mass points A2 and A3 between the first and the second displacement dimension correcting models are substantially equal to the positional deviation of the thigh mass points A2 and A3 of the second displacement dimension correcting model relative to the segment connecting the central point of the ankle joint and the central point of the hip joint of each leg 2 (the positional deviation within a plane substantially orthogonal to the segment) or the positional deviation of the central point of the knee joint relative to the segment. Hence, when determining the inter-model overall center-of-gravity error Gc_err and the inter-model angular momentum product error L_err, for example, the distance between the aforesaid segment and the thigh mass points A2, A3 or the center of each knee joint (hereinafter referred to as the pseudo positional error distance of the thigh mass points A2, A3) may be used in place of the positional errors (P22-P21), (P32-P31) related to the thigh mass points A2, A3 in the aforesaid Expressions 06 and 07.

In addition, the pseudo positional error distances of the thigh mass points A2, A3 are closely related to the bending angles of the knee joints of the legs 2, so that the pseudo positional errors of the thigh mass points A2 and A3 may be determined from the bending angles of the knee joints. More specifically, as shown in the aforesaid FIG. 18, if the length of each thigh link 24 (the distance between the central points of the hip joint and the knee joint, respectively, at both ends of the thigh link 24) is denoted by L, and a bending angle of a knee joint (an inclination angle of the axial center of a crus link (the straight line passing the center of the knee joint and the center of the ankle joint) relative to the axial center of the thigh link (the straight line passing the center of a hip joint and the center of the knee joint)) is denoted by θ, then the pseudo positional error distances of the thigh mass points A2 and A3 will be substantially equal to $L*\sin(\theta/2)$. The length L is the same in both thigh links 24 and 24. Therefore, $L*\sin(\theta/2)$ determined on the basis of the bending angle θ of the knee joint of each leg 2 may be used in place of, for example, the positional errors (P22−P21), (P32−P31) related to the thigh mass points A2, A3 in the aforesaid Expressions 06 and 07. Supplementally, if body position/posture and the positions/postures of both feet are determined, then the bending angle of the knee joint of each leg 2 will be uniquely determined by a geometric model (link model) of the robot 1.

In the second embodiment, the positions of the mass points A4 and A5 of both feet of the first and the second displacement dimension correcting models are both determined to be the positions corresponding to the positions/postures of both feet of a simplified model gait. Thus, displacement dimension corrected body position/posture are eventually determined on the basis of the positional differences in the thigh mass points A2 and A3 between the first and the second displacement dimension correcting models. Accordingly, as described above, if the amount of correction from the body position/posture of a simplified model gait to displacement dimension corrected body position/posture is determined, using a function expression or a map prepared beforehand, from the difference between the placement of the elements of the second displacement dimension correcting model determined according to the aforesaid geometric restrictive condition (2) (according to a simplified model gait) and the placement of the elements of the first displacement dimension correcting model, then the correction amounts of the displacement dimension corrected body position/posture relative to the simplified model gait can be directly (without using differential and integral calculus operation) by the feedforward control law on the basis of the positional differences between the thigh mass points A2, A3 of the second displacement dimension correcting model corresponding to the simplified model gait and the thigh mass points A2, A3 of the first displacement dimension correcting model. And, in this case, the aforesaid pseudo positional error distance may be used or the bending angle θ of the knee joint of each leg 2 corresponding to the pseudo positional error may be used in place of the positional errors of the thigh mass points A2 and A3, thereby making it possible to directly determine displacement dimension corrected body position/posture (the amounts of the corrections from the body position/posture of the simplified model gait to the displacement dimension corrected body position/posture) by the feedforward control law from the pseudo positional error distance or the bending angle θ of the knee joint.

Fourth Embodiment

An embodiment in this case will be explained as a fourth embodiment with reference to FIG. 24. This fourth embodiment differs from the aforesaid second embodiment only in the displacement dimension gait correcting subroutine of S024 of the abovementioned FIG. 9. The flowchart illustrating the subroutine processing is given in FIG. 24. This embodiment is an embodiment of the seventeenth and the eighteenth inventions.

The following is the explanation. In S600, the bending angle θ of the knee joint of each leg 2 is determined on the basis of the instantaneous value of a simplified model gait at current time t (determined in S022 of FIG. 9). Specifically, the posture states of the legs 2 are uniquely defined from the body position/posture and the positions/postures of both feet of the simplified model gait. This determines the bending angles θ of the knee joints of the legs 2. The bending angles θ are the bending angles of knee joints corresponding to the simplified model gait itself.

The processing then proceeds to S602 wherein the correction amounts of the body position/posture are determined using, for example, a predetermined function set beforehand, from the bending angles θ of the knee joints of the legs 2. In this case, the aforementioned predetermined function is set so that the correction amount of a body position and the correction amount of the body posture monotonously increase or decrease relative to the bending angle θ of each knee joint. More specifically, the aforementioned predetermined function is set such that the correction amount of a body position increases toward the rear side of the robot 1 and the correction amount of a body posture increases to the forward inclination side of the body 3 as the bending angle θ of the knee joint increases.

Subsequently, the processing proceeds to S604 wherein the instantaneous values of the body position/posture of the simplified model gait are corrected using the correction amounts determined as described above in S602, thereby determining displacement dimension corrected body position/posture at current time t.

The above explains the processing of the displacement dimension gait correcting subroutine in the fourth embodiment. According to the fourth embodiment, the body position/posture of a simplified model gait are determined on the basis of the bending angles of the knee joints of the legs 2, 2 according to the feedforward control law without using the first and the second displacement dimension correcting models. Moreover, as a result of setting the functions for determining the correction amounts of body position/posture as described above, the body position/posture of the simplified model gait can be corrected as in the case where displacement dimension corrected body position/posture are determined to satisfy the aforesaid conditions 1 and 2 by using the first and the second displacement dimension correcting models, as with the second embodiment.

In the fourth embodiment, functions have been used for determining the correction amounts of body position/posture; however, it is needless to say that a map can be used. Further, in place of the bending angles of knee joints, the aforementioned pseudo positional error distances of the legs may be used. In this case, a function or a map for determining the correction amounts of body position/posture from the pseudo positional error distances of the legs may be set such that the correction amount of a body position increases toward the rear side of the robot 1 and the correction amount of the body posture increases to the forward inclination of the body 3 as the pseudo positional error distance increases. This arrangement constitutes an embodiment of the aforesaid nineteenth and the twentieth inventions.

Regarding the aforesaid first to third embodiments, the following modifications are possible. In the aforesaid first to third embodiments, the number of mass points of the legs 2 in the first and the second displacement dimension correcting models has been two; alternatively, however, a displacement dimension correcting model having, for example, mass points in the vicinity of the foot 2, the crus link, and a thigh link, respectively, of each leg 2 (having three mass points in each leg 2) may be configured. In this case, if the positions of the mass points of the first displacement dimension correcting model are restricted as with the second embodiment, then two mass points other than foot mass points may be set to the two points defined by a predetermined internally dividing ratio on a segment connecting, for example, the center of an ankle joint and the center of a hip joint. Alternatively, a rigid body (link) having inertia corresponding to at least one of a crus link and a thigh link may be added as an element of both displacement dimension correcting models.

Further, if, for example, the robot 1 is operated to walk on a floor with a relatively high frictional coefficient, displacement dimension corrected body position/posture may be determined with the inertia of the body 3 set to zero or displacement dimension corrected body position/posture may be determined to satisfy only the aforesaid condition 2 in the first and the second embodiments.

Further, a mass point, such as the mass point in the vicinity of a foot (foot mass point) whose placement is the same position in both displacement dimension correcting models (the first and the second placements or the first to the third placements in the present invention) may be excluded from both displacement dimension correcting models.

Further, if the elbow joints of both arms 5 and 5 are bent or stretch, mass points corresponding to the elbow joints or in the vicinity thereof may be provided as in the case where thigh mass points are provided in the first and the second displacement dimension correcting models in the aforesaid second embodiment. More specifically, as shown in, for example, FIG. 25, elbow mass points B8 and B9 respectively corresponding to the vicinity of the elbow joints of the arms 5, and hand tip mass points B6 and B7 respectively corresponding to the vicinity of the distal portions of the arms 5 are provided in the first and the second displacement dimension correcting models, and an arrangement is made such that the elbow mass points B8 and B9 are restricted to the points defined by a predetermined internally dividing ratio on a segment connecting the center of a shoulder joint and the center of a wrist joint of each arm 5 in the first displacement dimension correcting model. In addition, as with the aforesaid second embodiment, body position/posture of a simplified model gait are corrected such that the inter-model overall center-of-gravity error Gc_err and the inter-model angular momentum product error L_err, including the differences of the positions of the elbow joints B8 and B9 between the first displacement dimension correcting model and the second displacement dimension correcting model, approximate zero (satisfy the aforesaid conditions 1 and 2). Regarding the first displacement dimension correcting model, the arm postures of the first displacement dimension correcting model may be restricted to the arm postures in the upright posture state of the robot 1 (the posture in which they are stretched in the vertical direction) as in the case where the postures of the legs 2 have been restricted in the first embodiment.

Alternatively, as in the case explained in the aforesaid fourth embodiment, the correction amounts of the body position/posture of a simplified model gait may be determined on the basis of the distance from the segment, which connects the center of the shoulder joint of each arm 5 and the center of the wrist joint, to the center of an elbow joint, or by a predetermined function or a map on the basis of the bending angle of the elbow joint, and the body position/posture of the simplified model gait may be corrected using the determined correction amount, thereby determining a displacement dimension corrected body position/posture.

To add supplemental description to the first to the fourth embodiments, the total sum of the masses of all the elements of the first displacement dimension correcting model agrees with the total mass of the robot 1, and the overall center-of-gravity position G1 of the first displacement dimension correcting model relative to an instantaneous desired motion of the robot 1 agrees or substantially agrees with the overall center-of-gravity position Gs of a simplified model relative to the instantaneous desired motion according to these first to fourth embodiments. Moreover, the total sum of the masses of all the elements of the second displacement dimension correcting model also agrees with the total masses of the robot 1 and the overall center-of-gravity position G2 of the second displacement dimension correcting model relative to an instantaneous desired motion of the robot 1 substantially agrees with a true overall center-of-gravity position Gf of the actual robot 1 relative to the instantaneous desired motion. Thus, in the first to the fourth embodiments, the difference between G1 and G2 (G1−G2) substantially agrees with the difference between the overall center-of-gravity position Gs of a simplified model and the true overall center-of-gravity position Gf of the robot 1 (Gs−Gf), i.e., the error of the overall center-of-gravity position of the simplified model. Hence, in the first to the fourth embodiments, the first geometric restrictive condition as the condition for determining the placement of the elements of the first displacement dimension correcting model and the second geometric restrictive condition as the condition for determining the placement of the elements of the second displacement dimension correcting model are set as with the ninth invention described above. In this case, as previously described, it is needless to say that the mass points, such as the mass points in the vicinity of feet (foot mass points) whose placements are the same positions in both displacement dimension correcting models (the first and the second placements or the first to the third placements in the present invention), may be excluded from both displacement dimension correcting models.

In each embodiment described above, the body position/posture have been corrected; alternatively, however, the position/posture of a part other than the body or the positions/postures of a plurality of parts, including the body, may be corrected.

INDUSTRIAL APPLICABILITY

As explained above, the present invention is useful in that it makes it possible to provide a gait generating device capable of properly correcting a motion of an instantaneous desired gait, which is prepared using a dynamic model, by geometric computation that does not include differential equations or integral equations. This enhances the dynamic accuracy of the instantaneous desired gait that includes the corrected motion.

Figure 1:
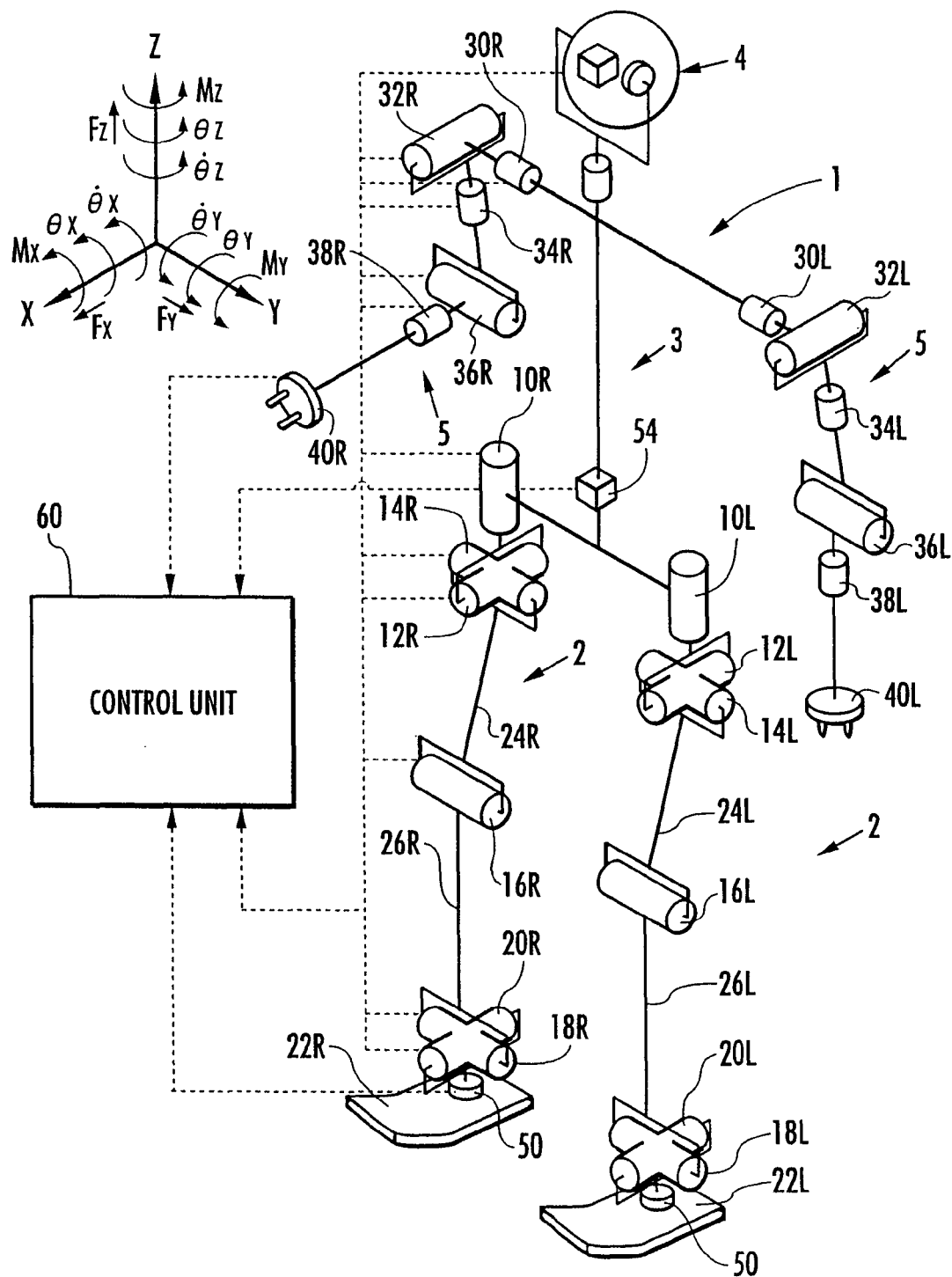
FIG. 1 is a diagram schematically showing a general construction of a mobile robot (a bipedal walking robot) to which an embodiment of the present invention is applied.
Figure 2:
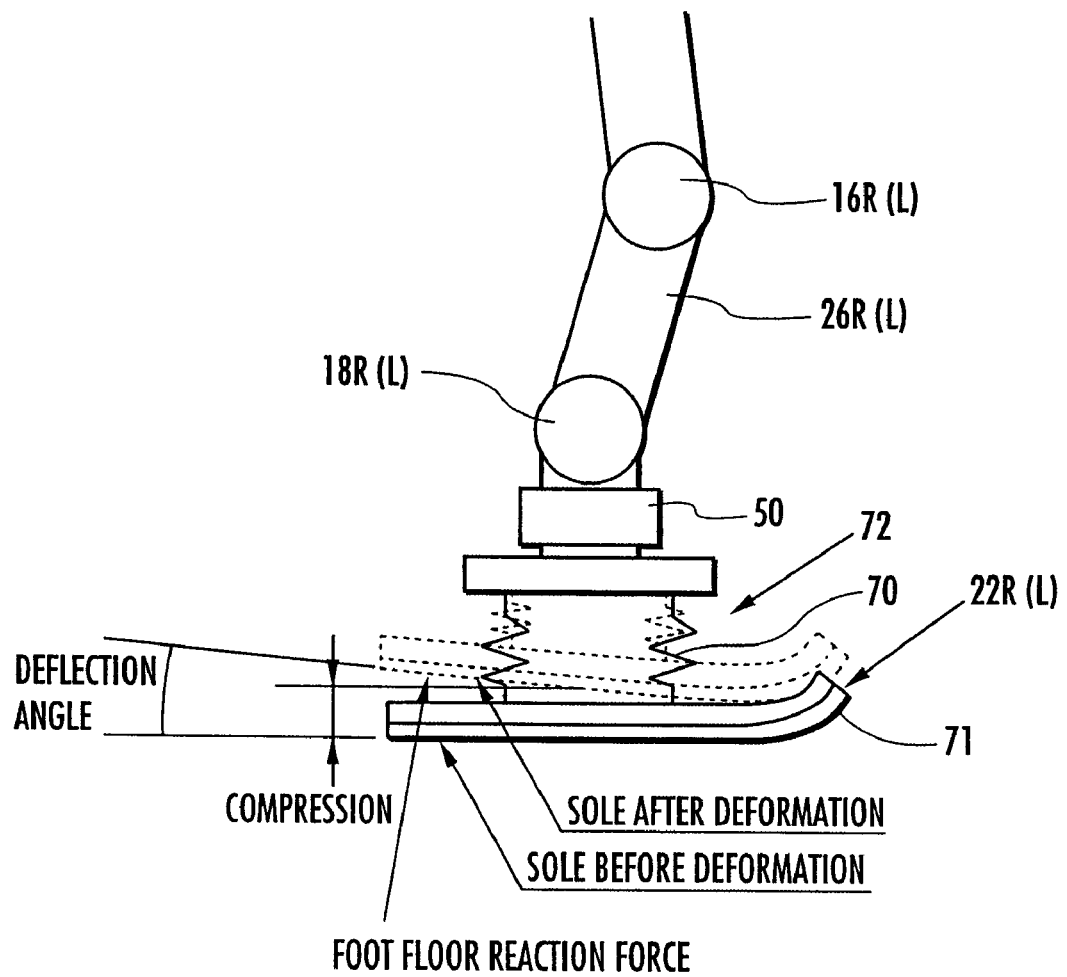
FIG. 2 It is a side view showing the construction of a foot portion of each leg of a robot shown in FIG. 1.
Figure 3:
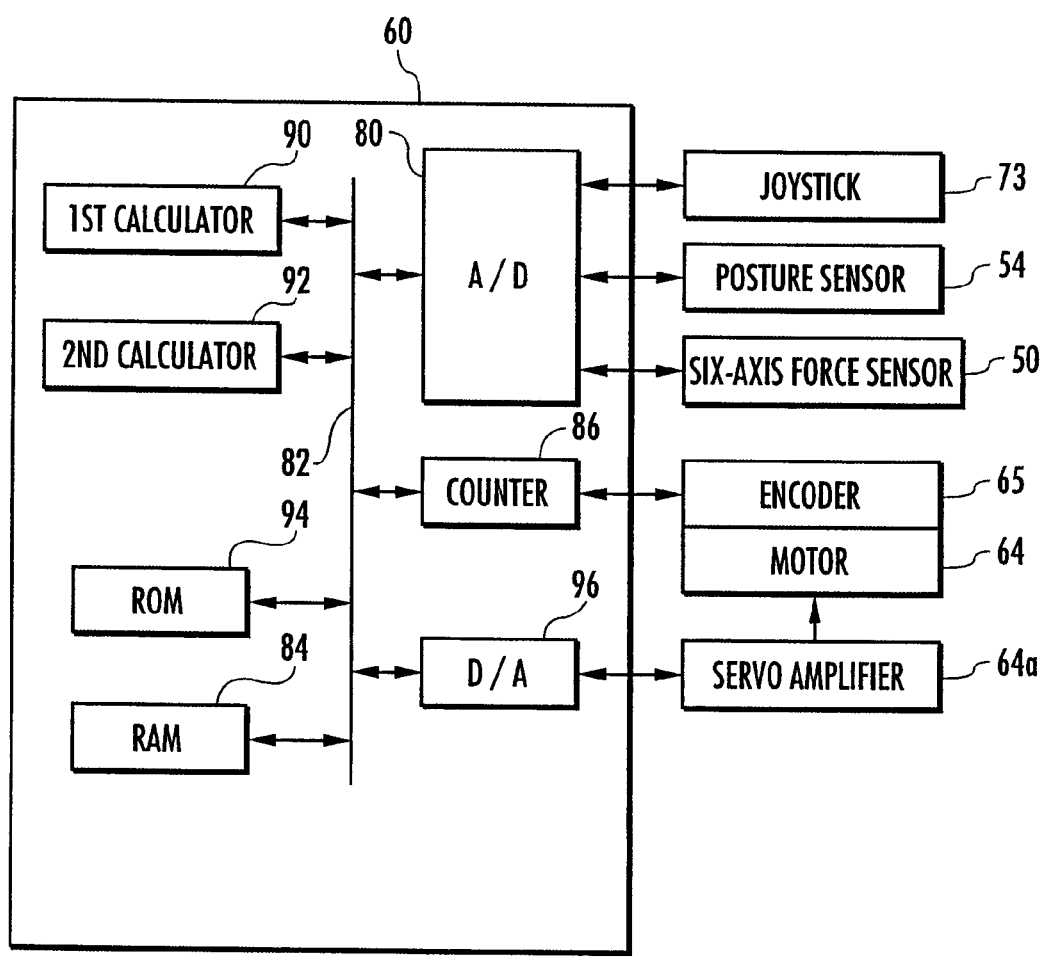
FIG. 3 It is a block diagram showing the construction of a control unit provided in the robot shown in FIG. 1.
Figure 4:
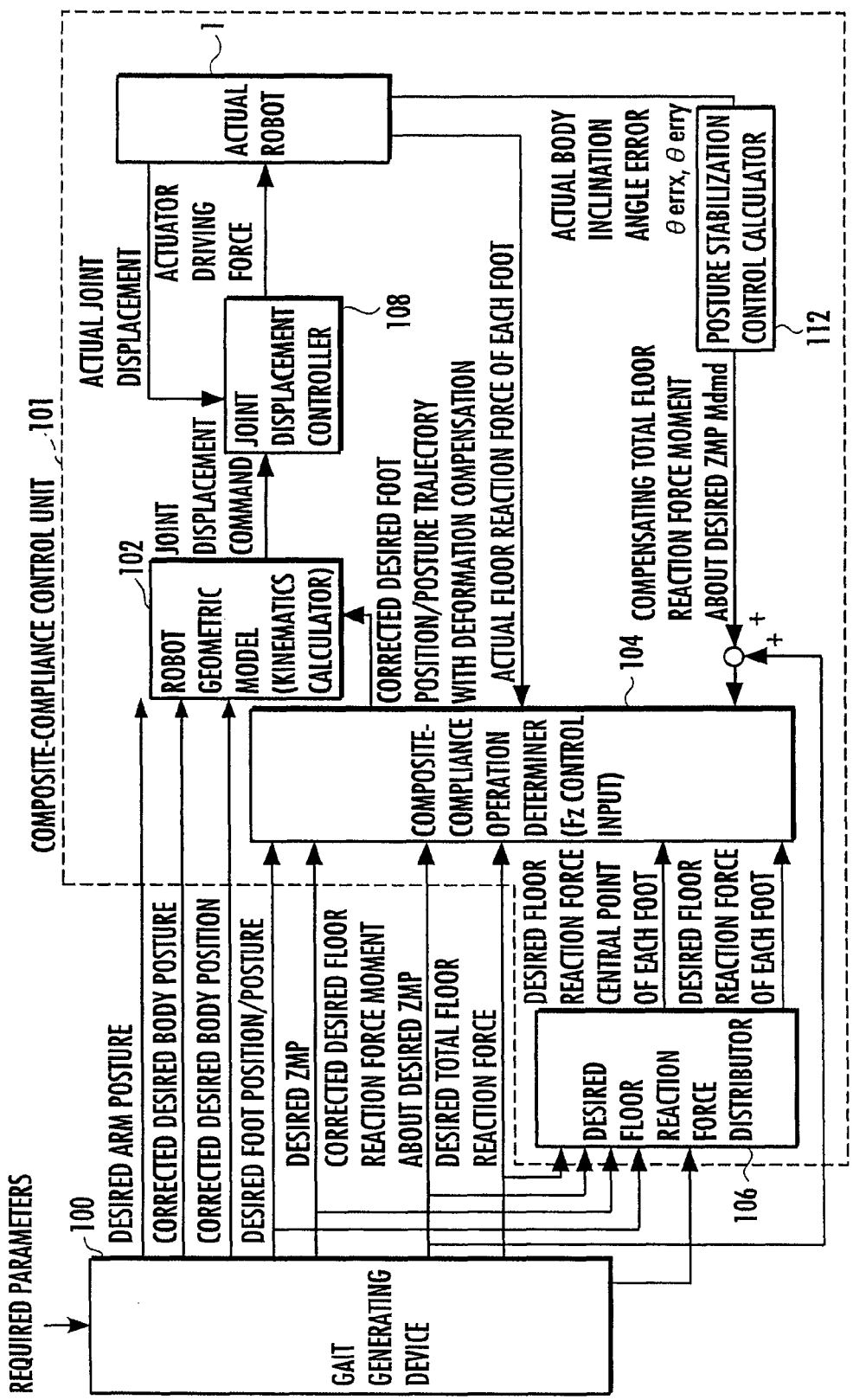
FIG. 4 It is a block diagram showing the functional construction of the control unit shown in FIG. 3.
Figure 5:
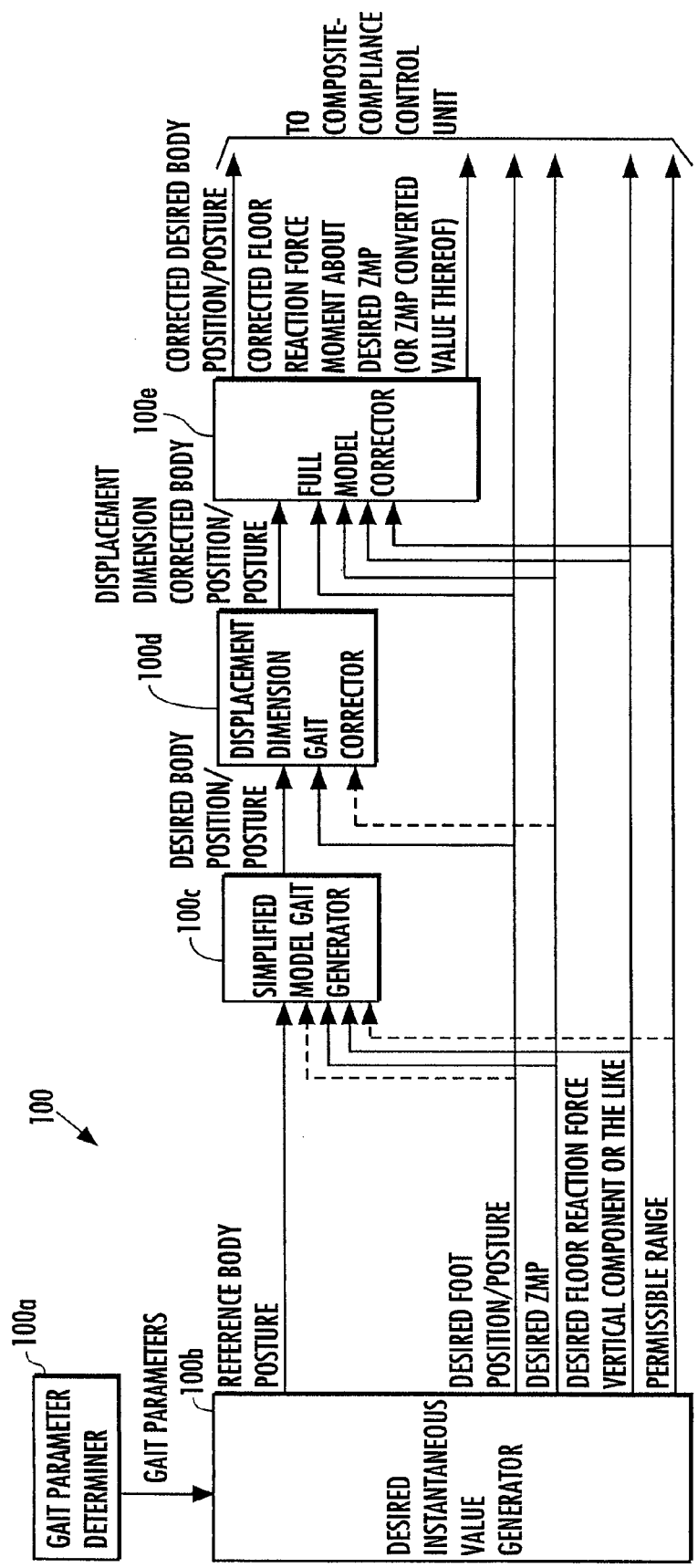
FIG. 5 It is a block diagram showing the functions of a gait generator shown in FIG. 4.
Figure 6:
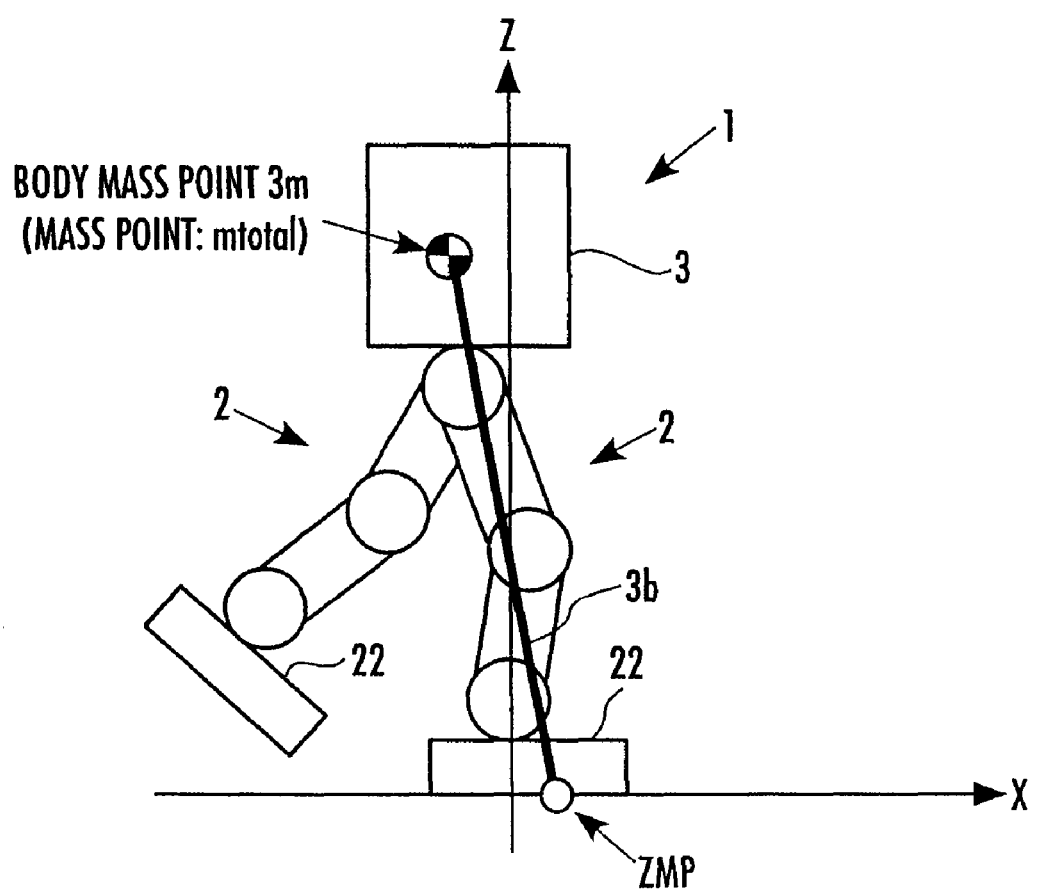
FIG. 6 It is a diagram showing the structure of a simplified model (dynamic model) in a first embodiment.
Figure 7A:
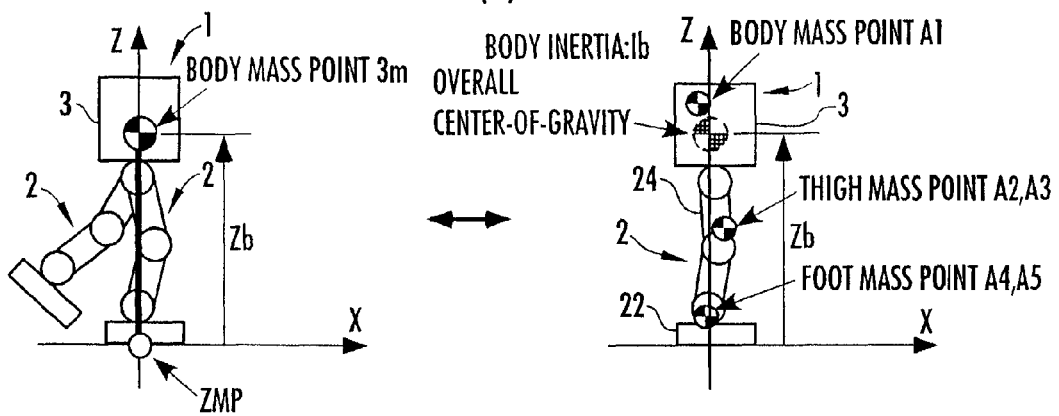
FIG. 7 (a) to (c) are diagrams showing the relationship between a first displacement dimension correcting model and a simplified model in the first embodiment.
Figure 7B:
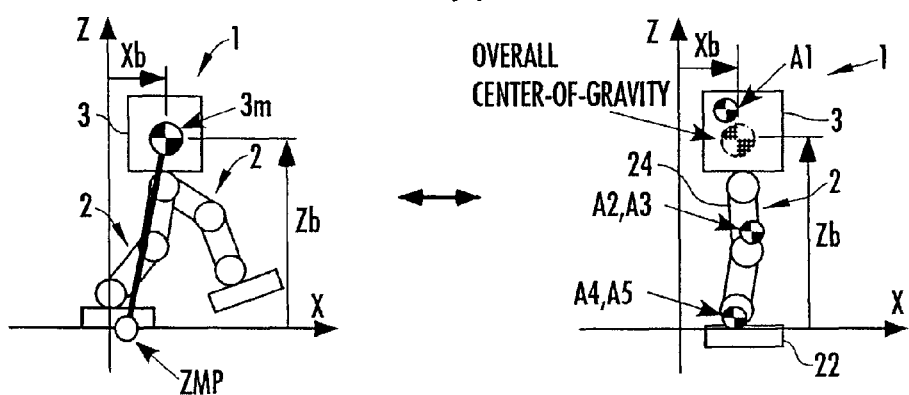
Figure 7C:
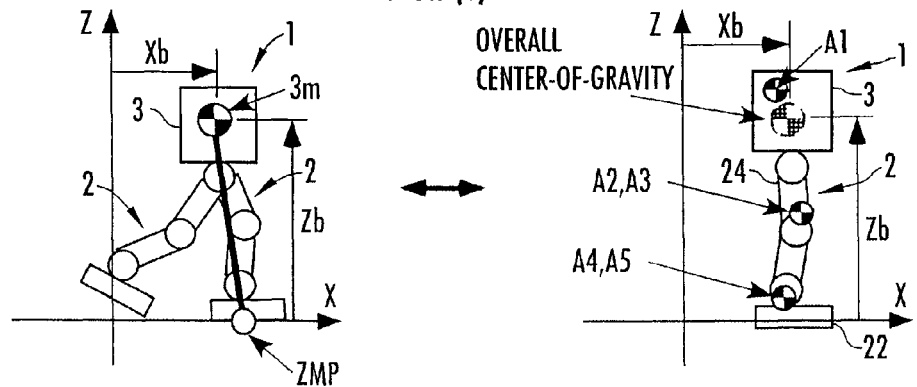
Figure 8:
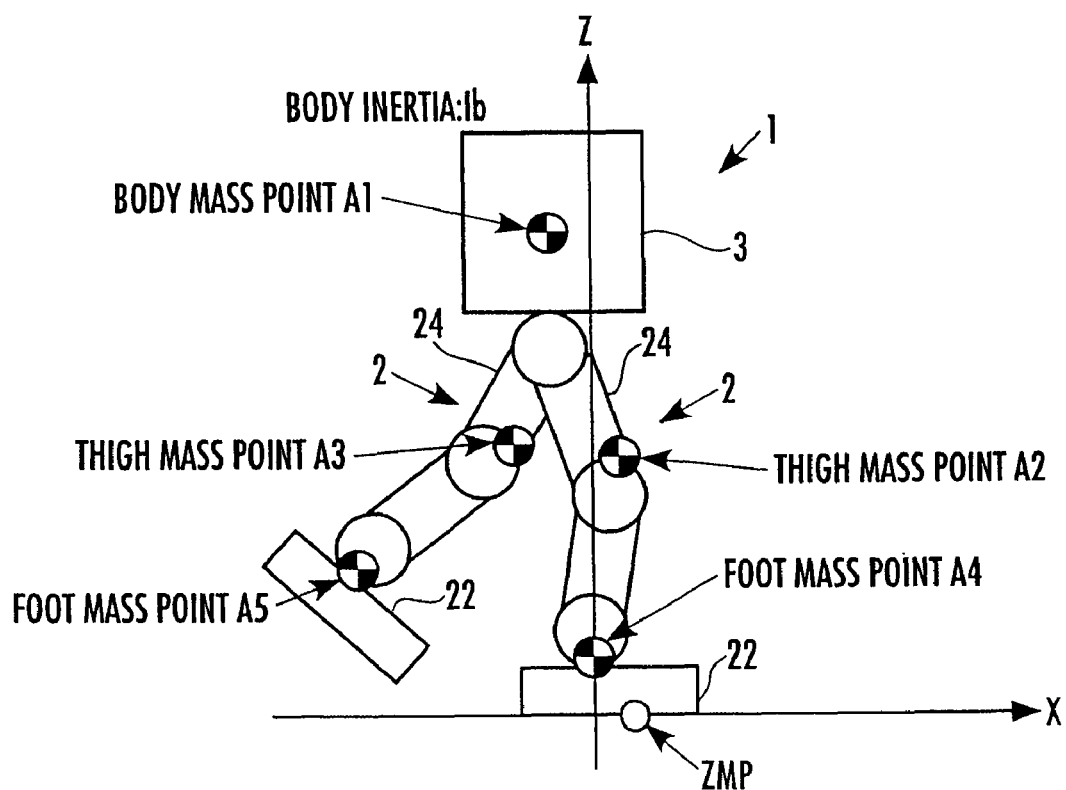
FIG. 8 It is a diagram showing the structure of a second displacement dimension correcting model in the first embodiment.
Figure 9:
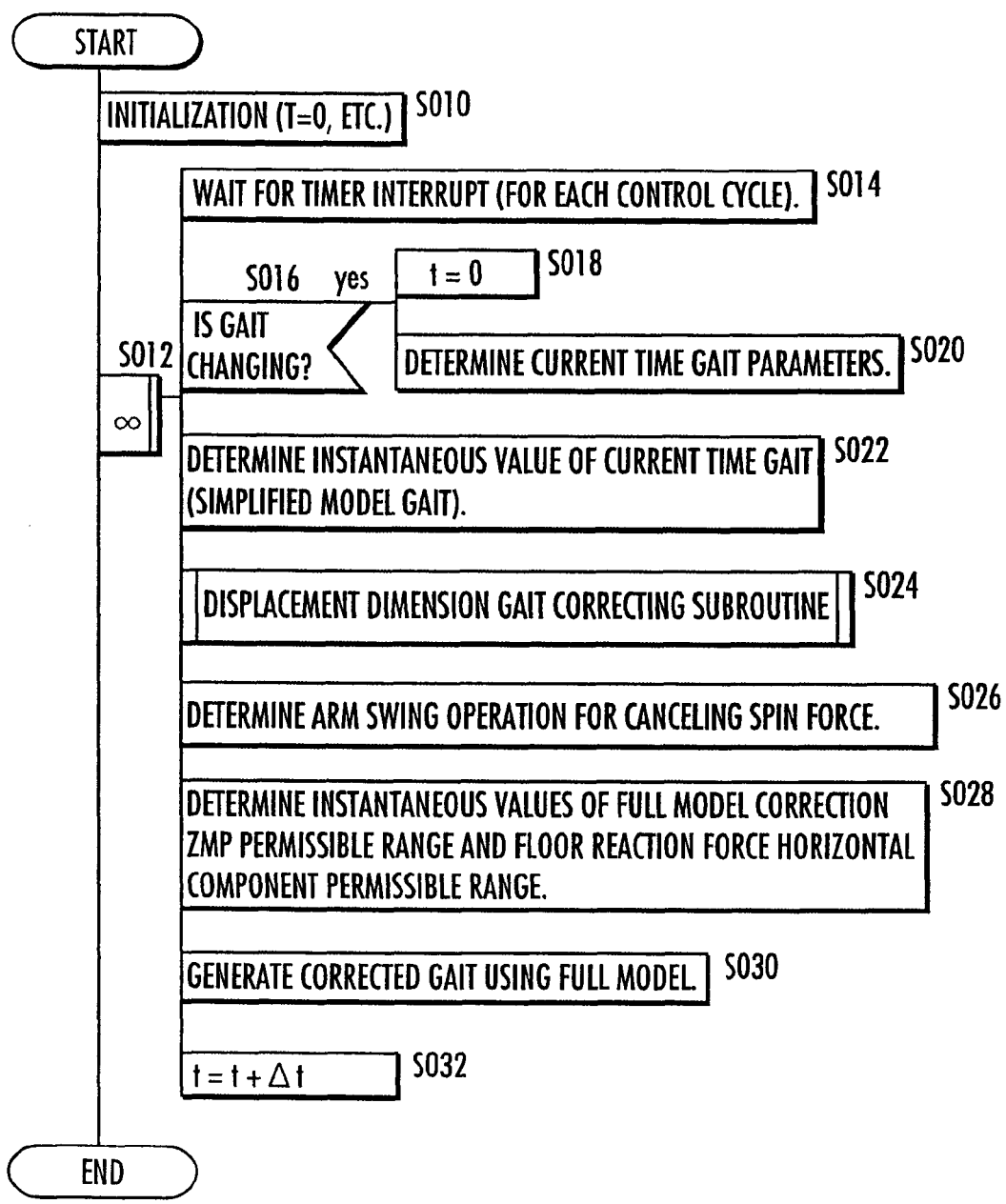
FIG. 9 It is a flowchart illustrating main routine processing of a gait generator in the first embodiment.
Figure 10:
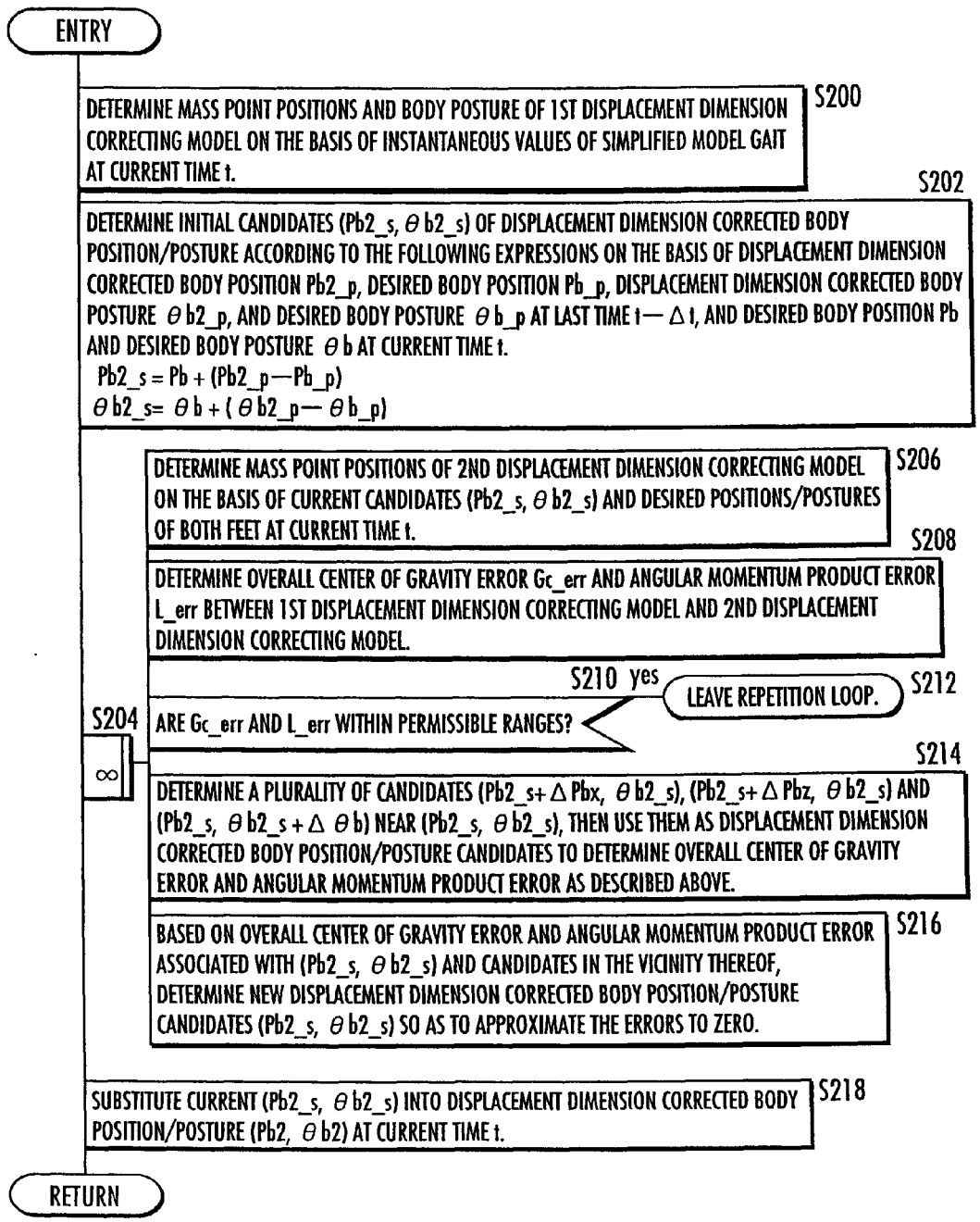
FIG. 10 It is a flowchart illustrating the processing of a displacement dimension gait correcting subroutine in the flowchart of FIG. 9.
Figure 11:
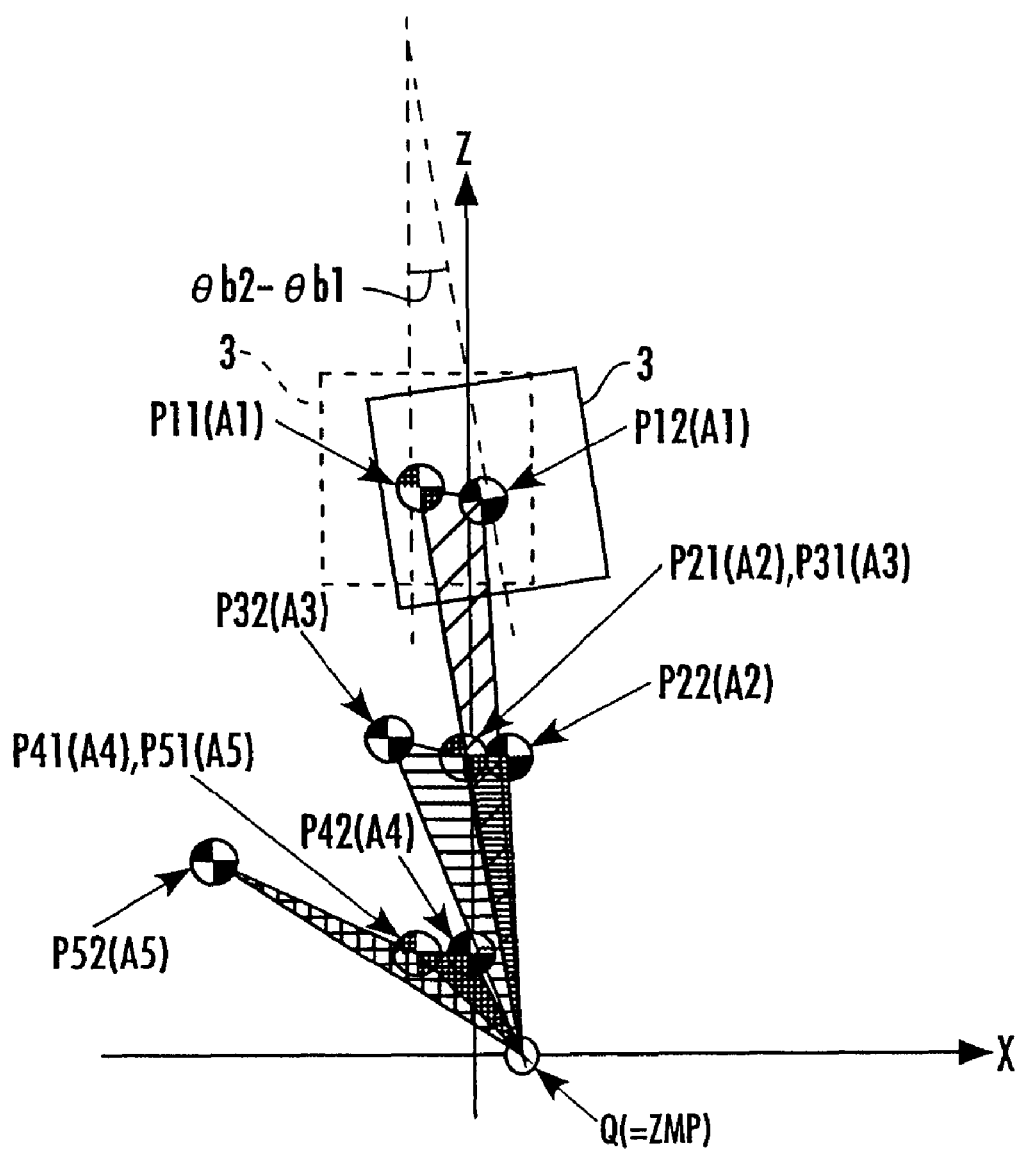
FIG. 11 It is a diagram showing a placement example of the elements of the first and the second displacement dimension correcting models in the first embodiment.
Figure 12:
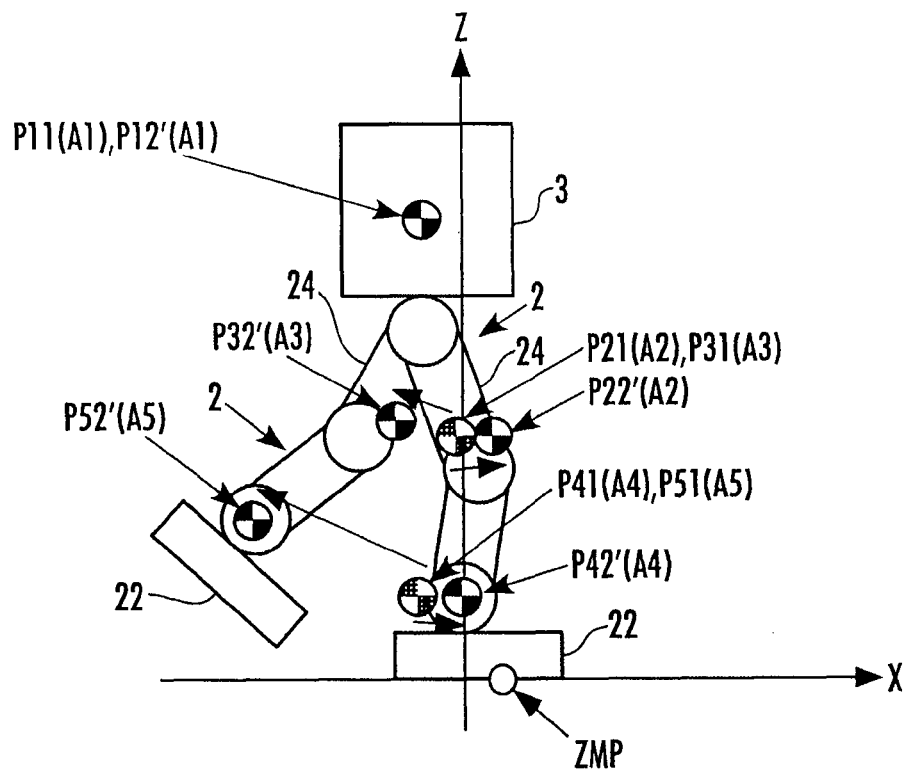
FIG. 12 It is a diagram showing a placement example of the elements of the first and the second displacement dimension correcting models in the first embodiment.
Figure 13:
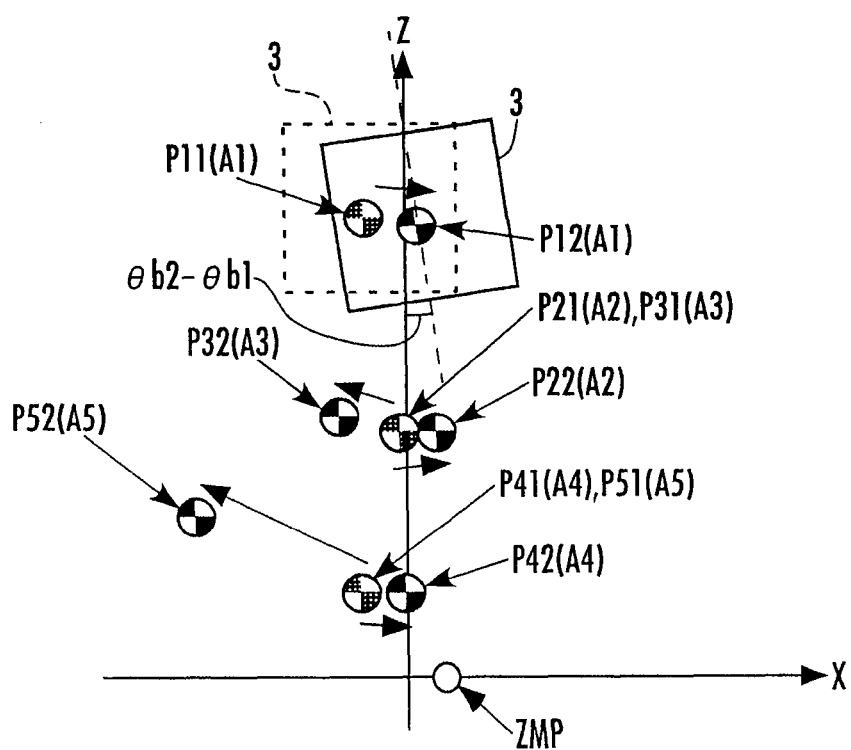
FIG. 13 It is a diagram showing a placement example of the elements of the first and the second displacement dimension correcting models in the first embodiment.
Figure 14A:
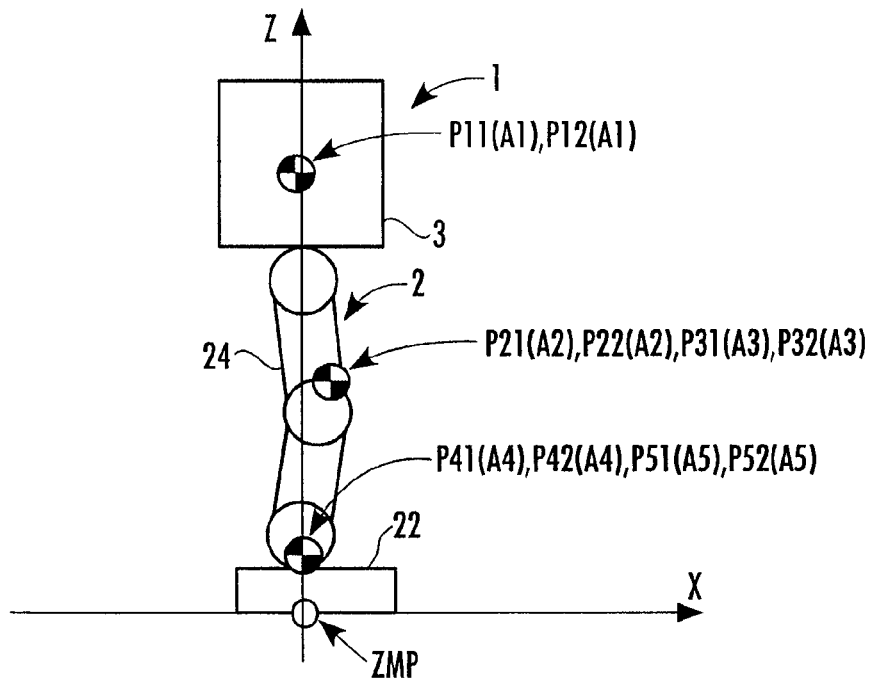
FIGS. 14 (a) and (b) are diagrams showing the changes in the placements of the elements of the first and the second displacement dimension correcting models when the robot lowers its body from an upright posture state in the first embodiment.
Figure 14B:
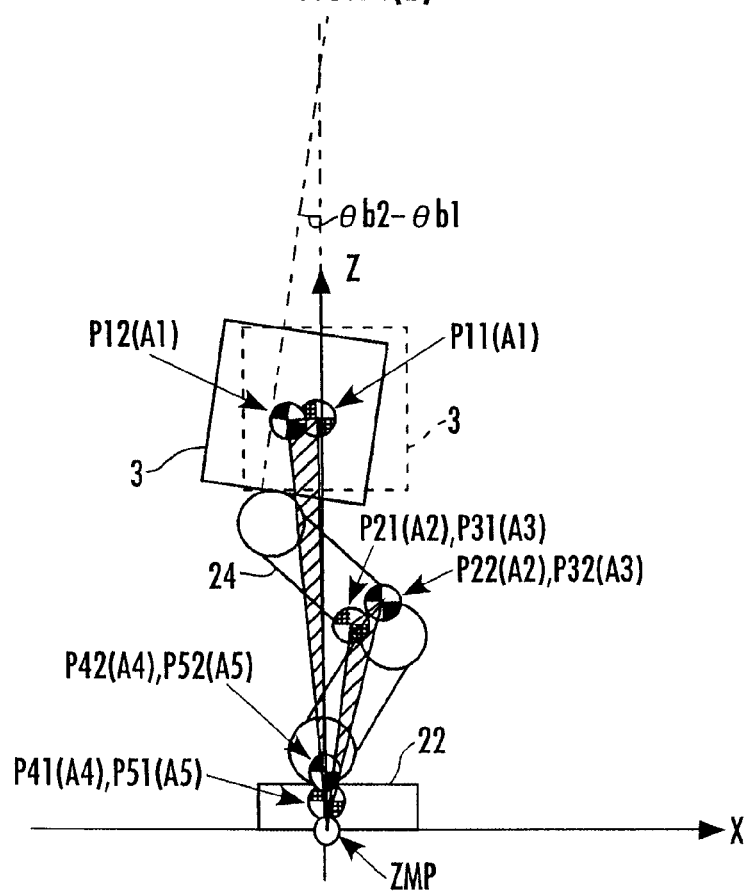
Figure 15:
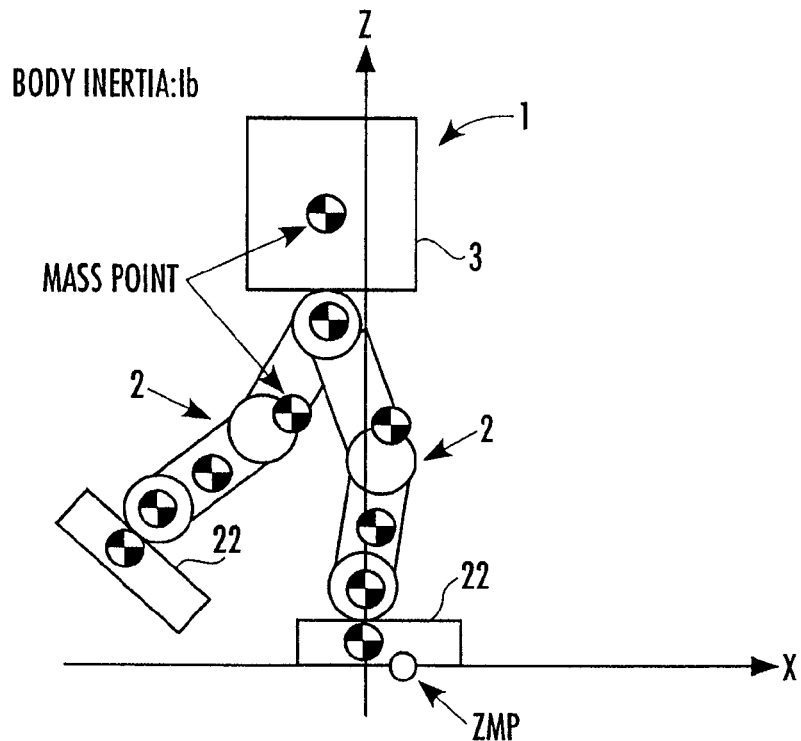
FIG. 15 It is a diagram showing an example of a full model used in a full model correction.
Figure 16:
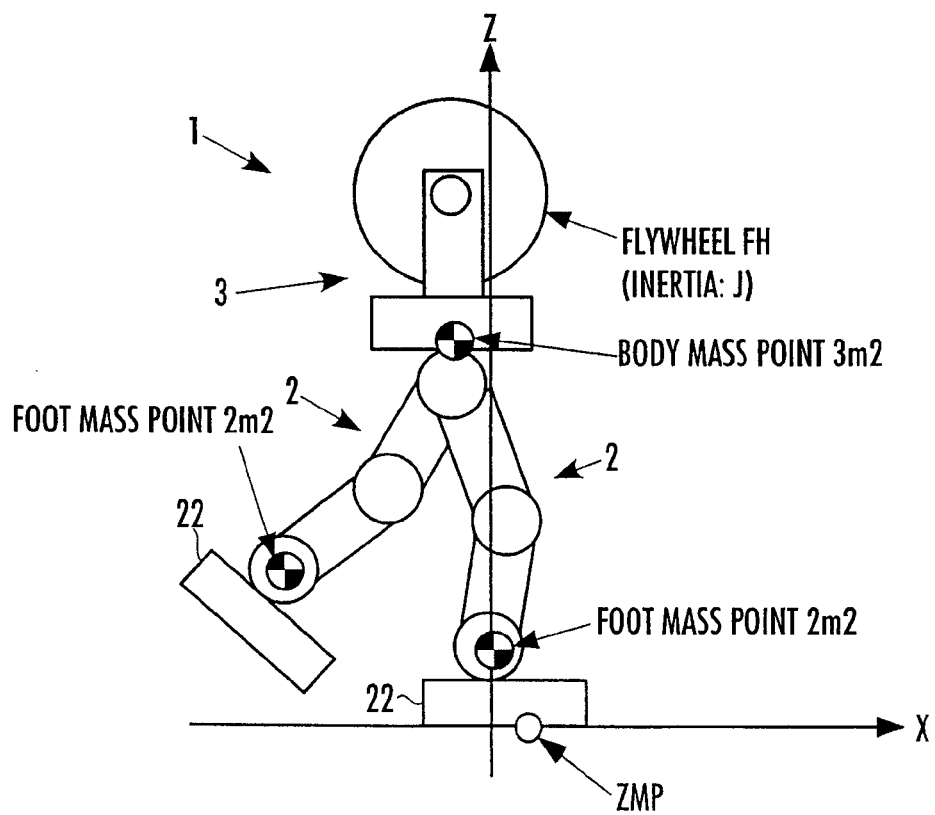
FIG. 16 It is a diagram showing the structure of a simplified model (dynamic model) in a second embodiment.
Figure 17:
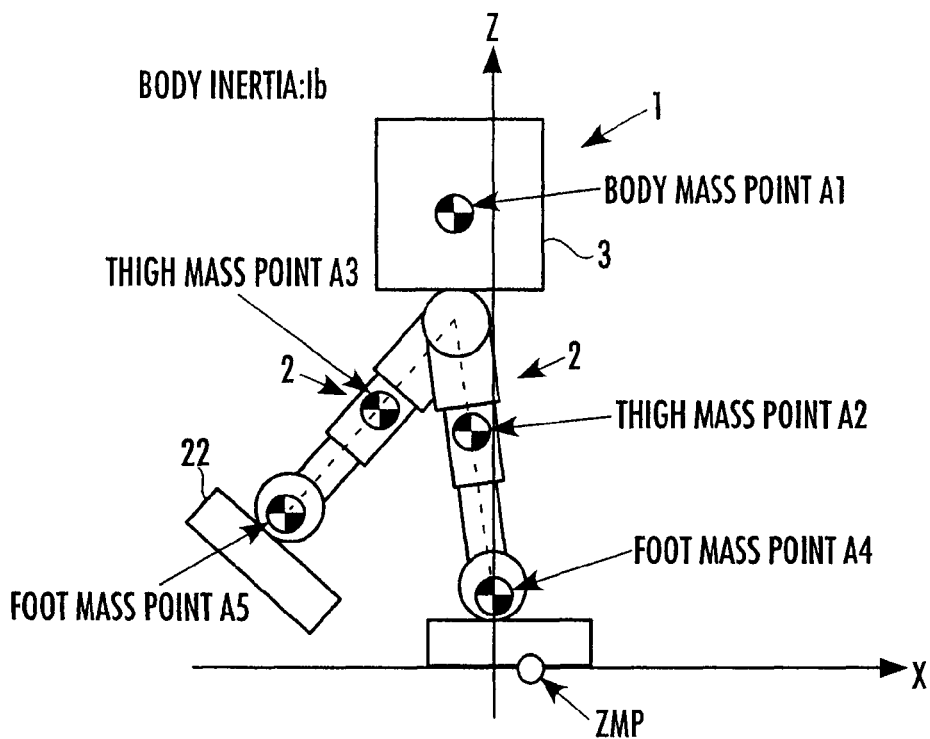
FIG. 17 It is a diagram showing the structure of a first displacement dimension correcting model in the second embodiment.
Figure 18:
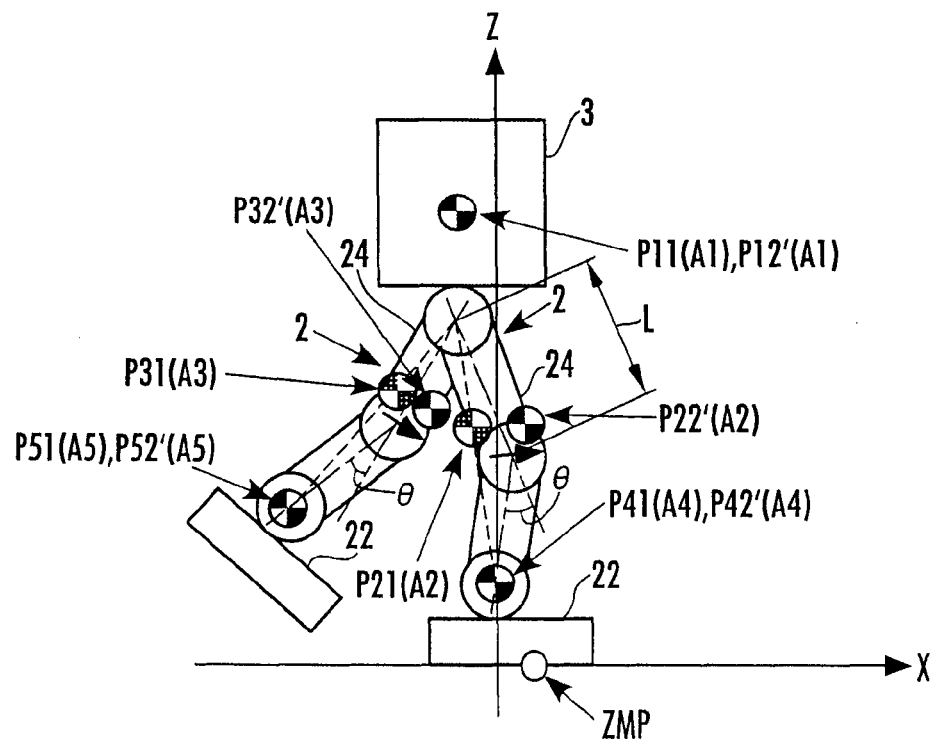
FIG. 18 It is a diagram showing a placement example of the elements of the first and the second displacement dimension correcting models in the second embodiment.
Figure 19:
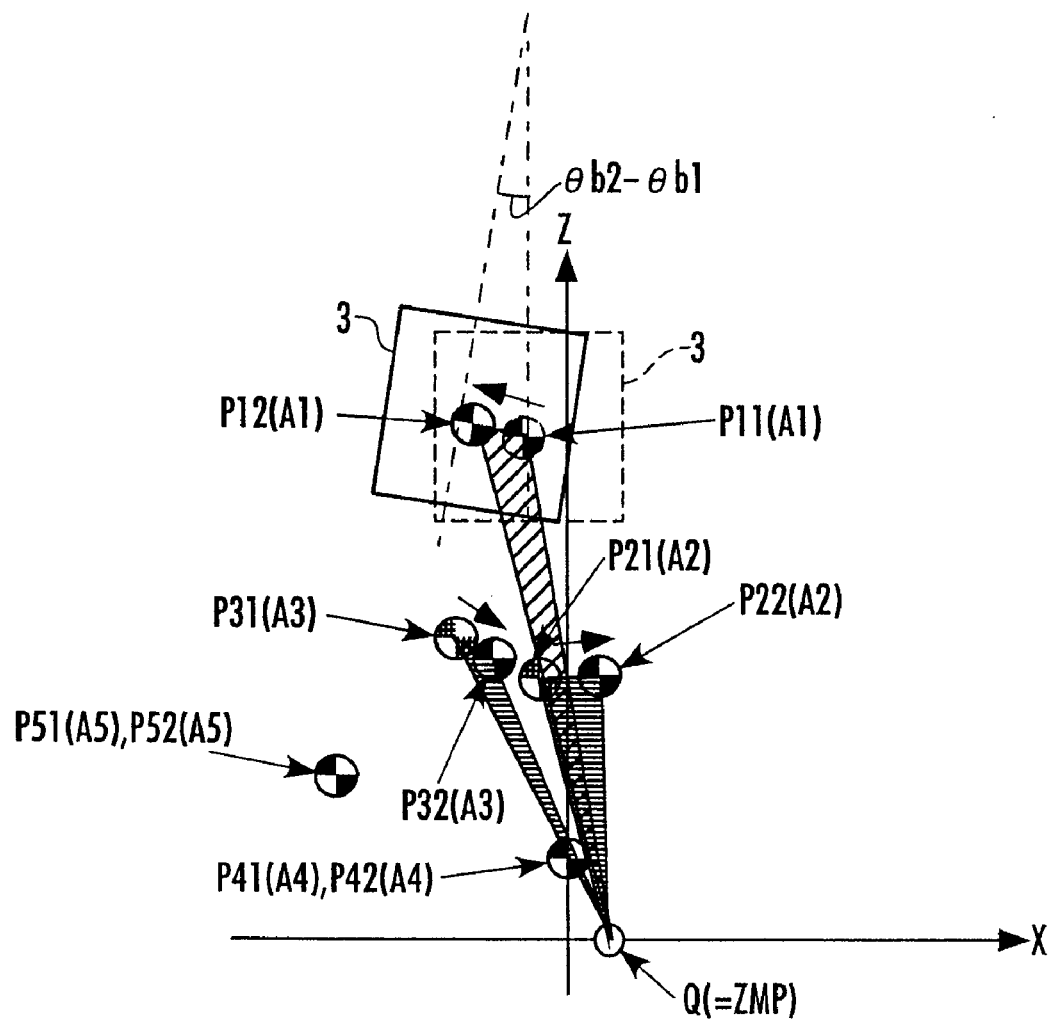
FIG. 19 It is a diagram showing a placement example of the elements of the first and the second displacement dimension correcting models in the second embodiment.
Figure 20:
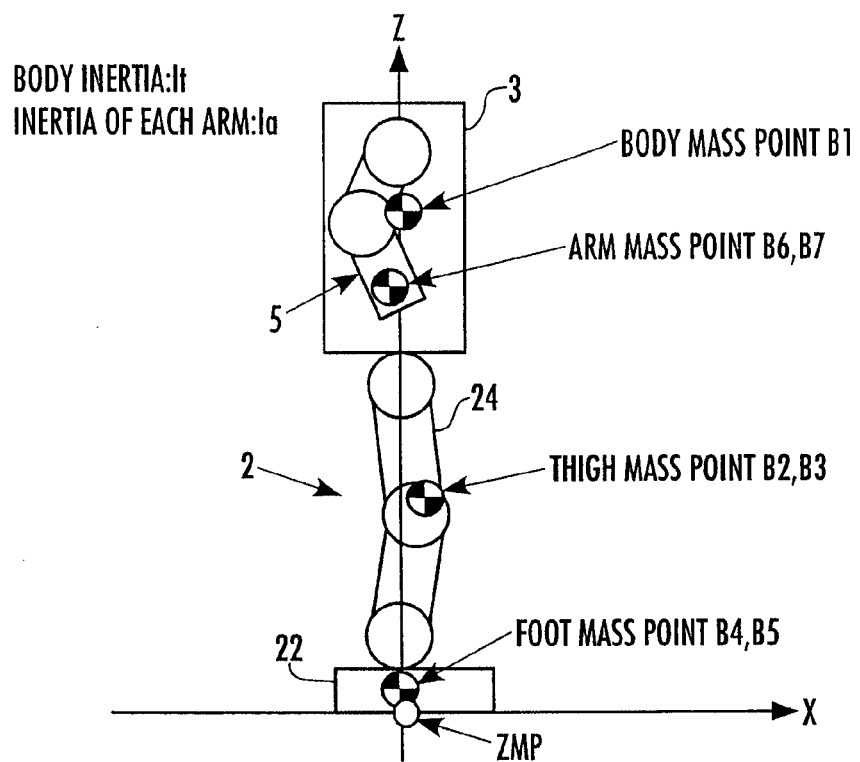
FIG. 20 It is a diagram showing a first displacement dimension correcting model in a third embodiment.
Figure 21:
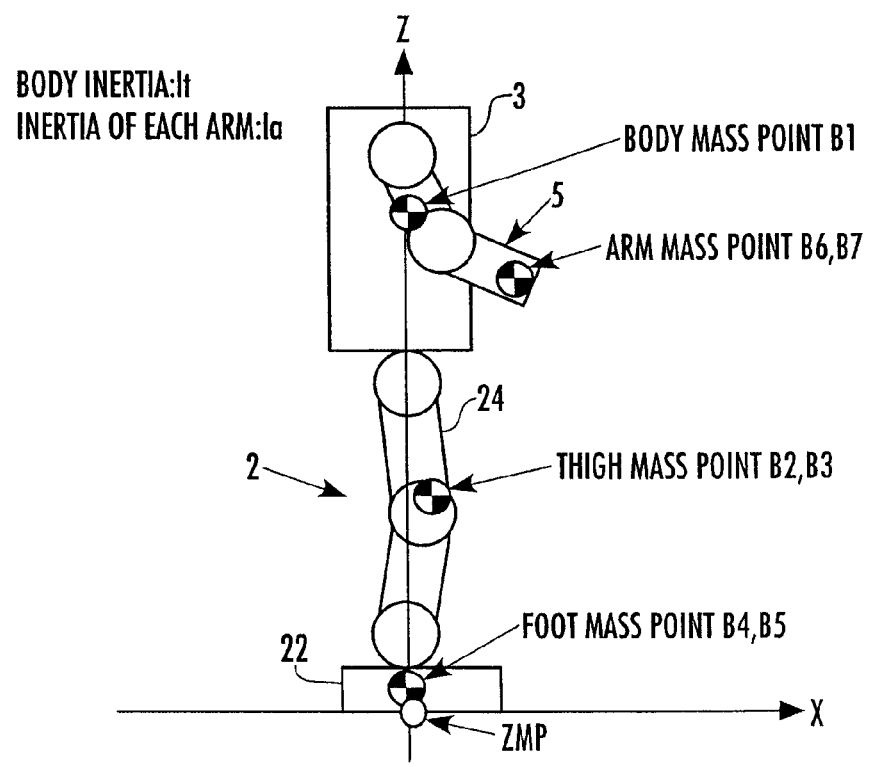
FIG. 21 It is a diagram showing a second displacement dimension correcting model in the third embodiment.
Figure 22:
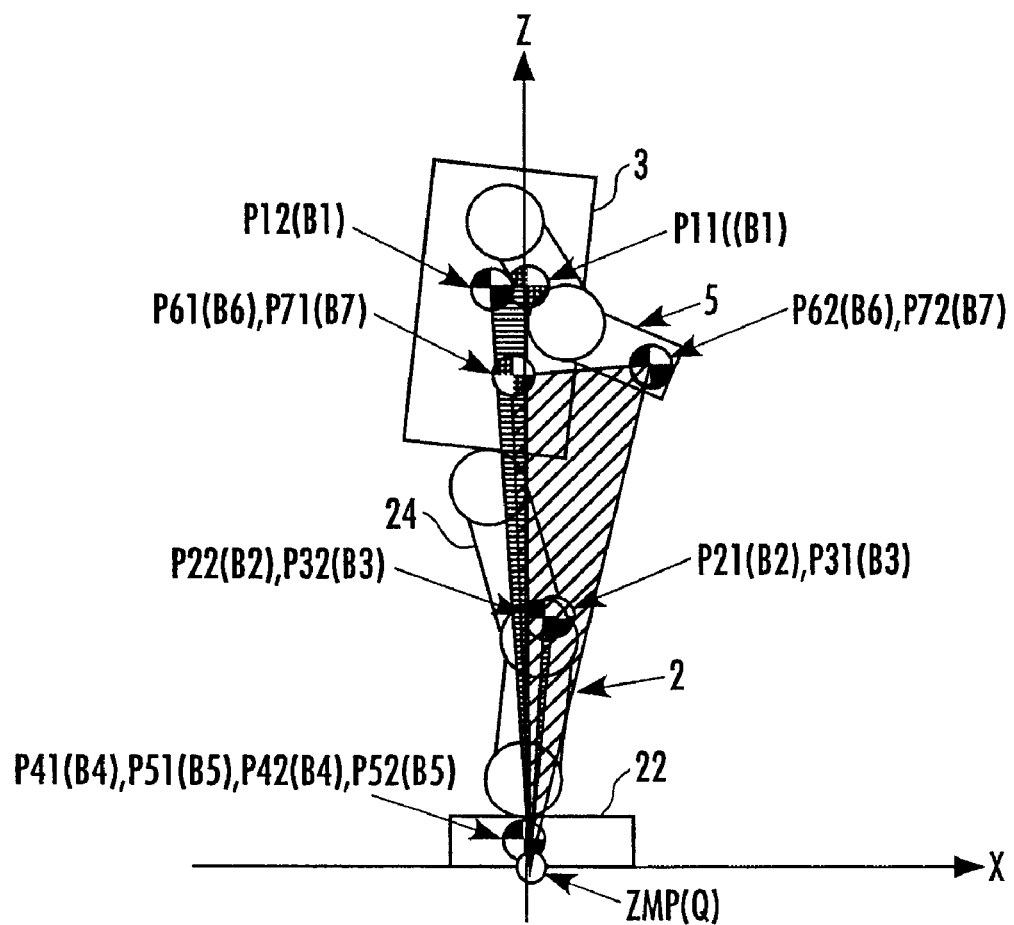
FIG. 22 It is a diagram showing a placement example of the elements of the first and the second displacement dimension correcting models in the third embodiment.
Figure 23:
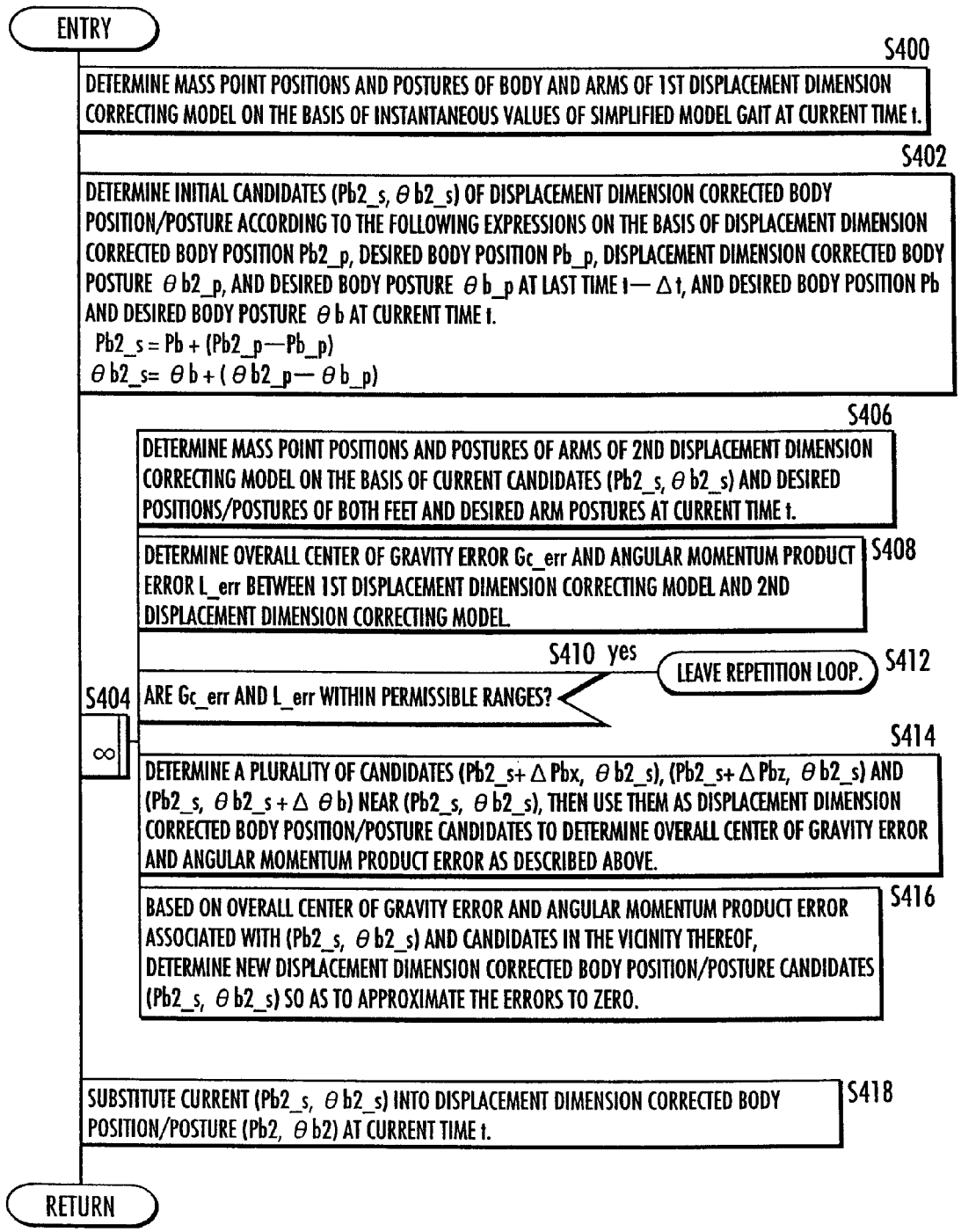
FIG. 23 It is a flowchart illustrating the processing of a displacement dimension gait correcting subroutine in the third embodiment.
Figure 24:
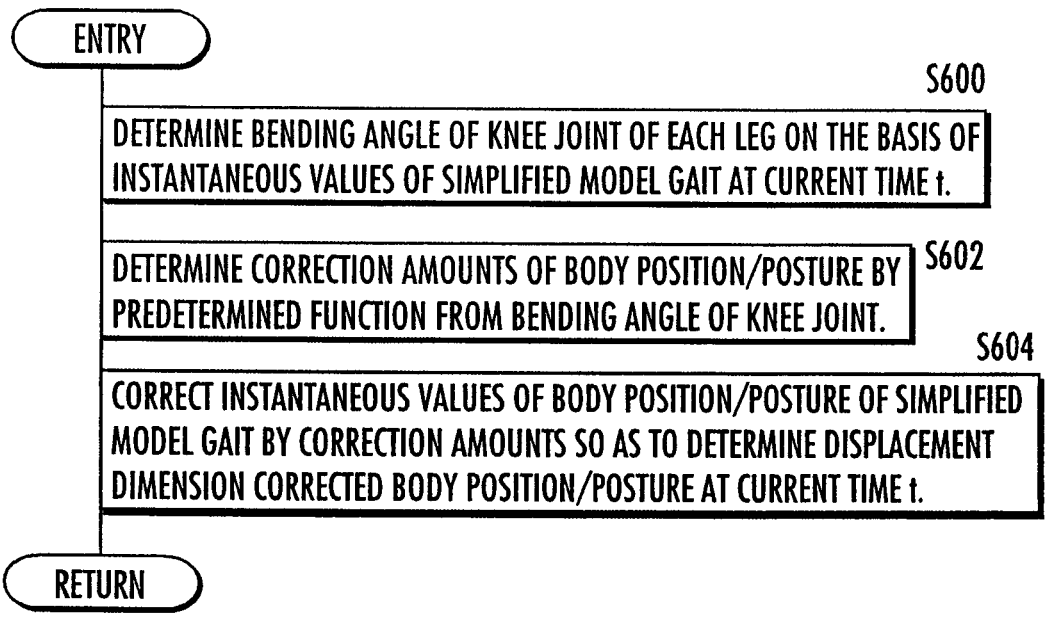
FIG. 24 It is a flowchart illustrating the processing of a displacement dimension gait correcting subroutine in a fourth embodiment.
Figure 25:
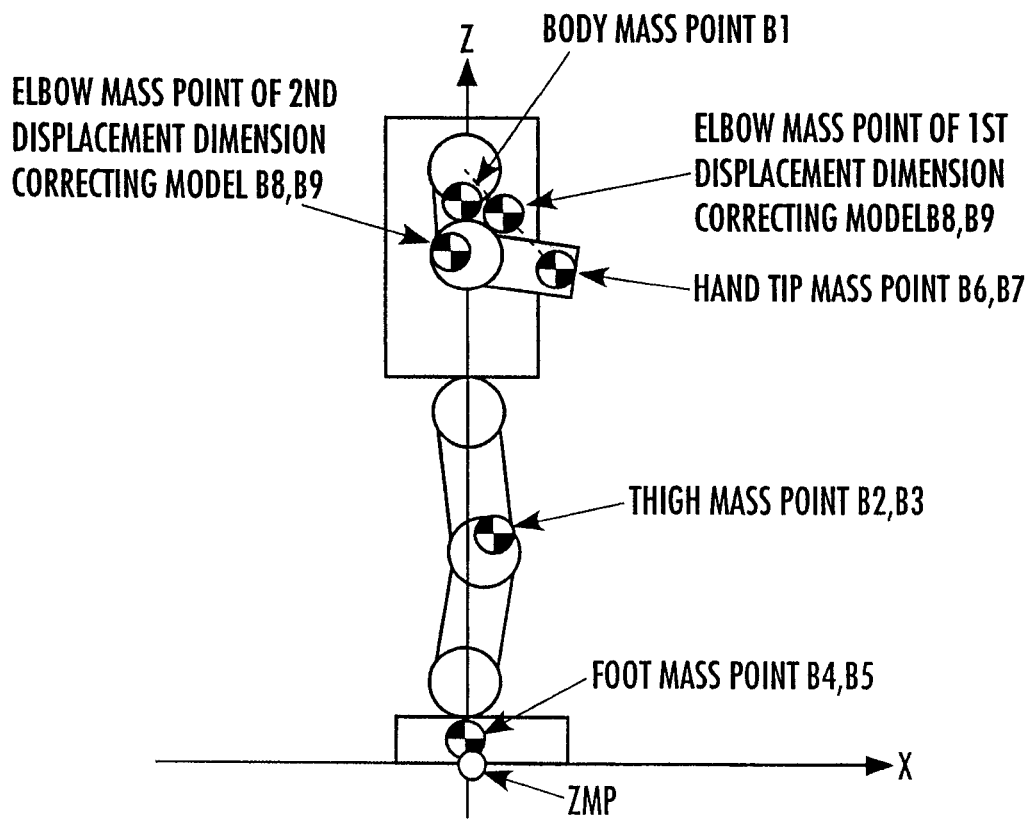
FIG. 25 It is a diagram showing another example of the placement of the elements of the first and the second displacement dimension correcting models.

The invention claimed is:

1. In a gait generating device equipped with instantaneous gait generating means for sequentially generating an instantaneous desired gait composed of an instantaneous desired motion of a mobile robot and an instantaneous desired floor reaction force, a gait generating device of a mobile robot, comprising instantaneous desired motion correcting means, wherein if:

all or a part of the mobile robot is expressed in terms of a model constructed of a plurality of elements, the elements being at least either rigid bodies having inertia or mass points;

a placement of elements of the model determined according to a predetermined first geometric restrictive condition, which specifies the relationship between an instantaneous motion of the mobile robot and the placement of the elements of the model, from an instantaneous desired motion generated by the instantaneous gait generating means is defined as a first placement;

a placement of the elements of the model determined according to a predetermined second geometric restrictive condition, which specifies the relationship between an instantaneous motion of the mobile robot and the placement of the elements of the model, from an instantaneous desired motion generated by the instantaneous gait generating means is defined as a second placement; and a placement of the elements of the model determined according to the second geometric restrictive condition from a corrected instantaneous desired motion obtained by correcting at least either the position or the posture of a predetermined part of the mobile robot in an instantaneous desired motion generated by the instantaneous gait generating means is defined as a third placement; then the instantaneous desired motion correcting means determines the corrected instantaneous desired motion such that a moment component generated about a predetermined point by a resultant force of inertial forces of the elements calculated by regarding the difference in the placement of the elements of the model between the third placement and the first placement as acceleration is closer to a predetermined value than a moment component acting about the predetermined point due to a resultant force of inertial forces of the elements calculated by regarding the difference in placement of the elements of the model between the second placement and the first placement as acceleration.

2. The gait generating device of a mobile robot according to claim 1, wherein the instantaneous desired motion correcting means determines the corrected instantaneous desired motion such that a translational component of a resultant force F3 of the inertial forces of the elements calculated by regarding the difference in placement of the elements of the model between the third placement and the first placement as acceleration is closer to zero than a translational component of a resultant force F2 of the inertial forces of the elements calculated by regarding the difference in placement of the elements of the model between the second placement and the first placement as acceleration, and a moment component acting about the predetermined point due to the resultant force F3 is closer to the predetermined value than a moment component acting about the predetermined point due to the resultant force F2.

3. The gait generating device of a mobile robot according to claim 1, wherein the instantaneous desired motion correcting means determines the corrected instantaneous desired motion such that a moment component acting about the predetermined point due to the resultant force of the inertial forces of the elements calculated by regarding the difference in placement of the elements of the model between the third placement and the first placement as acceleration becomes substantially the predetermined value.

4. The gait generating device of a mobile robot according to claim 3, wherein the instantaneous desired motion correcting means determines the corrected instantaneous desired motion such that the translational force component of a resultant force of the inertial forces of the elements calculated by regarding the difference in placement of the elements of the model between the second placement and the first placement as acceleration becomes substantially zero, and a moment component acting about the predetermined point due to the resultant force becomes substantially the predetermined value.

5. The gait generating device of a mobile robot according to claim 1, wherein in the moment component related to the difference in placement of the elements between the second placement and the first placement, the component originated from the difference between position A in the first placement and position B in the second placement of the elements of the model having masses is calculated from an angle formed by a segment connecting the predetermined point and the position A and a segment connecting the predetermined point and the position B by using a substantially monotonous function related to the angle, and in the moment component related to the difference in placement of the elements between the third placement and the first placement, the component originated from the difference between position A in the first placement and position C in the third placement of the elements of the model having masses is calculated using the monotonous function from the angle formed by the segment connecting the predetermined point and the position A and the segment connecting the predetermined point and the position C.

6. The gait generating device of a mobile robot according to claim 3, wherein, in the moment component related to the difference in placement of the elements between the second placement and the first placement, the component originated from the difference between position A in the first placement and position B in the second placement of the elements of the model having masses is calculated from an angle formed by the segment connecting the predetermined point and the position A and the segment connecting the predetermined point and the position B by using a substantially monotonous function related to the angle.

7. The gait generating device of a mobile robot according to claim 1, wherein the instantaneous desired motion generated by the instantaneous gait generating means is determined using a dynamic model that represents the relationship between a motion of the mobile robot and a floor reaction force and is constructed on the assumption that the inertial force generated by a specific motion component of at least one or more specific parts of the mobile robot is substantially zero, and the model includes an element corresponding to at least one part of the specific parts.

8. The gait generating device of a mobile robot according to claim 1, wherein an instantaneous desired motion generated by the instantaneous gait generating means is determined such that it satisfies a desired floor reaction force or a desired ZMP on a predetermined dynamic model representing a relationship between a motion of the mobile robot and a floor reaction force, and the first and the second geometric restrictive conditions are set such that a value obtained by adding a predetermined steady offset to the difference between a floor reaction force counterbalancing with a resultant force of the inertial forces of the elements that are generated due to temporal changes in the placement of the elements of the model determined according to the first geometric restrictive condition from the instantaneous desired motion and a floor reaction force counterbalancing with a resultant force of the inertial forces of the elements that are generated due to temporal changes in the placement of the elements of the model determined according to the second geometric restrictive condition from the instantaneous desired motion substantially coincides with an error of a floor reaction force produced on the dynamic model by the instantaneous desired motion.

9. The gait generating device of a mobile robot according to claim 1, wherein an instantaneous desired motion generated by the instantaneous gait generating means is determined so as to satisfy a desired floor reaction force or a desired ZMP on a predetermined dynamic model representing a relationship between a motion of the mobile robot and a floor reaction force, and the first and the second geometric restrictive conditions are set such that a value obtained by multiplying the difference between the overall center-of-gravity of the placement of the elements of the model determined according to the first geometric restrictive condition from the instantaneous desired motion and the overall center-of-gravity of the placement of the elements of the model determined according to the second geometric restrictive condition from the instantaneous desired motion by the total mass of the elements substantially coincides with a value obtained by multiplying an error of the overall center-of-gravity of the dynamic model in the instantaneous desired motion by a total mass of the dynamic model.

10. The gait generating device of a mobile robot according to claim 1, wherein the mobile robot is a robot comprising a plurality of legs or a plurality of arms extended from its body as a plurality of movable members, and the first geometric restrictive condition includes a condition in which any one of the elements of the model exists on a straight line parallel to a segment connecting a predetermined point in the vicinity of a distal end of each movable member and a predetermined point in the vicinity of the connecting portion of the movable member that is connected to the body.

11. The gait generating device of a mobile robot according to claim 1, wherein the mobile robot is a robot comprising a plurality of legs or a plurality of arms extended from its body as a plurality of movable members, and the first geometric restrictive condition includes a condition in which the body and the movable members on the model are retained in a predetermined constant posture state.

12. The gait generating device of a mobile robot according to claim 11, wherein the predetermined constant posture is the posture in which the body and the plurality of movable members of the mobile robot are oriented substantially in the vertical direction.

13. The gait generating device of a mobile robot according to claim 1, wherein the second geometric restrictive condition is set such that the placement of the elements of the model determined according to the condition from an arbitrary instantaneous desired motion of the mobile robot substantially coincides with the placement of parts corresponding to the elements in the robot following the instantaneous desired motion.

14. The gait generating device of a mobile robot according to claim 1, wherein the mobile robot comprises a plurality of legs or a plurality of arms extended from the body as a plurality of movable members and also has flexible joints at middle portions between the connecting portions of the movable members that connect to the body and the distal ends of the movable members, and an instantaneous desired motion generated by the instantaneous gait generating means is determined using a dynamic model that represents a relationship between a motion of the robot and a floor reaction force and the dynamic model is constructed on the assumption that the inertial forces produced at or near the middle portions of the movable members due to bending motions of the movable members are substantially zero, the model being a model that contains, as an element, a mass point associated with at least the middle portion or a portion near the middle portion of each movable member.

15. The gait generating device of a mobile robot according to claim 14, wherein the first geometric restrictive condition includes a condition in which a mass point associated with the middle portion or the portion close thereto of each movable member of the elements of the model exists on the segment that connects a predetermined point in the vicinity of the distal end of the movable member and a predetermined point in the vicinity of the connecting portion of the movable member that links with the body, and the second geometric restrictive condition is set such that the placement of the elements of the model determined according to the condition from an arbitrary instantaneous desired motion of the mobile robot substantially coincides with the placement of parts corresponding to the elements in the robot following the instantaneous desired motion.

* * * * *